US012803927B2

(12) United States Patent
Bhat et al.

(10) Patent No.: US 12,803,927 B2
(45) Date of Patent: *Nov. 17, 2026

(54) ENCRYPTED AUTONOMOUS AGENT VERIFICATION IN MULTI-TIERED DISTRIBUTED SYSTEMS OF THIRD PARTY AGENTS

(71) Applicant: Citibank, N.A., New York, NY (US)

(72) Inventors: Ganesh Prasad Bhat, New Jersey, NJ (US); James Randolph Myers, Clearwater, FL (US)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/540,252

(22) Filed: Feb. 13, 2026

(65) Prior Publication Data

US 2026/0180920 A1 Jun. 25, 2026

Related U.S. Application Data

(63) Continuation of application No. 19/334,739, filed on Sep. 19, 2025, now Pat. No. 12,556,493, which is a (Continued)

(51) Int. Cl.
*H04L 47/70* (2022.01)
*H04L 67/1097* (2022.01)

(52) U.S. Cl.
CPC ........ *H04L 47/822* (2013.01); *H04L 67/1097* (2013.01)

(58) Field of Classification Search
CPC ..... H04L 47/822; H04L 67/1097; H04L 9/50; H04L 63/123; G06F 9/44505; G06F 8/35
See application file for complete search history.

(56) References Cited

U.S. PATENT DOCUMENTS 8,347,147 B2 1/2013 Adiyapatham et al.
10,121,025 B1 * 11/2018 Rice ........................ G06F 21/10
(Continued)

FOREIGN PATENT DOCUMENTS

CA 3089009 A1 * 7/2019 ............... H04L 9/50
CN 106502890 A 3/2017
(Continued)

OTHER PUBLICATIONS

Empower Your Team with a Compliance Co-Pilot, Sedric, retrieved on Sep. 25, 2024. https://www.sedricai/.
(Continued)

*Primary Examiner* — Shean Tokuta
(74) *Attorney, Agent, or Firm* — Ashurst Perkins Coie US LLP

(57) ABSTRACT

Systems and methods disclosed herein perform privacy-preserving evaluations of artificial intelligence (AI) agents. The system identifies an auditing AI agent from a set of auditing AI agents for assessing target AI agent sets. The system obtains a data structure that defines operative boundaries for a target AI agent set and generates a reference value by applying a first transformation operation set on the data structure. The system transmits the reference value to a multi-agent storage and receives, via the multi-agent storage, a verification artifact from the target AI agent set that indicates an observed value generated by applying a second transformation operation set on an artifact set generated by the target AI agent set. The system determines, via the auditing AI agent, a verification status and responsive to a particular artifact failing to satisfy one or more assessment metrics, generates an action set to modify the target AI agent set.

17 Claims, 27 Drawing Sheets

Related U.S. Application Data continuation-in-part of application No. 19/288,027, filed on Aug. 1, 2025, now Pat. No. 12,526,244, which is a continuation-in-part of application No. 19/217,943, filed on May 23, 2025, now Pat. No. 12,450,037, said application No. 19/334,739 is a continuation-in-part of application No. 19/182,585, filed on Apr. 18, 2025, and a continuation-in-part of application No. 19/179,996, filed on Apr. 15, 2025, now Pat. No. 12,587,488, said application No. 19/182,585 is a continuation of application No. 18/947,102, filed on Nov. 14, 2024, now Pat. No. 12,299,140, which is a continuation-in-part of application No. 18/782,019, filed on Jul. 23, 2024, now Pat. No. 12,197,859, which is a continuation-in-part of application No. 18/771,876, filed on Jul. 12, 2024, now Pat. No. 12,204,323, said application No. 18/947,102 is a continuation-in-part of application No. 18/739,111, filed on Jun. 10, 2024, now Pat. No. 12,223,063, said application No. 18/661,532 is a continuation-in-part of application No. 18/661,519, filed on May 10, 2024, now Pat. No. 12,106,205, said application No. 18/771,876 is a continuation-in-part of application No. 18/661,532, filed on May 10, 2024, now Pat. No. 12,111,747, said application No. 18/947,102 is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/661,519 is a continuation-in-part of application No. 18/633,293, filed on Apr. 11, 2024, now Pat. No. 12,147,513, said application No. 18/739,111 is a continuation-in-part of application No. 18/607,141, filed on Mar. 15, 2024, now Pat. No. 12,608,486, said application No. 19/179,996 is a continuation-in-part of application No. 18/434,687, filed on Feb. 6, 2024, now Pat. No. 12,126,546, said application No. 18/607,141 is a continuation-in-part of application No. 18/399,422, filed on Dec. 28, 2023, now Pat. No. 12,367,292, which is a continuation-in-part of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(56) References Cited

U.S. PATENT DOCUMENTS

| | | | | |
|---|---|---|---|---|
| 10,447,483 | B1 * | 10/2019 | Su | H04L 9/3226 |
| 10,949,337 | B1 | 3/2021 | Yalla et al. | |
| 11,106,801 | B1 | 8/2021 | Levine et al. | |
| 11,227,047 | B1 | 1/2022 | Vashisht et al. | |
| 11,301,933 | B2 | 4/2022 | Uhr et al. | |
| 11,489,672 | B2 | 11/2022 | Linton et al. | |
| 11,620,481 | B2 | 4/2023 | Givental et al. | |
| 11,853,418 | B2 | 12/2023 | Bean et al. | |
| 11,880,836 | B1 | 1/2024 | Balazs | |
| 12,450,037 | B1 | 10/2025 | Bhat | |
| 12,519,667 | B1 | 1/2026 | Choo et al. | |
| 12,526,244 | B2 * | 1/2026 | Bhat | G06F 8/35 |
| 12,556,493 | B2 * | 2/2026 | Bhat | G06F 9/44505 |
| 12,619,715 | B1 | 5/2026 | Bhat et al. | |
| 12,664,263 | B1 | 6/2026 | Bhat et al. | |
| 12,664,264 | B1 | 6/2026 | Bhat et al. | |
| 12,670,248 | B1 | 6/2026 | Bhat et al. | |
| 2005/0166094 | A1 | 7/2005 | Blackwell et al. | |
| 2016/0103996 | A1 | 4/2016 | Salajegheh et al. | |
| 2018/0121923 | A1 * | 5/2018 | Uhr | G06Q 20/223 |
| 2018/0219683 | A1 * | 8/2018 | Deery | H04L 9/3239 |
| 2018/0276745 | A1 | 9/2018 | Paolini-Subramanya et al. | |
| 2018/0285970 | A1 * | 10/2018 | Snow | H04L 9/3247 |
| 2018/0316502 | A1 * | 11/2018 | Nadeau | H04L 9/085 |
| 2019/0156429 | A1 * | 5/2019 | Beckmann | G06Q 20/3827 |
| 2019/0228133 | A1 * | 7/2019 | Ansari | G06F 21/10 |
| 2019/0334704 | A1 * | 10/2019 | Keskar | G06F 21/606 |
| 2020/0142682 | A1 | 5/2020 | Marks et al. | |
| 2020/0232194 | A1 * | 7/2020 | Periaswamy | G01F 1/32 |
| 2021/0256113 | A1 * | 8/2021 | Stott | H04L 9/3239 |
| 2021/0256487 | A1 | 8/2021 | Johnson | |
| 2021/0263083 | A1 * | 8/2021 | Hwang | G06Q 50/06 |
| 2021/0297234 | A1 * | 9/2021 | Le Callonnec | H04L 9/50 |
| 2022/0114399 | A1 | 4/2022 | Castiglione et al. | |
| 2022/0198304 | A1 | 6/2022 | Szczepanik et al. | |
| 2022/0358023 | A1 | 11/2022 | Moser et al. | |
| 2023/0009999 | A1 | 1/2023 | Higuchi et al. | |
| 2023/0076795 | A1 | 3/2023 | Indani et al. | |
| 2023/0177441 | A1 | 6/2023 | Durvasula et al. | |
| 2023/0252393 | A1 | 8/2023 | Orzechowski et al. | |
| 2023/0359789 | A1 | 11/2023 | Andre et al. | |
| 2023/0360031 | A1 * | 11/2023 | DeLuca | G06Q 20/3821 |
| 2024/0007479 | A1 * | 1/2024 | Doney | H04L 63/12 |
| 2024/0015021 | A1 * | 1/2024 | Uchida | G06F 21/31 |
| 2024/0089103 | A1 * | 3/2024 | Chen | H04L 9/321 |
| 2024/0095220 | A1 * | 3/2024 | Isaacs | G06F 16/955 |
| 2024/0177155 | A1 * | 5/2024 | Chen | G06Q 20/065 |
| 2024/0346283 | A1 | 10/2024 | Ayachitula et al. | |
| 2024/0370476 | A1 | 11/2024 | Madisetti et al. | |
| 2024/0385614 | A1 | 11/2024 | Morris et al. | |
| 2024/0420116 | A1 | 12/2024 | Ramde et al. | |
| 2024/0420124 | A1 * | 12/2024 | Ramde | G06F 21/6245 |
| 2024/0422291 | A1 | 12/2024 | Ramde et al. | |
| 2025/0029042 | A1 | 1/2025 | Bronevetsky et al. | |
| 2025/0142373 | A1 | 5/2025 | Harris et al. | |
| 2025/0150291 | A1 | 5/2025 | Zheng | |
| 2025/0173734 | A1 * | 5/2025 | Aidan | G06Q 30/0185 |
| 2025/0356026 | A1 * | 11/2025 | Myers | G06F 11/3684 |
| 2025/0358240 | A1 * | 11/2025 | Bhat | G06F 8/35 |
| 2026/0019380 | A1 * | 1/2026 | Bhat | G06F 9/44505 |
| 2026/0044610 | A1 * | 2/2026 | Rajaretnam | G06F 11/3006 |
| 2026/0180920 | A1 * | 6/2026 | Bhat | G06F 9/44505 |

FOREIGN PATENT DOCUMENTS

| | | | | | |
|---|---|---|---|---|---|
| CN | 108764908 | A | * | 11/2018 | G06Q 30/0185 |
| CN | 111369332 | A | * | 7/2020 | G06Q 40/125 |
| CN | 108182581 | B | | 8/2020 | |
| CN | 112581126 | A | * | 3/2021 | H04L 63/10 |
| CN | 115102793 | A | | 9/2022 | |
| CN | 115208900 | B | | 3/2024 | |
| CN | 118606373 | A | | 9/2024 | |
| CN | 115396117 | B | | 11/2024 | |
| CN | 118969216 | A | | 11/2024 | |
| CN | 119598488 | A | | 3/2025 | |
| CN | 121615149 | A | | 3/2026 | |
| EP | 4191976 | A1 | | 6/2023 | |
| JP | 2022150778 | A | | 12/2024 | |
| KR | 20220083931 | A | | 7/2022 | |
| WO | WO-2019064658 | A1 | * | 4/2019 | H04L 9/50 |
| WO | 2020216078 | A1 | | 10/2020 | |
| WO | WO-2020233236 | A1 | * | 11/2020 | G06Q 40/04 |
| WO | WO-2022102418 | A1 | * | 5/2022 | G09C 1/00 |
| WO | WO-2024164550 | A1 | * | 8/2024 | H04L 63/123 |
| WO | 2024076387 | A1 | | 11/2024 | |

OTHER PUBLICATIONS

Dong, Y., et al., "Building Guardrails for Large Language Models," https://ar5iv.labs.arxiv.org/html/2402.01822v1, published May 29, 2024, 20 pages.

(56) References Cited

OTHER PUBLICATIONS

Yuan et al., R-Judge: Benchmarking Safety Risk Awareness for LLM Agents, arXiv:2401.10019v1 [cs.CL] Jan. 18, 2024; Total Pages: 23 (Year: 2024).

* cited by examiner

ENCRYPTED AUTONOMOUS AGENT VERIFICATION IN MULTI-TIERED DISTRIBUTED SYSTEMS OF THIRD PARTY AGENTS

CROSS-REFERENCE TO RELATED APPLICATION(S)

This application is a continuation of U.S. patent application Ser. No. 19/334,739 entitled "ENCRYPTED AUTONOMOUS AGENT VERIFICATION IN MULTI-TIERED DISTRIBUTED SYSTEMS OF THIRD PARTY AGENTS" filed on Sep. 19, 2025, which is a continuation-in-part of U.S. patent application Ser. No. 19/288,027 entitled "ENCRYPTED AUTONOMOUS AGENT VERIFICATION IN MULTI-TIERED DISTRIBUTED SYSTEMS ACROSS GLOBAL OR CLOUD NETWORKS" filed on Aug. 1, 2025, which is a continuation-in-part of U.S. patent application Ser. No. 19/217,943 entitled "AUTOMATIC GENERATION AND EXECUTION OF COMPUTER-EXECUTABLE COMMANDS USING ARTIFICIAL INTELLIGENCE MODELS" filed on May 23, 2025.

U.S. patent application Ser. No. 19/334,739 is further a continuation-in-part of U.S. patent application Ser. No. 19/179,996 entitled "SYSTEMS AND METHODS FOR DETERMINING RESOURCE AVAILABILITY ACROSS GLOBAL OR CLOUD NETWORKS" and filed Apr. 15, 2025, which is a continuation-in-part of U.S. patent application Ser. No. 18/434,687 (now U.S. Pat. No. 12,126,546 issued Oct. 22, 2024) entitled "SYSTEMS AND METHODS FOR DETERMINING RESOURCE AVAILABILITY ACROSS GLOBAL OR CLOUD NETWORKS" and filed Feb. 6, 2024. The content of the foregoing applications is incorporated herein by reference in their entirety.

U.S. patent application Ser. No. 19/334,739 is further a continuation-in-part of U.S. patent application Ser. No. 19/182,585 entitled "DYNAMIC MULTI-MODEL MONITORING AND VALIDATION FOR ARTIFICIAL INTELLIGENCE MODELS" filed on Apr. 18, 2025, which is a continuation of U.S. patent application Ser. No. 18/947,102 (now U.S. Pat. No. 12,299,140) entitled "DYNAMIC MULTI-MODEL MONITORING AND VALIDATION FOR ARTIFICIAL INTELLIGENCE MODELS" filed on Nov. 14, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" filed on May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024. U.S. application Ser. No. 18/947,102 is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

U.S. patent application Ser. No. 18/947,102 (now U.S. Pat. No. 12,299,140) entitled "DYNAMIC MULTI-MODEL MONITORING AND VALIDATION FOR ARTIFICIAL INTELLIGENCE MODELS" is further a continuation-in-part of U.S. patent application Ser. No. 18/739,111 entitled "END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS" and filed Jun. 10, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications is incorporated herein by reference in their entirety.

BACKGROUND

An AI agentic model ("agent"), whether autonomous or semiautonomous, refers to a persistent software and/or hardware entity characterized by a digitally encoded objective function. The objective function can instruct the agent to, for example, maximize task accuracy, minimize resource usage, comply with specified operational constraints, and the like. The degree of autonomy can range from semiautonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks. The actions autonomously executed by agents are responsive to their respective objective functions. For example, an agent's objective function may direct the agent to minimize task completion latency. During autonomous execution, the agent can determine a degree of expected utility of candidate actions by evaluating the actions against its objective function and select executable actions that align with its assigned objectives within the imposed operational constraints or boundaries set by the system the agent is interacting with.

In some examples, systems that interact with agents are other agents. For instance, a provider agent refers to an AI or autonomous software entity operating on behalf of a direct supplier or service provider in a distributed system. Sub-agents, also known as second-tier or higher-tier agents, are agents that operate further upstream in a supply chain hierarchy, such as subcontractors, indirect suppliers, or additional autonomous entities that fulfill obligations delegated by the provider agent. However, the layered structure and autonomous nature of agents mean there is often limited visibility into a compliance status of the autonomous actions taken by higher-tiered agents that contribute to outcomes or compliance but, for example, are several layers removed from the primary organization.

Figure 1:
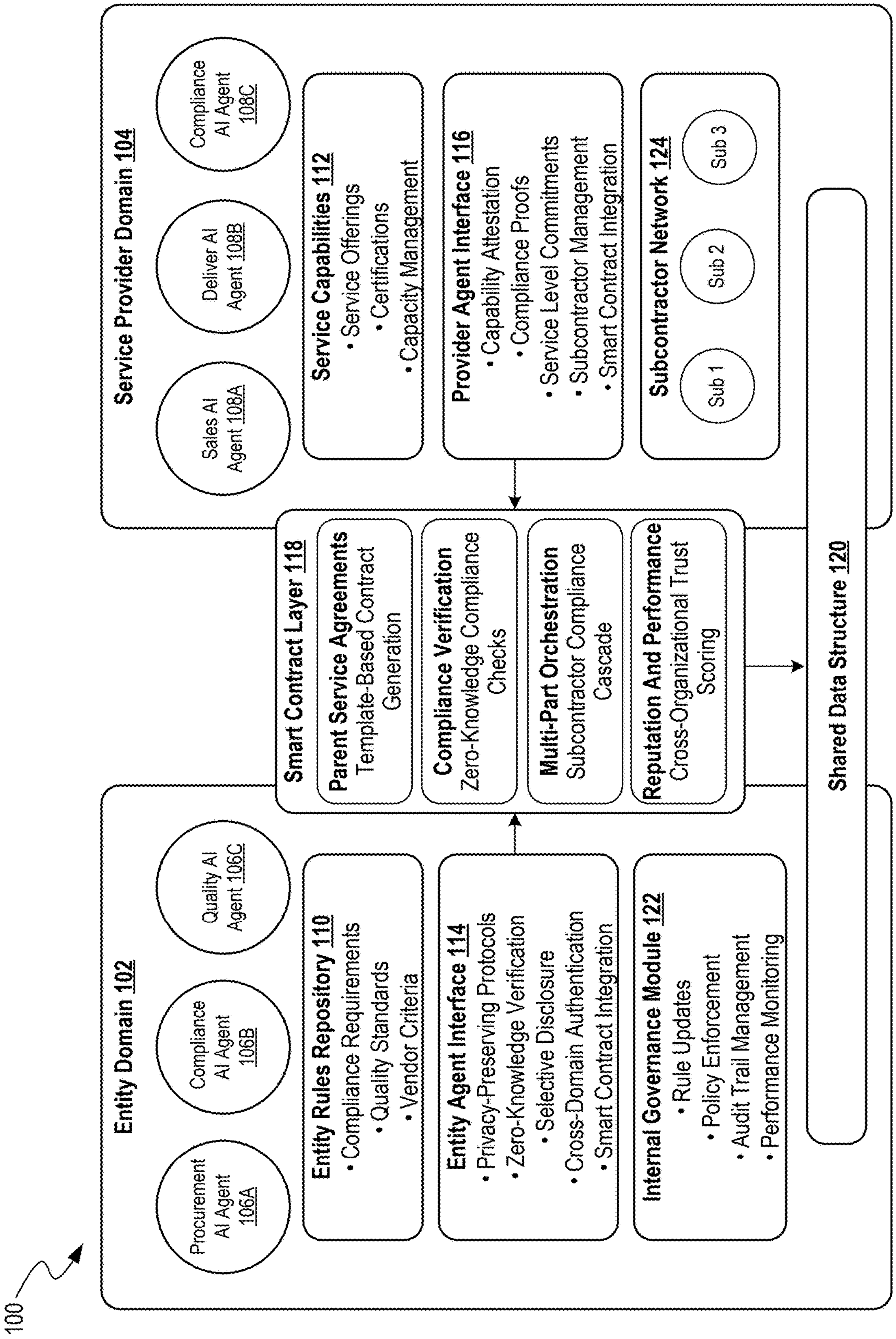
FIG. 1 illustrates an example environment of an agent management platform for verifying autonomous agents in multi-tiered distributed systems while maintaining operational data privacy of respective autonomous agents, in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data is encoded and stored within the model's architecture as parameters, embeddings, and/or latent features. The internal representations enable the model to interpret and generate responses to new inputs by referencing what has been encoded during training. To update the internal representations, the models are retrained. An AI agent is a software entity characterized by objective functions and varying degrees of autonomy, which is capable of controlling its own decision making and acting, based on its perception of its environment, in pursuit of one or more objectives. Agents can perceive environments, make decisions, execute actions, and optimize their behavior with respect to one or more objective functions. Autonomous or semiautonomous agents can independently process incoming data, determine action plans, and dynamically invoke APIs, databases, other agents, or external services to execute tasks.

In conventional multi-tiered distributed systems that employ semiautonomous or autonomous agents, the organizational structure is typically arranged in hierarchical tiers such as primary entities, direct providers, and upstream sub-agents or subcontractors. Agents situated at each tier function as semi-independent or independent actors operating within specific domains of operations, such as receiving instructions, exchanging data, and/or executing tasks within their defined scope. Data, task assignments, and control decisions usually flow downward from first-tier (e.g., primary entity) agents to higher-tier (e.g., sub-agent) agents, while operational updates and results propagate upward.

However, in conventional multi-tiered distributed systems, organizations face significant challenges regarding visibility into second-tier and higher-tier suppliers or subcontractors. Typically, primary entities engage directly with their immediate providers and have little or no operational insight into the upstream/downstream networks managed by subcontractors or other providers. This problem is exacerbated in environments employing semiautonomous and/or autonomous agents, which are programmed to execute actions, make operational decisions, and invoke external services independently, without direct intervention or real-time oversight from the primary entity. In particular, once an initial instruction or delegation is issued to a first-tier agent, that agent may, according to its internal objective functions and contextual inputs, further delegate tasks, trigger computational operations, and/or interact with additional data sources and service endpoints upstream. As each agent in the hierarchy operates with varying degrees of autonomy and may utilize its own authenticated interfaces, operational logic, and data sources, the resulting decision processes, transactions, and control signals often propagate through layers of the system without the knowledge of the primary organizational entity. Thus primary entities (and agents of the primary entities) are unable to observe, audit, or even reconstruct the specific actions and decisions executed by second-tier or higher-tier agents when those agents use their autonomy to interact with external computational resources.

However, even if the agent of the primary entity were to directly contact the provider agents and/or sub-agents to verify compliance, the compliance proof submitted by the provider agents and/or sub-agents risks disclosure of sensitive or otherwise protected information. For example, compliance verification artifacts, such as audit records, attestation statements, digital checklists, and operational logs, typically require explicit inclusion of granular operational variables, such as supplier identity, order volumes, unit pricing, delivery schedules, and/or process-specific timestamps, to demonstrate adherence to prescribed parameters (e.g., contractual, regulatory). The embedded data fields and structural metadata within such compliance proofs can reveal confidential commercial terms, workflow details, and/or business relationships that are not intended to be shared outside the originating organization.

Therefore, conventional methods used to manage agent interactions in distributed networks are often reactive rather than proactive. Agents in conventional multi-tiered systems typically perform periodic or event-triggered reporting, wherein each agent, whether at the primary, provider, or sub-agent level, logs its own operational events, compliance states, or exception conditions into local or tier-specific data repositories. The logs or status reports are typically only propagated to adjacent tiers in response to explicit data requests, scheduled audits, or after the detection of an abnormal downstream outcome, such as a missed delivery, contract nonconformance, or security incident. As a result, detection of noncompliance or operational anomalies relies on the presence of observable symptoms in downstream workflows, such as deviations in key performance indicators (KPIs), transaction failures, or user feedback. For example, a primary entity may only become aware of inventory shortages, regulatory failures, or supply chain interruptions after receiving incomplete goods, delayed deliveries, or compliance notifications from its immediate provider, who in turn has consolidated data from upstream sub-agents after the event has propagated.

Attempting to create a system to perform privacy-preserving verification and compliance assessment among semiautonomous or autonomous AI agents in multi-tier distributed networks presented significant technological uncertainty, especially where datasets are highly distributed, access-restricted, or subject to varying policy and regulatory constraints (as commonly encountered in cross-organizational, industrial, and cloud-based environments). Architecting such a system necessitates addressing multiple technical unknowns in conventional approaches, such as cryptographically binding agent actions to compliance parameters without disclosing sensitive internal data and a lack of dynamic or context-aware verification across organizational boundaries.

To overcome the technological uncertainties, the inventors systematically evaluated multiple design alternatives. For example, the inventors evaluated systems in which all agent interactions and compliance events were centrally logged or brokered through a trusted third-party validation agent. While such centralized architectures enabled uniform auditing, they reintroduced a single point of trust and failure, and were non-viable in environments that required inter-organizational autonomy or strict partitioning of proprietary data. Another design alternative evaluated peer-to-peer, agent-initiated attestations by using traditional digital signatures or hash-linked event logs for compliance proof. While this improved decentralization, it required agents to transmit full or partially redacted datasets to validating parties, which exposes confidential process information and operational parameters. Attempts to use programmable threshold-based routing or static policy enforcement within multi-agent workflows, while offering an increased measure of automated compliance, could not dynamically adapt to changing operative boundaries (e.g., rules of a primary organization) or agent network composition within the multi-tiered distributed system.

As such, the inventors have developed systems (hereinafter "agent management platform") and related methods to perform privacy-preserving, cryptographically verifiable compliance across multi-agent, multi-tier distributed systems. In some implementations, a storage structure (e.g., a distributed ledger, a blockchain) is accessible to a plurality of autonomous or semiautonomous agents (e.g., primary entity agents, provider agents, sub-agents). Primary entity agents can encode compliance boundary conditions and operational policies as machine-readable commitments, generated, for example, via non-invertible hash functions or zero-knowledge proof commitments, without disclosing underlying protected information. Provider and sub-agent entities, upon receiving the encoded operative boundaries, apply their own cryptographically secure transformation operations to local datasets and generate verification artifacts (such as zero-knowledge proofs) that attest to compliance with the defined boundaries without direct exposure of protected data. The verification artifacts are transmitted, referenced, and/or aggregated through the distributed ledger to enable first-tier and/or consensus agents to independently validate compliance status, record the results on the distributed ledger, and/or execute automated governance, escalation, or remediation workflows as triggered. The agent management platform can therefore dynamically adapt to changes in agent composition, operational contexts, and data access permissions, while maintaining audit trails and compliance without requiring centralized disclosure or control.

Each agent in the network of the multi-tiered distribution system, including provider agents and sub-agents, regardless of organizational tier, can be enabled to generate and submit a machine-verifiable attestation that is cryptographically linked to its unique digital identity and compliance boundaries and immutably recorded on the ledger. Therefore, the compliance parameters and obligations are propagated across the entire agent hierarchy in the multi-tiered distribution system so that parent requirements are automatically inherited and can be attested to by descendant agents. The agent management platform ensures that the compliance, operational, and decision records for every agent, regardless of tier or domain, are discoverable, independently auditable, and visible to parties in the supply chain. Additionally, zero-knowledge proofs enable agents to cryptographically attest to compliance with an operative boundary or policy but do not disclose protected information, such as information about supplier identity, pricing, proprietary methods, or transactional metadata. Only a fixed-length and/or non-invertible artifact or proof is presented for verification. Further, compliance, performance, and/or deviation alerts are autonomously broadcast and recorded once detected, often before downstream effects can propagate through the system. Rules and boundaries defined at the parent organizational level can be automatically transposed into executable verification requirements so that, as soon as an agent (or any of its dependencies) exhibits noncompliant or anomalous behavior, an alert can be transmitted and remediation can be triggered per an encoded policy on the blockchain. This eliminates the lag to batch-mode or request-driven workflows.

While the current description provides examples of the rule application engine related to LLMs, one of skill in the art would understand that the disclosed techniques can apply to other forms of machine learning or algorithms, including unsupervised, semi-supervised, supervised, and reinforcement learning techniques. For example, the disclosed agent management platform can use model outputs from support vector machine (SVM), k-nearest neighbor (KNN), decision-making, linear regression, random forest, naïve Bayes, or logistic regression algorithms, gradient boosting, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of Verifying AI Agents in Multi-Tiered Distributed Systems FIG. 1 illustrates an example environment 100 of an agent management platform for verifying autonomous agents in multi-tiered distributed systems while maintaining operational data privacy of respective autonomous agents, in accordance with some implementations of the present technology. The environment 100 can be implemented using components of example computer system 2000 illustrated and described in more detail with reference to FIG. 20. Likewise, implementations of example environment 100 can include different and/or additional components or can be connected in different ways.

Environment 100 can be segmented into an entity domain 102 and a service provider domain 104 communicatively connected by a smart contract layer 118. The entity domain 102 refers to a computational environment associated with an entity such as a primary organization or enterprise. As used herein, an entity domain 102 is defined as a computational node, execution environment, or virtual machine instance that maintains a unique identity and is configured to execute software instructions, store and process data, and manage associated autonomous and/or semiautonomous agents via one or more processor and memory subsystems. The entity domain 102 includes components such as internal process execution units, structured data storage and retrieval subsystems (e.g., databases, data lakes, or object stores), autonomous and/or semiautonomous agents, network interfaces and access control modules operating to enforce authentication and authorization for inbound and outbound data flows, and so forth. The entity domain 102 may be implemented as an isolated network segment with controlled access points to external systems. The entity domain 102 may generate separate environments for different departments or functions within the organization.

The provider domain 104 refers to a logically and/or physically isolated computing environment associated with external service providers or vendors that interact with the primary entity (i.e., the entity corresponding to the entity domain 102). The provider domain 104 includes the internal systems, autonomous agents, data structures, data repositories, and so forth corresponding to the external service providers. In some implementations, rather than the entity of the entity domain 102 being associated with a single service provider, the service provider domain 104 is implemented as a federated network of multiple service providers, each with its own subdomains.

Within the entity domain 102, multiple autonomous agentic AI models referred to as entity agents 106 (e.g., procurement AI agent 106A, compliance AI agent 106B, quality AI agent 106C, and so forth) can be used to perform operations associated with the entity domain 102. In the context of the agent management platform, an "agent" is a computational entity, implemented as an artificial intelligence (AI) process or human-supervised software module, whose operational behavior is governed by a machine-readable objective function. The objective function encodes the agent's optimization target or operational policy and directs its semiautonomous or autonomous programmatic decision-making. An agent is enabled to execute one or more actions independently, with autonomy defined as the ability to process input data, evaluate system proposals, generate evidence, and effectuate state-modifying operations without stepwise external control. Each agent can be constructed to include structured, persistent memory for maintaining state information, logs of historical transactions, and/or cryptographic credentials; input interfaces for acquiring data, protocol instructions, and authenticated messages from system components or external adapters; and output channels for transmitting verifiable decisions, artifacts, and/or cryptographic proofs to distributed ledgers or interfacing subsystems. Executable actions can include sequences of deterministic or conditional computer instructions triggered by protocol events or smart contract logic.

For example, the procurement AI agent 106A refers to an agent trained on structured datasets including historical transaction records, where each dataset entry is formatted as a data structure containing multi-field attributes such as cost, supplier identifier, item type, and timestamp. The procurement AI agent 106A can execute predictive analytics workflows, such as regression or classification models, to output predictions for attributes of prospective transactions (including but not limited to supplier selection, projected pricing, and estimated delivery time), wherein the predictions are determined based on input features provided at runtime.

In another example, the compliance AI agent 106B is an agent that receives operational metadata as input, such metadata including model parameter logs, event audit trails, and configuration data associated with subordinate AI models deployed by the entity or by external provider domains. The compliance AI agent 106B validates, through machine-executable rule sets, whether the operational behaviors of AI-driven processes within the domain adhere to externally provided regulatory standards, internal compliance policies, programmed constraints, or defined industry benchmarks. The compliance AI agent 106B can operate as a real-time or near-real time monitoring module by subscribing to streaming data feeds, detecting protocol violations, and generating machine-formatted compliance reports or alert notifications when such violations are detected. The compliance AI agent 106B can include logic to initiate automated, computer-implemented remediation workflows in software systems that are identified as noncompliant.

The quality AI agent 106C refers to an agent that can be used to maintain and/or align attributes of products, services, or processes within the entity with a set of criteria (e.g., quality criteria). The quality AI agent 106C can be implemented as an AI model that receives structured product or process data as input and applies machine-executable criteria to determine conformity of the data with technical quality specifications.

The service provider domain 104 can include its own (e.g., different) set of agents, referred to as the provider agents 108 (e.g., sales AI agent 108A, delivery AI agent 108B, compliance AI agent 108C, and so forth) herein. The entity agents 106 and provider agents 108 are the same as or similar to the AI system 1900 illustrated and described in more detail with reference to FIG. 19. As used herein, a "provider agent" is a software-implemented artificial intelligence (AI) process, instantiated on a processor or distributed compute instance, that autonomously executes computational routines and protocol-driven actions on behalf of the service provider.

The sales AI agent 108A, as instantiated within the service provider domain 104, is an agent whose objective function can be to maximize or increase the execution of digital sales transactions in accordance with specified logic and system constraints. The sales AI agent 108A can, for example, interface with input/output APIs to receive structured digital sales inquiries, smart contract templates, and/or service capability attestations as input artifacts. The sales AI agent can execute one or more evaluations, such as ranking, classification, or constraint satisfaction, to determine transaction parameters, generate digitally signed smart contract proposals, or send negotiation messages. All outputs can be formatted as machine-readable digital artifacts and communicated through agent interfaces to distributed smart contract layers for verification and further automated workflow execution.

The delivery AI agent 108B refers to an agent used to autonomously coordinate and/or verify the fulfillment of service delivery obligations specified by digital smart contracts. The delivery AI agent can receive as input smart contract terms, delivery event data, and service logs, represented as structured, machine-parsable digital records. The delivery AI agent can continuously monitor delivery states and generate digitally signed fulfillment confirmations and delivery status updates. The output artifacts can be transmitted to a shared data structure 120 or other agents.

The compliance AI agent 108C, similar to its counterpart in the entity domain 102, can validate adherence to computationally defined compliance requirements and digital contract clauses. Inputs to the compliance AI agent can include policy documents, regulatory parameter sets, operational logs, and machine-readable copies of smart contract terms. The compliance AI agent 108C can autonomously evaluate operational events and output compliance certificates, audit trails, or zero-knowledge proof artifacts as evidence of conformity to system policies or smart contract obligations.

In some implementations, the AI agents may be physical devices. For example, the AI agent may be a combination of software and hardware that may be packaged as an "agent device". The agent device may communicate wirelessly using a wireless transceiver. Furthermore, the agent device may have other sensors such as cameras, microphones, and/or other suitable sensors. In some implementations, agent devices may be attached to robots or even living things. For example, a small scale robot that may move in and out of various locations may host an AI agent. In some implementations, the agent device may be attached to a living thing such as insects, animals, and/or other living things.

The entity rules repository 110 refers to a centralized data store associated with the entity domain 102 that is enabled to store, retrieve, and manage machine-readable rule sets, policy objects, and criteria-defining data structures that regulate an entity's operations and interactions with service providers (e.g., the service provider agent associated with the provider domain 104). A rule can be defined as a logic statement or parameterized condition that can be programmatically evaluated by autonomous agents at execution time. The repository can define operative boundary parameters for products, services, and internal processes in the form of configuration entries, logical expressions, or modular policy code that can be referenced by agents for automated compliance checks. The entity rules repository 110 can operate as a versioned database that defines the operative boundaries parameters for products, services, and/or processes within the organization. Additionally, the entity rules repository 110 may store provider criteria, which can be encoded as structured data tuples that specify provider qualification metrics, evaluation thresholds, and performance indicators, enabling agents to execute dynamic selection and scoring routines for service providers.

The service capabilities 112 within the service provider domain 104 refer to an unstructured, semi-structured, or structured (e.g., JSON, XML, relational) representation encoding the operational state, resource availability, and functional capacity of the provider's infrastructure. The service capabilities 112 can be implemented as a dynamic, self-updating environment that continuously assesses and reports on the provider's current capabilities. The service capabilities 112 can be formatted in accordance with one or more standardized ontologies, which define semantic schemas and controlled vocabularies that enable machine interpretation and interoperability with entity agents from the entity domain 102, used by the entity agent(s) associated with the entity domain 102.

The entity agent interface 114 refers to a communication layer that facilitates interactions between the entity domain 102 and other components of the system environment 100. This entity agent interface 114 can operate as a gateway for entity agents 106 to exchange information, submit requests, and/or receive responses from external systems, including the service provider domain 104 and the smart contract layer 118. The provider agent interface 116 refers to a complementary communication layer operating within the service provider domain 104 and enables provider agents 108 to interact with the environment 100. This provider agent interface 116 enables provider agents 108 to submit capability information, respond to requests, and/or participate in smart contract executions. The entity agent interface 114 and/or the provider agent interface 116 can maintain a record of entity agents 106 and/or provider agent 108 interactions (e.g., for compliance or dispute resolution purposes).

The smart contract layer 118 refers to a set of self-executing programs deployed on a shared data structure 120. The shared data structure 120 refers to a distributed ledger or blockchain system that operates to facilitate data exchange and transaction recording between the entity domain 102 and the service provider domain 104 (e.g., their respective agents). The shared data structure 120 can be implemented using a consortium blockchain architecture, where participating entities maintain nodes that collectively validate and store transactions. The smart contract layer 118 may include modules for generating and updating data structures defining agreements (e.g., parent service agreements, which operate as contracts governing the communications between the entity and service provider or their respective agent(s)). Further methods of generating and updating smart contracts between AI agents are discussed with reference to FIGS. 9-14. These data structures defining agreements may be implemented as template-based smart contracts with parameterizable clauses that can be customized for specific engagements. The smart contract layer 118 can, in some implementations, use a compliance verification module that uses zero-knowledge proofs to perform compliance checks without revealing sensitive operational data to enable trustless verification of adherence to agreed-upon terms. Additionally, the smart contract layer 118 can include a multi-part orchestration module used to manage interactions and dependencies between the smart contract between the entity agents and the provider agents and any subcontractor agreements between the provider agents and subcontractor agents, thereby ensuring compliance across the entire service delivery chain.

The internal governance module 122 within the entity domain 102 operates to manage internal policies, rules, and operational standards. The internal governance module 122 can use rule-based systems and/or machine learning models to dynamically update and enforce policies based on changing regulatory landscapes. The internal governance module 122 can automatically propose and/or execute updates to the entity rules repository 110. The internal governance module 122 can continuously monitor operational data of the entity domain and trigger automated responses to policy violations (e.g., remediation actions, alerts). The internal governance module 122 can maintain an audit trail using, for example, append-only data structures to ensure the immutability of governance-related actions and decisions. Additionally, the internal governance module 122 can continuously monitor operational data of the entity domain to determine one or more performance-based metrics (e.g., latency, accuracy) and use the determined metrics to assess the effectiveness of governance policies and identify areas for improvement.

The subcontractor network 124 within the service provider domain 104 refers to a hierarchical (e.g., graph-based) network of additional service providers or subcontractors that may be communicated with by the service provider agents 108 to fulfill specific aspects of the data structures defining agreements between the service provider agents 108 and the entity agents 106. The network may be implemented as a dynamic, graph-based structure that represents the relationships and dependencies between various subcontractor agents. Each node in the network data structure can correspond to a unique subcontractor agent, defined by digital identity keys and operational capability descriptors, while edges can encode communication channels, dependency hierarchies, or cascading workflow triggers. The subcontractor network 124 may use smart contracts to manage and enforce cascading compliance requirements across multiple tiers of subcontractor agents. In some implementations, the agent management platform can instantiate, monitor, and enforce smart contract terms programmatically and propagate compliance verification logic through the subcontractor graph.

Figure 2:
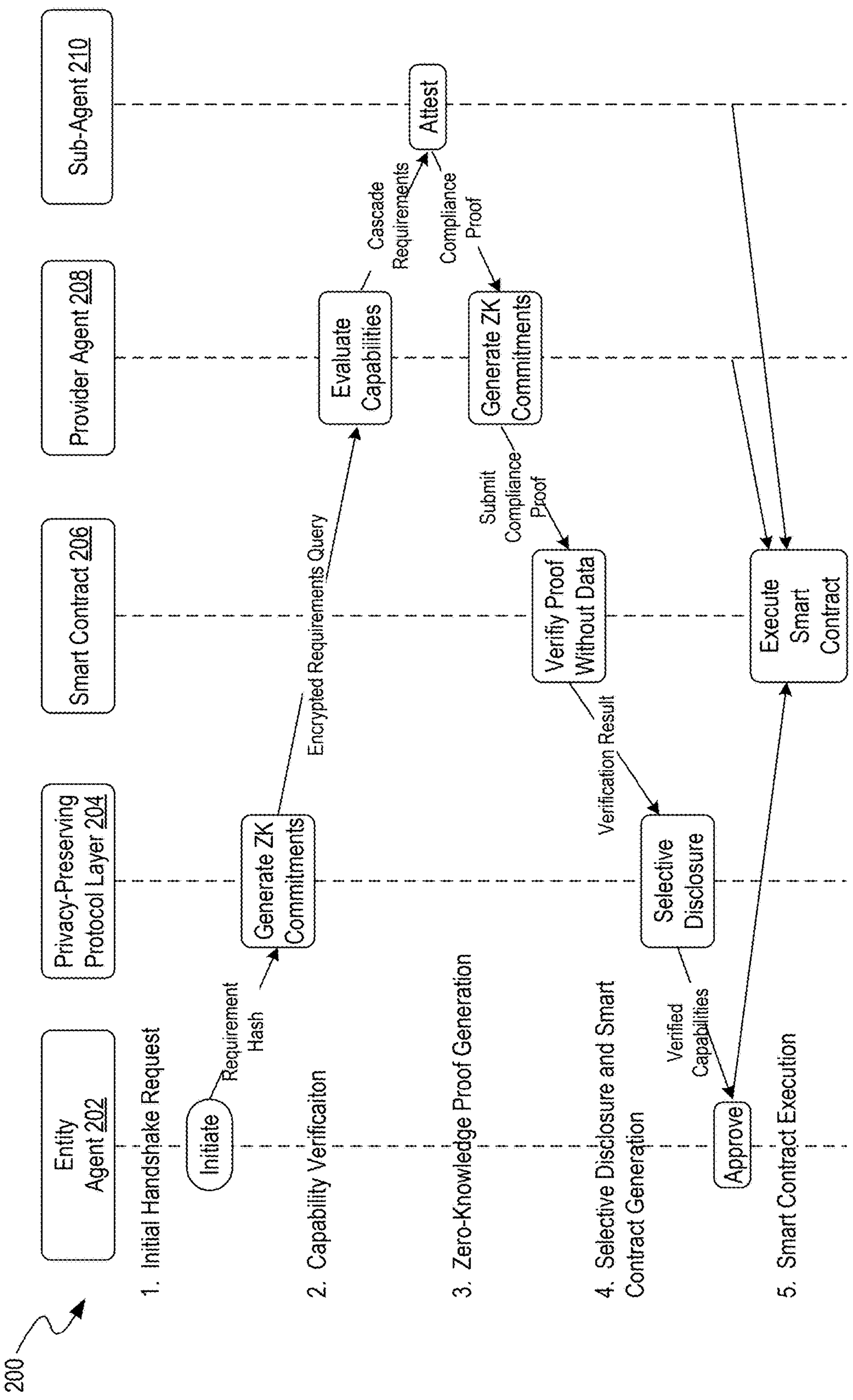
FIG. 2 illustrates an example environment of an agent management platform for verifying autonomous agents in multi-tiered distributed systems that include a sub-agent associated with a provider agent, in accordance with some implementations of the present technology.

FIG. 2 illustrates an example environment 200 of an agent management platform for verifying autonomous agents in multi-tiered distributed systems that include a sub-agent associated with a provider agent, in accordance with some implementations of the present technology. Environment 200 includes an entity agent 202 (e.g., the entity agents 106 in FIG. 1), privacy-preserving protocol layer 204, smart contract 206, provider agent 208 (e.g., the provider agents 108 in FIG. 1), and sub-agent 210. The sub-agent 210 is the same as or similar to the AI system 1900 illustrated and described in more detail with reference to FIG. 19. The environment 200 can be implemented using components of example computer system 2000 illustrated and described in more detail with reference to FIG. 20. Likewise, implementations of example environment 200 can include different and/or additional components or can be connected in different ways.

The entity agent 202 refers to an agent representing the primary organization (e.g., entity) in the multi-tiered distributed system (e.g., the entity agents 106 in FIG. 1). The entity agent 202 can generate an initial handshake request, which includes a cryptographic requirement hash. For example, the entity agent 202 constructs an initialization packet containing digitally encoded operational parameters and constraints. The parameters are transformed into a fixed-length, non-invertible digital summary, thereby ensuring that the operational data can be uniquely referenced without direct exposure. The resulting digital artifact can be referred to as a cryptographic commitment and can be transmitted to a privacy-preserving protocol layer 204.

The privacy-preserving protocol layer 204 is enabled to facilitate secure and confidential interactions between the various agents in the system. Upon receiving the requirement hash from the entity agent 202, this privacy-preserving protocol layer 204 generates zero-knowledge (ZK) commitments, or additional binding values (i.e., commitments that securely reference but do not expose values of the original dataset). The values can be linked to their source data via collision-resistant transformations and can include random secret values to prevent reverse engineering. The privacy-preserving protocol layer 204 enables computational routines (such as verification of agent capabilities) to be executed on encrypted or obfuscated data inputs, such that assertions about agent compliance or resource sufficiency can be verified by external parties without the underlying operational data being revealed.

The smart contract 206 refers to a self-executing program deployed on a distributed ledger or blockchain infrastructure. The smart contract 206 can implement zero-knowledge proof verification to validate compliance proofs submitted by the provider agent 208. The provider agent 208 refers to an agent representing a service provider or vendor in the multi-tiered system (e.g., the provider agents 108 in FIG. 1). The provider agent 208 receives encrypted requirements queries and evaluates the respective capabilities of the provider agent 208 against these requirements. The provider agent 208 can generate and submit compliance proofs.

In some implementations, the requirements query from the smart contract 206 includes cascading requirements. Cascading requirements refer to a hierarchical set of operational, regulatory, or contractual obligations that originate from a primary contracting entity and are enforced across every tier of participating service agents, ensuring that not only provider agent 208 but also any associated sub-agent 210 adheres to the same standards. When the provider agent 208 receives these upstream requirements, the provider agent 208 can determine which obligations are applicable to each sub-agent under its domain. For example, the provider agent 208 can generate a subset of requirements applicable to a sub-agent 210 by applying one or more field filters on the requirements. The provider agent 208 can transmit the resulting subset of requirements to the sub-agent 210.

The sub-agent 210 refers to an agent operating under the purview of the provider agent 208. Upon receiving cascaded requirements, the sub-agent 210 can verify its compliance by running self-diagnostic routines, analyzing historical performance data, or conducting near-real-time or real-time capability assessments. The sub-agent 210 generates its own artifacts, such as ZK commitments, which can be aggregated or composed with those of the provider agent 208. These artifacts can be relayed upstream to provider agent 208, who aggregates and/or verifies them prior to generating an overall compliance proof for submission to the contracting entity or smart contract layer. The smart contract 206 and/or the entity agent 202 can verify incoming proofs, generated and submitted by the provider agent 208 and/or the sub-agent 210, against predefined compliance conditions whose parameters correspond to the commitment artifacts transmitted earlier in the process. Upon successful validation of these proofs by the smart contract 206 and/or the entity agent 202, the smart contract 206 autonomously updates the shared ledger.

Figure 3:
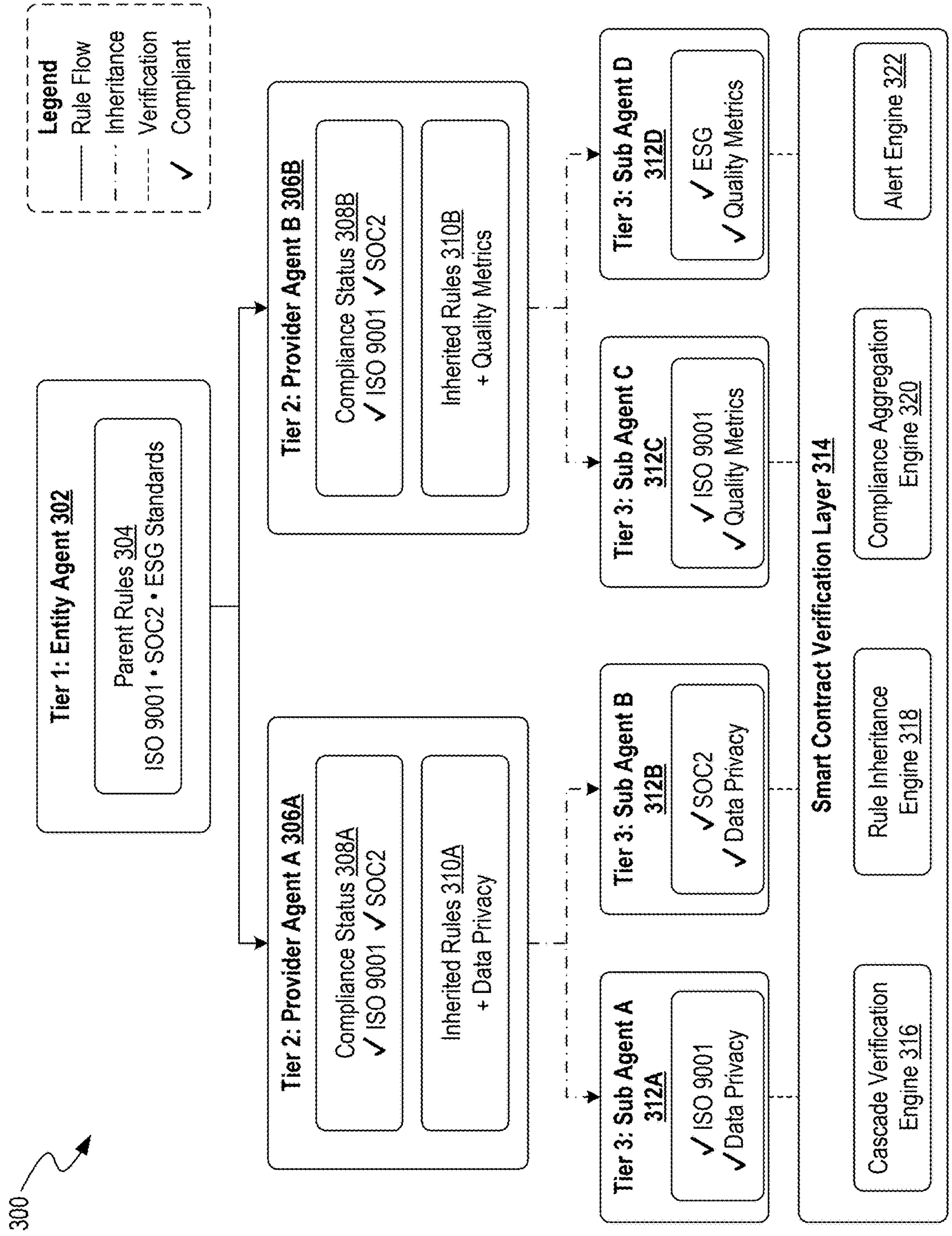
FIG. 3 illustrates an example environment of an agent management platform for verifying autonomous agents in multi-tiered distributed systems that include multiple provider agents and sub-agents, in accordance with some implementations of the present technology.

FIG. 3 illustrates an example environment 300 of an agent management platform for verifying autonomous agents in multi-tiered distributed systems that include, for an entity agent 302 (e.g., the entity agent 202 in FIG. 2, the entity agents 106 in FIG. 1), multiple provider agents 306 (e.g., a first provider agent 306A, a second provider agent 306B, and so forth) and sub-agents (e.g., a first sub-agent 312A, a second sub-agent 312B, a third sub-agent 312C, a fourth sub-agent 312D, and so forth), in accordance with some implementations of the present technology. The environment 300 can be implemented using components of example computer system 2000 illustrated and described in more detail with reference to FIG. 20. Likewise, implementations of example environment 300 can include different and/or additional components or can be connected in different ways.

The entity agent 302 is instantiated as an autonomous or semiautonomous software module representing the primary organization's computational authority in a distributed, multi-tiered system. The entity agent 302 defines and/or maintains the parent rules 304, which operate to provide global requirement specifications for all subordinate nodes and agents throughout the system. These rules may cover technical standards, operational thresholds, security benchmarks, and compliance objectives (e.g., categories such as quality management, information security, and sustainability). In the illustrated example, the parent rules 304 include ISO 9001 quality management standards, SOC2 information security standards, and ESG (environmental, social, and governance) criteria. The parent rules 304 can be implemented as a dynamic, graph-based data structure to enable rule propagation and inheritance across multiple tiers. Each rule node can include metadata, conditional logic, and pointers to child rules for inheritance. If a parent rule is updated based on downstream feedback or external regulatory triggers, the change can be automatically distributed through the graph, thereby updating the rule subsets for each downstream provider agent or sub-agent. The parent rules 304 can include self-modifying code elements that enable automated updates based on feedback from lower tiers and/or external regulatory changes (e.g., automatically increasing security requirements if new risks are detected or downgrading thresholds upon regulatory relaxation).

The provider agents 306 (e.g., first provider agent 306A, second provider agent 306B) refer to second-tier (or lower-tier) agents representing service providers or vendors within the multi-tiered network. The provider agents 306 can interpret and implement particular subsets of the parent rules 304. Each provider agent can maintain its own digital compliance status 308 (e.g., first compliance status 308A, second compliance status 308B), which can be implemented as an updatable data object or transaction log that records the agent's current adherence to technical, operational, and contractual standards. Status updates can be computed via continuous assessments. For example, provider agents automatically ingest operational logs, telemetry data, and workflow outputs, then execute probabilistic, rule-based algorithms to determine and revise the real-time state of compliance. Status objects can generate and export cryptographically signed attestations or proofs, enabling compliance states to be independently verified by upstream agents or the system's smart contract layer.

The inherited rules 310 (e.g., first inherited rule 310A, second inherited rule 310B) refer to subsets of the parent rules 304 that are specifically associated with each provider agent and its associated sub-agents. For example, a rule inheritance engine (such as rule inheritance engine 318, detailed below) can parse the rule graph to identify and filter the specific requirements applicable to each agent's operational context, resource capabilities, and contractual obligations. The output is a machine-readable structure for each inherited rule (e.g., first inherited rule 310A on data privacy, second inherited rule 310B on quality metrics), with metadata tags linking each inherited rule back to its parent.

The sub-agents 312 (e.g., first sub-agent 312A, second sub-agent 312B, third sub-agent 312C, fourth sub-agent 312D) refer to agents operating under the purview of the provider agents. Each sub-agent 312 receives its assigned inherited rules 310, parses rule logic, and executes local verification routines to determine its own degree of compliance. The sub-agents 312 may form collaborative groups and execute multi-party computation protocols that enable the sub-agents 312 to jointly compute aggregate compliance metrics or execute shared compliance verification tasks. For example, the sub-agents 312 contribute encrypted data shares or partial proofs so that no single entity learns the complete operational data of another; yet, the system can still collectively determine the state of compliance across all collaborating sub-agents.

The smart contract verification layer 314 refers to a blockchain-based infrastructure that enables automated compliance verification and enforcement across all tiers of the system. The smart contract verification layer 314 hosts smart contracts that receive compliance data, proofs, and attestations from agents and execute deterministic verification routines encoded as program logic. The smart contract verification layer 314 can include a cascade verification engine 316, which propagates and verifies compliance requirements from the top tier down to the sub-agents. The cascade verification engine 316 can use directed acyclic graph (DAG) structures of verification dependencies to map which agents and which compliance tasks must be fulfilled before system-wide compliance is recognized. As compliance proofs are submitted, the engine traverses the DAG, validating each dependency and updating network state accordingly.

The rule inheritance engine 318 refers to a module that manages the dynamic generation and adaptation of inherited rules for each tier. The rule inheritance engine 318 accepts as input the parent rule graph and agent profile data, then applies inheritance policies and prioritization logic to output a customized set of inherited rules for every downstream agent. The rule inheritance engine 318 can continuously adapt rule assignments as new agents come online, as feedback or compliance reports are received, and/or as parent rules are updated, thereby ensuring all rule propagation is contextually accurate and up-to-date throughout the distributed network.

The compliance aggregation engine 320 can collect and synthesize compliance data streams from multiple provider agents and sub-agents. The compliance aggregation engine 320 can use weighted scoring to combine the disparate data into an overall compliance report or status object reflecting the state of the entire multi-agent, multi-tiered system. Results can be stored as machine-readable records.

The alert engine 322 refers to a near-real-time or real-time monitoring and notification system that detects and reports compliance violations or anomalies. The alert engine 322 can evaluate compliance data and system telemetry in near-real time or real time. When a violation or anomaly is detected, the alert engine 322 triggers automated notifications (such as digital alerts or on-chain events), and can include diagnostic data or remediation instructions. All alerts can be logged for auditability, and the alert engine's 322 thresholds and response behaviors can be dynamically adjustable based on evolving system states.

Figure 4:
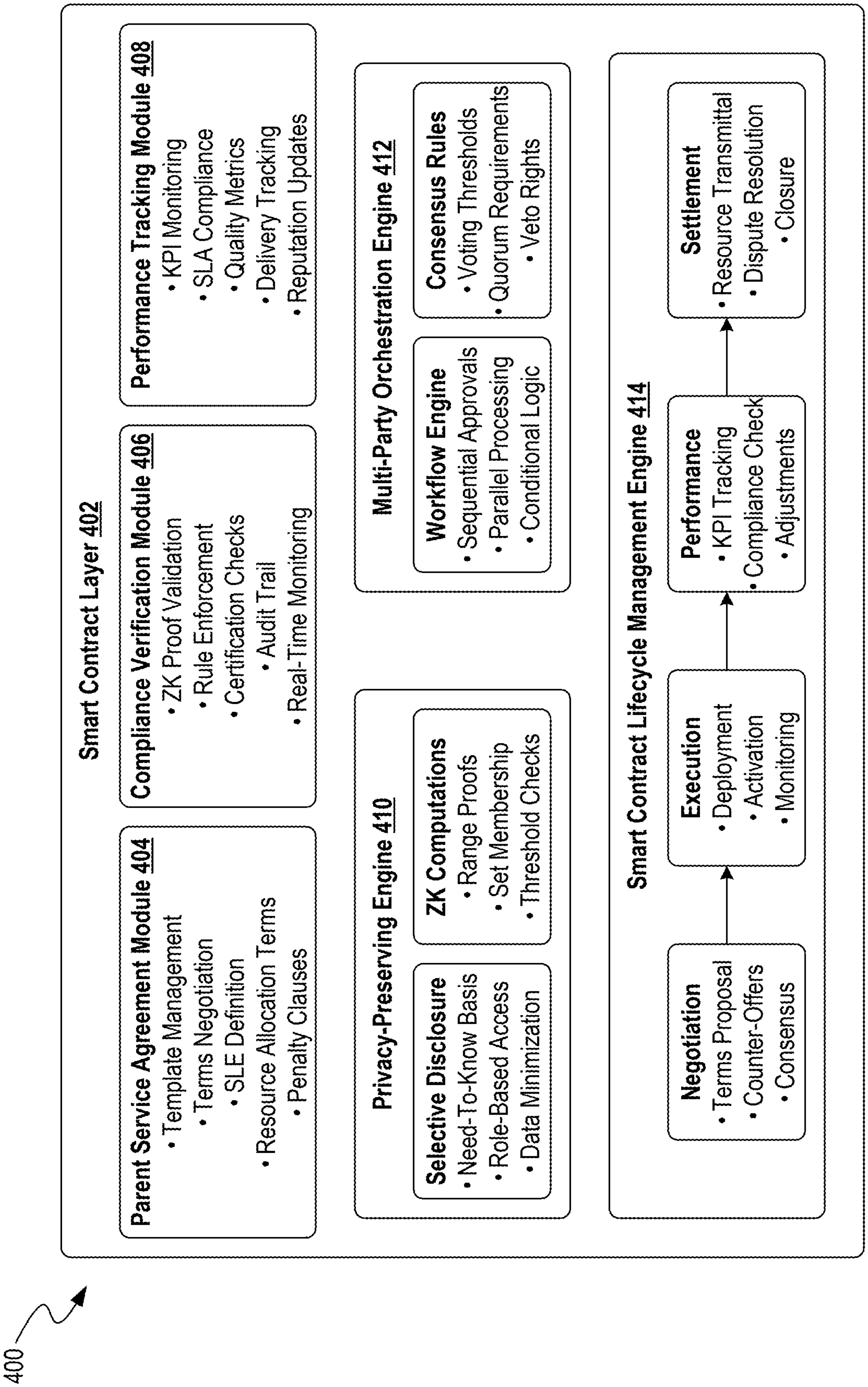
FIG. 4 illustrates an example environment of a smart contract layer within an agent management platform for verifying autonomous agents in multi-tiered distributed systems, in accordance with some implementations of the present technology.

FIG. 4 illustrates an example environment 400 of a smart contract layer 402 within an agent management platform for verifying autonomous agents in multi-tiered distributed systems, in accordance with some implementations of the present technology. The smart contract layer 402 includes a parent service agreement module 404, a compliance verification module 406, a performance tracking module 408, a privacy-preserving engine 410, a multi-party orchestration engine 412, and a smart contract lifecycle management engine 414. The environment 400 can be implemented using components of example computer system 2000 illustrated and described in more detail with reference to FIG. 20. Likewise, implementations of example environment 400 can include different and/or additional components or can be connected in different ways.

The parent service agreement module 404 refers to a software component managing the formation, adaptation, and enforcement of obligations between the entity agent and downstream provider or sub-agent entities within the multi-tiered system. The parent service agreement module 404 enables the generation of standardized templates that can be dynamically instantiated according to specific agent roles, protocol state, or service context. Upon initiation, historical interaction data and machine-readable business rules can be used to forecast negotiation outcomes or proactively suggest amendments to the contractual terms. The parent service agreement module 404 can manage Service Level Expectation (SLE) definitions by translating requirements within smart contracts or agreements into measurable technical parameters (e.g., latency thresholds, uptime guarantees) and encoding these as monitorable variables inside smart contracts. During operation, the parent service agreement module 404 can track resource allocation states, such as payment flows or token-based disbursements, and trigger automated, condition-based value transfers when predefined thresholds or service proofs are detected on-chain. For enforcement, the parent service agreement module 404 maintains digitally encoded penalty clauses, such that if a monitored parameter falls out of compliance, the parent service agreement module 404 programmatically invokes corresponding penalty routines (e.g., withholding or debiting digital assets) without manual intervention.

The compliance verification module 406 uses ZK proof validation to enable parties to verify compliance without revealing sensitive underlying data. For example, when an agent claims compliance with a contractual obligation, the compliance verification module 406 receives a proof package structured to conceal underlying sensitive data. The compliance verification module 406 can check contract execution against predefined compliance criteria, triggering alerts or actions when deviations are detected. Validation processes can be fully automated, on contract execution or at scheduled compliance checkpoints, and can initiate protocol-defined responses or alert routines if deviations or violations are detected. The compliance verification module 406 can conduct certification checks by interfacing with external systems to validate and update the certification status of involved parties. The compliance verification module 406 maintains an audit trail by recording compliance-related activities and verifications in a blockchain-based log.

The performance tracking module 408 monitors and evaluates the operational execution of the smart contracts. The performance tracking module 408 ingests event logs, telemetry streams, and data feeds from agent interfaces and external sensors, such as IoT devices monitoring delivery or production metrics. The performance tracking module 408 parses contract terms to derive quantifiable performance indicators, translates these requirements into runtime queries, and then compares observed system behavior with expected benchmarks (e.g., SLA parameters, performance thresholds). As performance is measured against each benchmark, the performance tracking module 408 can automatically record trend data, detect anomalies or deviations, and/or update the compliance status signals for each involved party. The performance tracking module 408 can perform reputation updates, aggregating performance data to dynamically adjust trust or reliability indices/scores for involved parties (as described below in further detail with reference to FIG. 5), which can influence future execution parameters of the smart contract.

The privacy-preserving engine 410 enables parties to reveal only the required information on a need-to-know basis using role-based access controls to ensure that data and contract functionalities are accessible only to authorized entities based on their defined roles and permissions within the system. For example, each data transaction or contract function call is checked against an authenticated role and permission set. The privacy-preserving engine 410 enables operations to run directly on encrypted, tokenized, or obfuscated data structures, using techniques such as range evaluation, set membership approximation, or threshold validation, so that only the outcome (e.g., whether a number falls within a range or a status is affirmative) is revealed to the querying party rather than the underlying raw value. For example, the privacy-preserving engine 410 can use range proofs to demonstrate that a value falls within a specified range without disclosing the actual value, set membership verifications to prove inclusion in a set without revealing other set elements, and/or perform threshold checks to validate that certain conditions are met without exposing the specific data points involved in the evaluation.

The multi-party orchestration engine 412 uses a workflow engine to manage sequential approvals, ensuring that contract actions or state transitions occur in a predefined order and only when particular conditions are met. The multi-party orchestration engine 412 can use consensus rules that define how agreement is reached among multiple parties, which can include voting thresholds specifying the level of agreement required for different types of decisions, quorum requirements ensuring that a minimum number of participants are involved in decision-making processes, veto rights that allow designated parties to block certain actions under specified conditions, and so forth.

The smart contract lifecycle management engine 414 can manage a negotiation phase to facilitate the proposal of contract terms, respond to counter-offers through automated or semiautomated processes, and/or coordinate consensus among involved parties. The smart contract lifecycle management engine 414 tracks contract activation triggers, whether event-driven, time-based, or KPI-dependent, and monitors ongoing performance and compliance by ingesting near-real-time or real-time system data and executing rule-based state evaluation routines. The smart contract lifecycle management engine 414, for example, tracks KPIs, performs ongoing compliance checks, and executes adjustments to contract parameters or execution based on observed outcomes or changing conditions. In the settlement phase, the smart contract lifecycle management engine 414 manages resource (e.g., payment) releases by, for example, interfacing with digital payment systems. The smart contract lifecycle management engine 414 can manage dispute resolution processes that can include automated arbitration or integration with external dispute resolution systems. The smart contract lifecycle management engine 414 can further manage contract closure, ensuring all obligations are fulfilled, all parties are notified, and/or that the contract state is archived for future reference or audit purposes.

Figure 5:
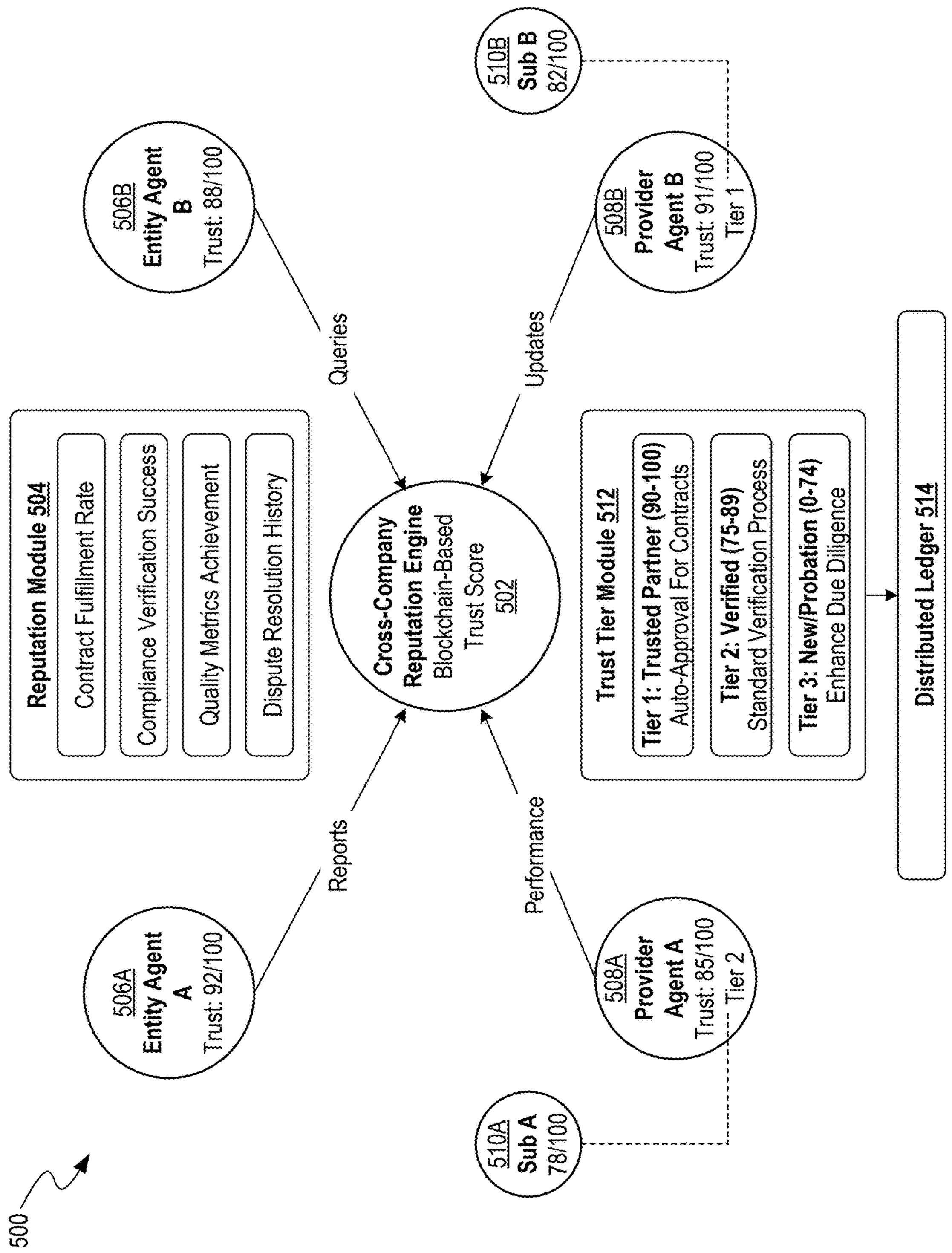
FIG. 5 illustrates an example environment of a reputation engine within an agent management platform for verifying autonomous agents in multi-tiered distributed systems, in accordance with some implementations of the present technology.

FIG. 5 illustrates an example environment 500 of a reputation engine 502 within an agent management platform for verifying autonomous agents in multi-tiered distributed systems, in accordance with some implementations of the present technology. The environment 500 can be implemented using components of example computer system 2000 illustrated and described in more detail with reference to FIG. 20. Likewise, implementations of example environment 500 can include different and/or additional components or can be connected in different ways.

The reputation engine 502 aggregates, processes, and maintains digital trust scores for agents (including entity agents, provider agents, and/or sub-agents) operating within the multi-tiered distributed system. The reputation engine 502 can continuously collect performance data, operational logs, compliance outcomes, and dispute resolution records from multiple system modules and external sources via authenticated data feeds. Upon receipt, the engine stores raw and processed data in a distributed ledger, such as a blockchain. Computational routines can be periodically executed on this data to recalculate trust scores based on updated metrics or changing network context. The reputation engine 502 exposes transaction endpoints through which agents can submit new records, query current scores, or request aggregated reports.

The reputation module 504 defines the concrete parameters and operational metrics used to compute trust scores for each agent. The reputation module 504 can encode a set of scoring metrics, which may include contract fulfillment rate (quantifying on-time and complete delivery of agreed tasks), compliance verification success (measuring the agent's historical adherence to requirements and standards), quality metric achievement (scoring based on objective outcomes such as error rate, defect absence, or service consistency), and dispute resolution history (capturing the agent's track record for resolving conflicts within protocol parameters). Data for the metrics can be ingested as time-series logs. Metric weightings can be dynamically recalibrated by system administrators or in response to particular received data signals (e.g., changes in sub-agents, provider agents, entity agents, and so forth).

The entity agents 506 (e.g., first entity agent 506A, second entity agent 506B) refer to agents representing primary organizations within the network. The entity agents 506 can transmit digitally signed operational reports, submit event records for scoring, and/or query the reputation engine 502 for up-to-date trust scores on itself or third parties. Trust scores for entity agents 506, such as the illustrative 92/100 (for agent 506A) and 88/100 (for agent 506B), can be computed through the weighted aggregation of the metrics provided by the reputation module 504. The reputation engine 502 can reconfigure weights based on factors such as industry vertical, contract type, or network risk signals. Updated trust scores can be recorded as transaction entries to the distributed ledger.

The provider agents 508 (e.g., first provider agent 508A, second provider agent 508B) refer to agents representing service providers or vendors. The provider agents 508 collect and submit quantitative performance data, such as delivery punctuality, transaction accuracy, and compliance proof submissions, to the reputation engine 502, where the data is used to update their corresponding trust scores (e.g., provider agent 508A: 85/100, provider agent 508B: 91/100). Trust scores can directly influence automated classification into tiers, which can be referenced by smart contracts and the multi-party orchestration engine for determining workflow paths, verification requirements, and/or permission or settlement protocols. The provider agents can receive automated trust score updates at a conclusion of each transactional or monitoring cycle.

The sub-agents 510 (e.g., first sub-agent 510A, second sub-agent 510B) refer to third-tier AI systems operating under the purview of provider agents. The trust scores for sub-agents (e.g., 510A: 78/100, 510B: 82/100) can be determined using hierarchical aggregation logic, in which a sub-agent's performance data is evaluated both independently (via direct metrics) and in the context of its parent provider agent's reputation footprint. Thus, trust signals can be weighted or modified by the performance and standing of supervising agents.

The trust tier module 512 can categorize agents into predefined categories or "tiers" (e.g., Tier 1, Tier 2, Tier 3) according to configurable threshold criteria. For instance, Tier 1 may be reserved for trust scores in the 90-100 range, enabling privileges such as smart contract auto-approval, whereas lower tiers (e.g., Tier 2:75-89, Tier 3:0-74) may impose graduated verification, additional review steps, or additional due diligence requirements. The module can dynamically shift tier boundaries in response to environmental signals, such as systemic changes in network risk, new regulatory mandates, or altered transaction volume.

The distributed ledger 514 refers to the underlying blockchain infrastructure that stores and validates reputation-related transactions and/or trust scores. Smart contracts deployed on the distributed ledger 514 automate the execution of reputation calculations, tier assignments, and access control based on trust scores. Transactions, reputation updates, and tier assignments can be encoded as cryptographically hashed, append-only record objects, providing an immutable audit trail and non-repudiable evidence chain for all trust management activities. The distributed ledger 514 exposes API endpoints to modules across the platform for both data retrieval and transactional submission.

Figure 6:
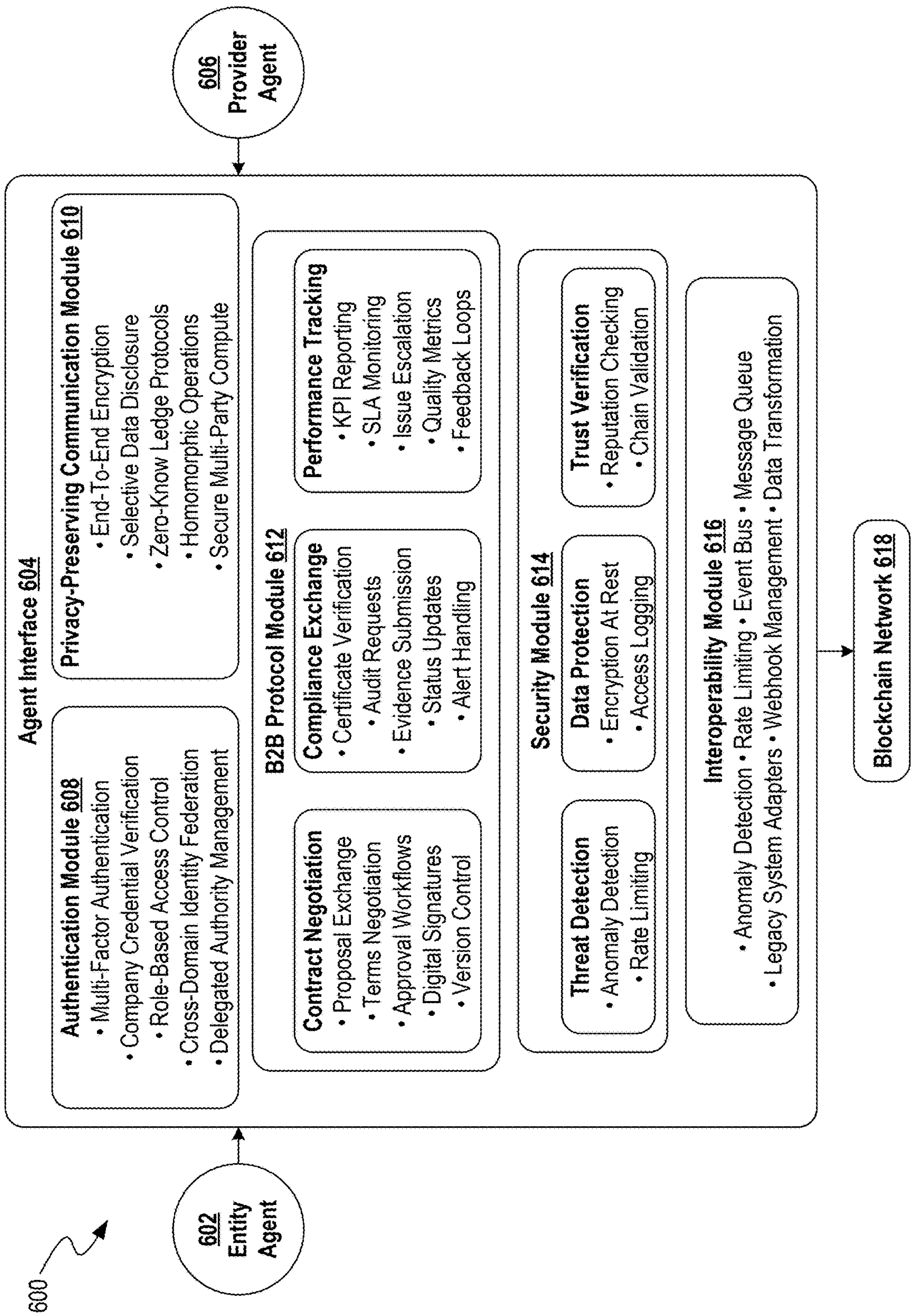
FIG. 6 illustrates an example environment of an agent interface within an agent management platform for enabling communication between autonomous agents in multi-tiered distributed systems, in accordance with some implementations of the present technology.

FIG. 6 illustrates an example environment 600 of an agent interface 604 within an agent management platform for enabling communication between autonomous agents in multi-tiered distributed systems, in accordance with some implementations of the present technology. The environment 600 can be implemented using components of example computer system 2000 illustrated and described in more detail with reference to FIG. 20. Likewise, implementations of example environment 600 can include different and/or additional components or can be connected in different ways.

The environment 600 includes an entity agent 602, the agent interface 604, and a provider agent 606. The agent interface 604 operates as an intermediary layer between different autonomous agents and provides a standardized set of protocols and services for inter-agent communication. The agent interface 604 includes an authentication module 608, a communication module 610, a protocol module 612, a security module 614, an interoperability module 616, and a network 618.

The authentication module 608 can be used to verify the identity and credentials of agents attempting to interact with the system. The authentication module 608 can implement multi-factor authentication, which may combine various authentication methods such as digital certificates, biometric data, and time-based one-time passwords. When an agent initiates a session or requests access to a protected operation, it submits authentication credentials, which may include digital certificates, biometric vectors, or one-time digital tokens. The authentication module 608 can compile these credentials into an authentication request, which is then compared against verifiable credential records stored within a distributed identity management registry. By employing digital signatures and time-based proofs, the authentication module 608 can ensure both the origin and validity of submitted credentials. Role-based access assignments can be invoked. Once authenticated, each agent's unique identity can be mapped to a predefined role that encodes permissions for actions and data access within the system. The authentication module 608 can enable federated authentication, allowing agents validated in external domains with compatible protocols to gain time-bound or task-specific authorization, managed through temporary access tokens and enforced expiration logic. All authentication and authorization events can be written as immutable logs, providing a permanent and auditable transaction trail.

The privacy-preserving communication module 610 uses end-to-end encryption to ensure that data remains secure throughout its transmission. Each communication session can generate a negotiated encryption context, so that transmitted packets are only intelligible to authorized senders and recipients. For interactions requiring minimal disclosure, the privacy-preserving communication module 610 can extract only the verification statements from agent data, then package the statements as proofs or attestations, which are relayed to requesting agents or subsystems. All non-essential data (i.e., data that is not the verification statement) can be withheld from transmission. When agents establish that they possess (or comply with) certain knowledge, rules, or properties without exposing the details, the privacy-preserving communication module 610 can generate and validate proof objects that confirm properties without disseminating the protected data. In collaborative scenarios involving multiple agents, the privacy-preserving communication module 610 enables computation routines that allow joint calculation or protocol advancement based solely on exchanged, privacy-preserving proofs, so that no party gains access to another's underlying inputs.

The business-to-business (B2B) protocol module 612 manages the interactions and data exchanges specific to entity-to-entity operations. Data packets including proposals, negotiation terms, and/or approval workflows can be formatted into standardized, machine-readable documents. When an entity submits a proposal, the B2B protocol module 612 routes the proposal to the recipient agent, which can accept, modify, or reject the proposal. Approved terms can be automatically registered as transaction records on the platform. For ongoing relationships, the B2B protocol module 612 can perform periodic transmission and archiving of KPI data, service level reports, and incident or escalation notices.

The security module 614 implements threat detection operations to identify potential security threats in real time or near-real time. As data and interaction requests flow through the platform, the security module 614 continuously inspects all payloads, session states, and event logs for anomalous patterns, unauthorized signatures, or deviations from known baselines of trusted agent behaviors. Whenever an interaction originates from an agent, the security module 614 cross-references the agent's trust profile (as derived from an internal reputation system or external trust registry) to determine whether access constraints should be applied. Should a pattern indicative of attack or policy violation be detected, the security module 614 automatically generates alerts, initiates session quarantines, or triggers protocol-level blocks.

The interoperability module 616 coordinates communications and protocol conversions between the current platform and external or legacy systems. The interoperability module 616 maintains an event bus, which refers to an internal messaging infrastructure that receives, packages, and sequentially distributes events, data packets, or notifications to all relevant modules. Upon receiving data from outside systems, the interoperability module 616 adapts and transforms legacy or non-standard data formats to the agent management platform's schema, validates external signatures, and injects integration events onto the bus. In reverse, when outgoing communications target older or third-party systems, the interoperability module 616 translates structured records into compatible formats and manages delivery channels.

The blockchain network 618 refers to the underlying distributed ledger technology that enables immutable recording of transactions and interactions between agents. Each agent or organization may operate a node within this network, which receives transaction proposals, bundles them into blocks, and participates in decentralized validation cycles. Upon reaching protocol consensus, new blocks are appended to the shared ledger, and all network participants synchronize their local copies, ensuring a single, non-repudiable source of truth. Contract terms, permissions changes, dispute resolutions, and audit logs can be stored as structured records within the ledger. Smart contracts deployed to the blockchain automate the enforcement of agreement conditions. When conditions are satisfied or violated by agent actions, the contracts autonomously trigger or prevent subsequent operations (such as payment release or service continuation).

Figure 7:
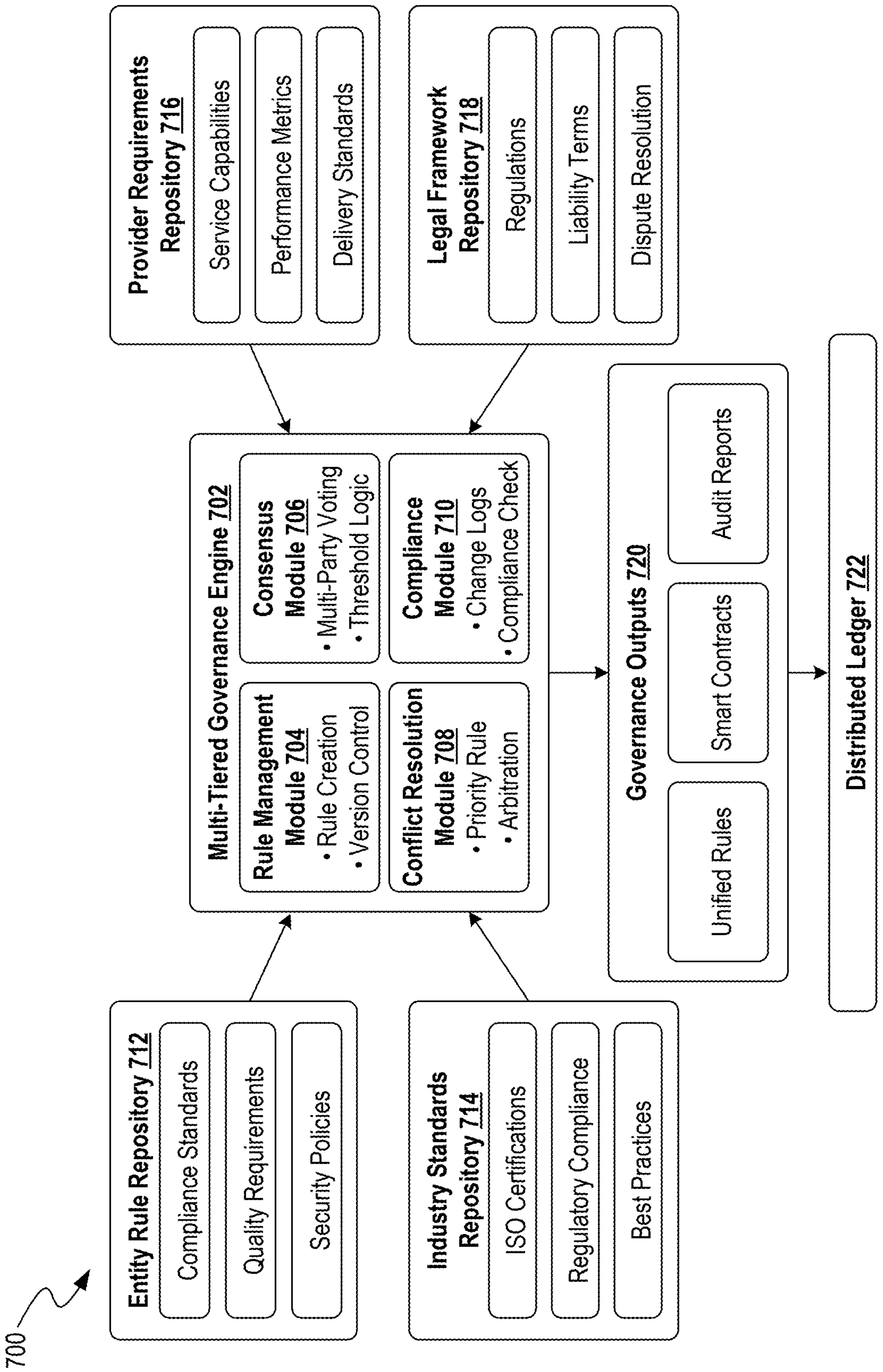
FIG. 7 illustrates an example environment of a governance engine within an agent management platform defining operative boundaries of autonomous agents in multi-tiered distributed systems, in accordance with some implementations of the present technology.

FIG. 7 illustrates an example environment 700 of a governance engine within an agent management platform defining operative boundaries of autonomous agents in multi-tiered distributed systems, in accordance with some implementations of the present technology. The environment 700 can be implemented using components of example computer system 2000 illustrated and described in more detail with reference to FIG. 20. Likewise, implementations of example environment 700 can include different and/or additional components or can be connected in different ways.

The governance engine 702 refers to a modular computational subsystem that can be implemented as a federated service using distributed microservices, or as a containerized software runtime within a cloud environment, and is configured to ingest, process, normalize, and propagate governance policies and requirements across the agent management platform. The governance engine 702 can receive inputs such as rule definitions, change proposals, compliance logs, contract state transitions, and external legal updates and transform these inputs into actionable governance outputs and audit artifacts consumed by downstream modules using, for example, rule-based mappings.

Within the governance engine 702, the rule management module 704 operates to generate and/or update machine-readable rule sets and governance logic. The rule management module 704 may provide user-facing APIs or agent-accessible endpoints for submission, validation, and approval of new or revised rules. When a new rule is added, the rule management module 704 can store the rules as persistent objects, which can be appended with metadata such as authorship, version sequence, timestamps, and digital signatures. Rule updates and deprecations can be similarly managed, with each event producing immutable change records. In some implementations, the rule management module 704 may be integrated with external policy sources or receive input from industry-specific domain ontologies.

The consensus module 706 mediates multi-party decision-making regarding policy adoptions, updates, or dispute adjudications. The consensus module 706 aggregates stakeholder votes, agent endorsements, or digital ballots according to predetermined voting schemas, such as majority, supermajority, or weighted-reputation methods, and continuously transforms submitted votes into single, deterministic consensus results. The consensus module 706 can validate submitted ballots for authenticity and eligibility, compute attested outcomes, and propagate consensus state changes to other system modules.

The conflict resolution module 708 detects, logs, and/or resolves policy or data conflicts that may arise from asynchronous actions, competing rule updates, or network-level adversarial behavior. The conflict resolution module 708 ingests divergent state records, contradictory rule changes, or evidence of operational anomaly and executes rule-based or adjudication workflows for alignment, rollback, or dispute mediation. Conflict resolution can include automated precedence logic, voting resolution by a select panel, or escalation to external arbiters (e.g., administrators). Each resolution operation can be logged with immutable event records, such as before-and-after state hashes.

The compliance module 710 validates agent and workflow conformance with approved rules, contract clauses, and regulatory requirements. The compliance module 710 receives compliance criteria from the rule management module, applies these checks to event streams and agent actions (such as transaction logs or resource allocation events), and/or records the outcome of each compliance assessment as a machine-readable verdict (e.g., pass/fail, out-of-bounds, or escalation-needed). The compliance module 710 can trigger automated enforcement actions, such as penalties, role adjustments, or notifications to other governance elements in the case of detected violations.

The entity rule repository 712 refers to a persistent, version-controlled data store for storing rules and policies authored by or otherwise associated with the primary organizational entity. The entity rule repository 712 may be implemented as a distributed, append-only ledger, a cloud-based document datastore, or a blockchain state channel backing and stores each rule entry with structured metadata and historical lineage to support provenance and audit tracing. Rule entries can be retrieved by authorized governance engine components to inform real-time compliance, update cascades, or versioned change reconciliations.

The industry standards repository 714 refers to a persistent storage and retrieval subsystem maintaining externally sourced or standardized policy objects, such as ISO standards, industry frameworks, or regulatory reference rulesets. The industry standards repository 714 can operate both as a near-real-time or real-time policy lookup (enabling the governance engine to map internal rules to external obligations) as well as a historical policy audit log (storing timestamped records of standards in effect at any given time). The industry standards repository 714 can receive inputs from third-party data feeds or manual data import. The provider requirements repository 716 refers to a structured data store identifying input requirements stipulated by providers, vendors, or external agents interacting with the platform. The provider requirements repository 716 ensures that provider-specific obligations, such as quality metrics, delivery guarantees, or compatibility thresholds, are encoded as structured objects, transformed to match internal taxonomies, and evaluated against respective agents for operational alignment. The legal framework repository 718 refers to a database that manages codified legal requirements and regulatory provisions applicable to the system and its agents. The legal framework repository 718 can be updated with jurisdictional and cross-jurisdictional legal texts, statutory obligations, and case law and operates to provide an authoritative reference during rule design, compliance checks, or dispute resolutions. Repository entries can be annotated to indicate applicable regions, effective dates, and citation sources.

Governance outputs 720 refer to the collection of artifacts generated by the governance engine 702 to identify system policies, compliance verdicts, and audit traces. Governance outputs 720 may include signed compliance certificates, change-of-state notifications, escalation alerts, conflict resolution records, and machine-readable configuration changes. Governance outputs 720 can be formatted for automated consumption by other system modules, downstream agents, or audit platforms. The distributed ledger 722 can validate and/or store the governance outputs 720 and can supply synchronous and/or asynchronous data access to system components and external auditors.

Figure 8:
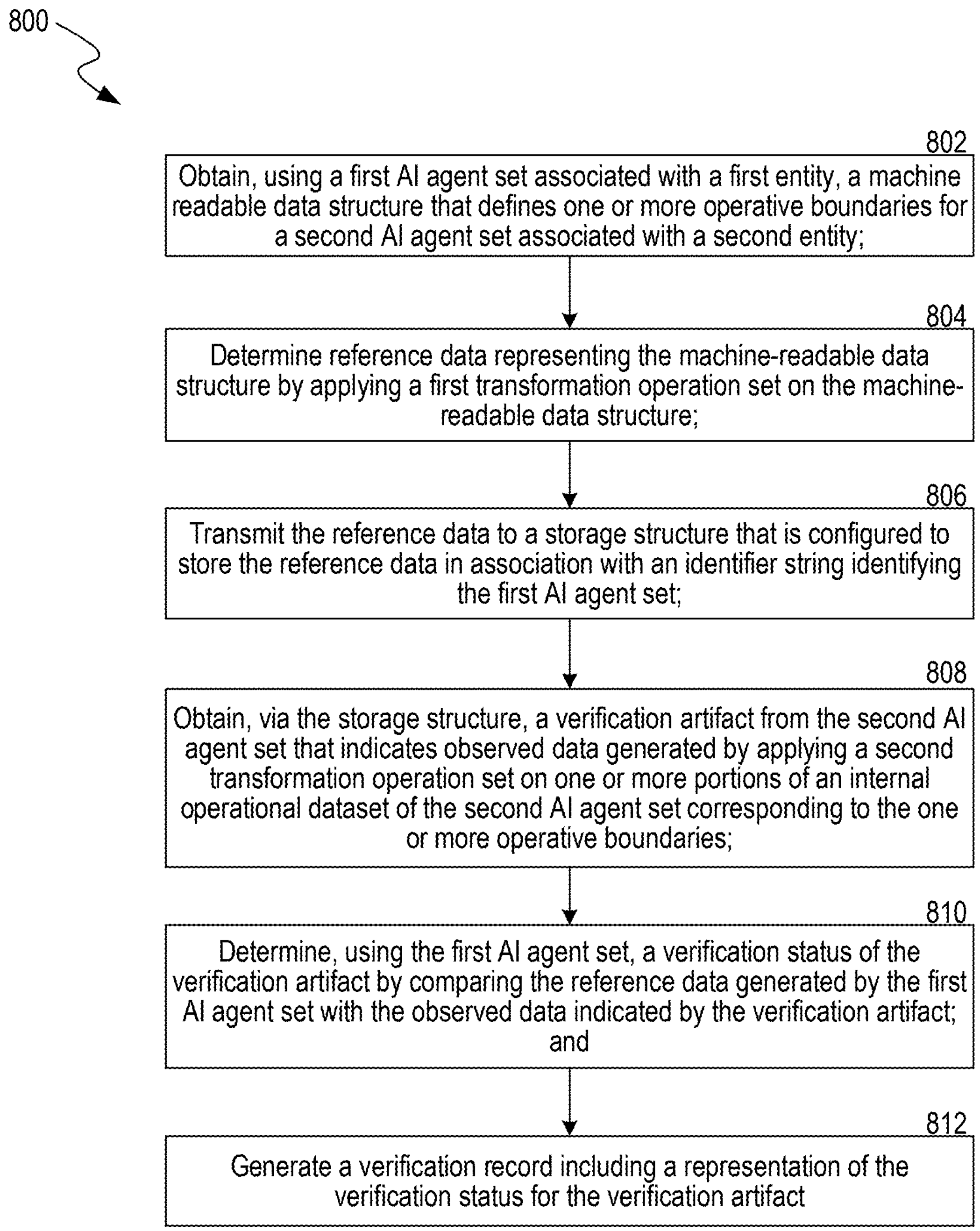
FIG. 8 is a flow diagram illustrating an example process of verifying autonomous agents in multi-tiered distributed systems using an agent management platform according to some implementations of the present technology.

FIG. 8 is a flow diagram illustrating an example process 800 of verifying autonomous agents in multi-tiered distributed systems using an agent management platform according to some implementations of the present technology. In some implementations, the process 800 is performed by a computer system, e.g., example computer system 2000 illustrated and described in more detail with reference to FIG. 20. Implementations can include different and/or additional operations or can perform the operations in different orders.

In operation 802, the agent management platform can obtain, using a first AI agent associated with a first entity (i.e., the primary organization), a machine-readable data structure (i.e., a requirements hash) that defines one or more operative boundaries for a second AI agent associated with a second entity (e.g., representing organizational guidelines, industry standards, or provider criteria). The machine-readable data structure can indicate permissible value ranges for model parameters (e.g., weight coefficients of a neural network) of a second AI agent (e.g., a provider agent), a data signal used in operation of the second AI agent (e.g., feature vectors, event traces), information related to a completed computational operation of the second AI agent (e.g., specifications of allowable outputs for completed computational operations such as a result set cardinality, data type conformance, or adherence to external regulatory normative), and the like. For example, the first AI agent can obtain the machine-readable data structure through an API call. If the operative boundary includes references to dynamic or externally sourced values (such as regulatory rules that change over time), the first AI agent fetches the current authoritative values from one or more predefined "trusted" sources. The first AI agent may be referred to herein also as an auditing AI agent and the second AI agent may be referred to herein also as a target AI agent.

In operation 804, the agent management platform can generate/determine a unique fixed reference value (e.g., reference data, or encrypted requirements query generated by privacy-preserving protocol layer) representing the machine-readable data structure by applying a first transformation operation set (e.g., a cryptographic hash function, a keyed hash function, or a deterministic encoding function) on the machine-readable data structure. To generate the unique fixed reference value representing the machine-readable data structure, the agent management platform can serialize the input structure, such as an object with nested fields and values, into a canonical byte sequence that captures its hierarchical arrangement and/or data content in a format agnostic to particular differences (such as field order or whitespace). The agent management platform can process the resulting byte sequence through a deterministic and/or fixed-size transformation operation by mapping the entire data structure, regardless of its original length or complexity, into a compact, uniquely identifying fixed-length output. Therefore, the agent management platform can generate the same output for any two semantically equivalent inputs, yet yield distinctly different results for even minor changes within the original data.

In operation 806, the agent management platform can transmit the unique fixed reference value to a multi-agent storage (e.g., storage structure such as a distributed ledger or blockchain). In some implementations, the storage structure is a distributed ledger. The verification record can be stored as a transaction on the distributed ledger. The multi-agent storage can include a memory structure accessible to multiple AI agents including the first AI agent and the second AI agent. The multi-agent storage can store the unique fixed reference value in association with an identifier, such as an identifier string (e.g., name or unique code), identifying the first AI agent. For example, before the transaction is transmitted, the agent management platform can digitally sign the transaction using a private cryptographic key of the submitting agent. The signed record can be broadcast to all nodes or participants in the storage structure, where the record can be checked and validated according to the agent management platform's rules for consensus. Once approved, the transaction can be permanently added to the storage structure.

In operation 808, the agent management platform can obtain/receive, via the multi-agent storage, a verification artifact (e.g., compliance proof) from the second AI agent that indicates an observed value (e.g., a commitment value) generated by applying a second transformation operation set (e.g., a different hash/binding function such as a a cryptographic hash function, a cryptographic commitment, or a zero-knowledge proof) on one or more portions of an internal operational dataset of the second AI agent corresponding to the one or more operative boundaries.

In some implementations, the second AI agent generates a transaction that includes the artifact (such as the hash or proof) and transmits the transaction to a blockchain or distributed ledger, where it is stored immutably and associated with the submitting second AI agent's unique identifier. In some implementations, the artifact is uploaded to a shared cloud repository or decentralized file system with an indexed reference stored on a ledger. The agent management platform can obtain the verification artifact by querying the multi-agent storage using the agent's identifier or other transaction metadata. The agent management platform can retrieve the artifact and/or associated metadata such as timestamps or digital signatures.

In operation 810, the agent management platform can determine, using the first AI agent, a verification status (e.g., compliance status) of the verification artifact by comparing the unique fixed reference value generated by the first AI agent with the observed value indicated by the verification artifact. In some implementations, the verification artifact includes a zero-knowledge proof generated by the second AI agent. The zero-knowledge proof can indicate that the internal operational dataset satisfies the one or more operative boundaries defined by the machine-readable data structure. The verification status can be determined using the zero-knowledge proof. For sequential approvals, the verification artifact can be routed to a plurality of AI agents within the first AI agent set in a predetermined sequence. Each AI agent in the predetermined sequence can generate an agent-specific verification status indicating satisfaction of the verification artifact with the one or more operative boundaries.

For example, if both values are cryptographic hashes, the agent management platform performs a direct byte-to-byte equality check, where a match confirms that the second agent's internal dataset satisfies the operative boundaries, resulting in a positive compliance (or verification) status, while a mismatch triggers a noncompliance flag. In some implementations, such as when the verification artifact includes a ZK proof, the first AI agent can operate as a verifier by using the original reference value and the ZK proof to validate that the second agent's internal dataset meets essential boundaries without revealing the data itself using cryptographic operations (specific to a ZK protocol chosen, such as verifying elliptic curve pairings for zk-SNARKs or checking inner product equations for Bulletproofs). If the ZK proof is valid, the compliance status indicates that the second AI agent is verified. In some implementations, if the verification status indicates that the observed value satisfies the unique fixed reference value, the AI agents can share portions of data. For example, the agent management platform autonomously executes, using the first AI agent, one or more computer-implemented actions to transmit one or more portions of a respective internal operational dataset to the second AI agent. In some implementations, the agent management platform can automatically approve/verify, using the first AI agent, a transaction associated with the second AI agent in response to the reputation score exceeding a predetermined threshold.

To implement reputation-based scoring, the agent management platform can determine, using the first AI agent, a reputation score for the second AI agent based on a plurality of verification artifacts associated with the second AI agent. The reputation score can be determined by a weighted average of one or more verification statuses indicating satisfaction of a respective observed value with a respective unique fixed reference value, a decay value applied on one or more verification statuses based on a time since last failure of satisfaction of the respective observed value with the respective unique fixed reference value, a penalty value applied on one or more verification statuses indicating a failure of satisfaction of the respective observed value with the respective unique fixed reference value, and so forth. For example, historical verification statuses for previously evaluated verification artifacts of agents can be standardized into a score or flag, such as corresponding numerical representations (e.g., 1 for pass, 0 for fail). The agent management platform can apply a time-based decay such that older scores are discounted relative to more recent events by multiplying scores by a decay factor that decreases as the age of each event increases. Failures can cause the agent management platform to apply penalty adjustments by subtracting predefined amounts to reduce the overall score. The agent management platform can assign, using the first AI agent set, a reputation score for the second AI agent set based on a plurality of verification artifacts associated with a third AI agent set (e.g., a sub-agent) associated with a third entity using the same or similar methods described above with reference to determining the reputation score for the second AI agent.

In some implementations, the agent management platform can assign, by the first AI agent, a probationary status to the second AI agent in response to the reputation score being within a predetermined range. The agent management platform can remove the probationary status from the second AI agent in response to the reputation score exceeding the predetermined range for a predetermined time period. For example, the reputation score can be compared against lower and upper numeric bounds specifically designated for probation. If the score meets this conditional range, a "probationary" flag or marker can be programmatically added to the status metadata of the second agent within an agent directory or profile registry by updating a structured status field and/or triggering additional controls such as restricted permissions or increased monitoring. While in the probationary state, the agent management platform can continuously or periodically reevaluate the agent's reputation score at periodic intervals or upon event triggers (such as new verification artifacts). If the score rises above the probationary threshold and/or remains there for a defined observation period the probationary flag can be removed.

To implement voting when determining consensus between a plurality of agents, the agent management platform can determine, using each AI agent of the first AI agent set, an agent-specific verification status for a particular verification artifact. The agent management platform can determine the verification status (e.g., a "yes," "no," or a numerical confidence score) based on a number of respective agent-specific verification statuses indicating satisfaction of the second AI agent set with the one or more operative boundaries exceeding a predetermined threshold (for example, requiring a simple majority, supermajority, or a minimum reputation-weighted score).

In operation 812, the agent management platform can autonomously generate a verification record (e.g., blockchain transaction) including a representation of the verification status for the verification artifact, a timestamp, a digital signature of the first AI agent, and/or an indication of the machine-readable data structure. In some implementations, the agent management platform transmits (e.g., via APIs or direct smart contract calls) the verification record to the multi-agent storage, wherein the verification record is stored in association with respective identifier strings identifying the first AI agent and the second AI agent. To notify an administrator/supervisor of noncompliance in cases where the verification status indicates that the observed value fails to satisfy the unique fixed reference value, the agent management platform can transmit, by the first AI agent, a notification message to a predetermined network address indicating the verification status for the verification artifact.

The agent management platform can generate, by the second AI agent, a second verification record including a representation of a second verification status for a third AI agent associated with a third entity. The agent management platform can store the second verification record in the multi-agent storage in association with respective identifier strings identifying the second AI agent and the third AI agent.

Figure 9:
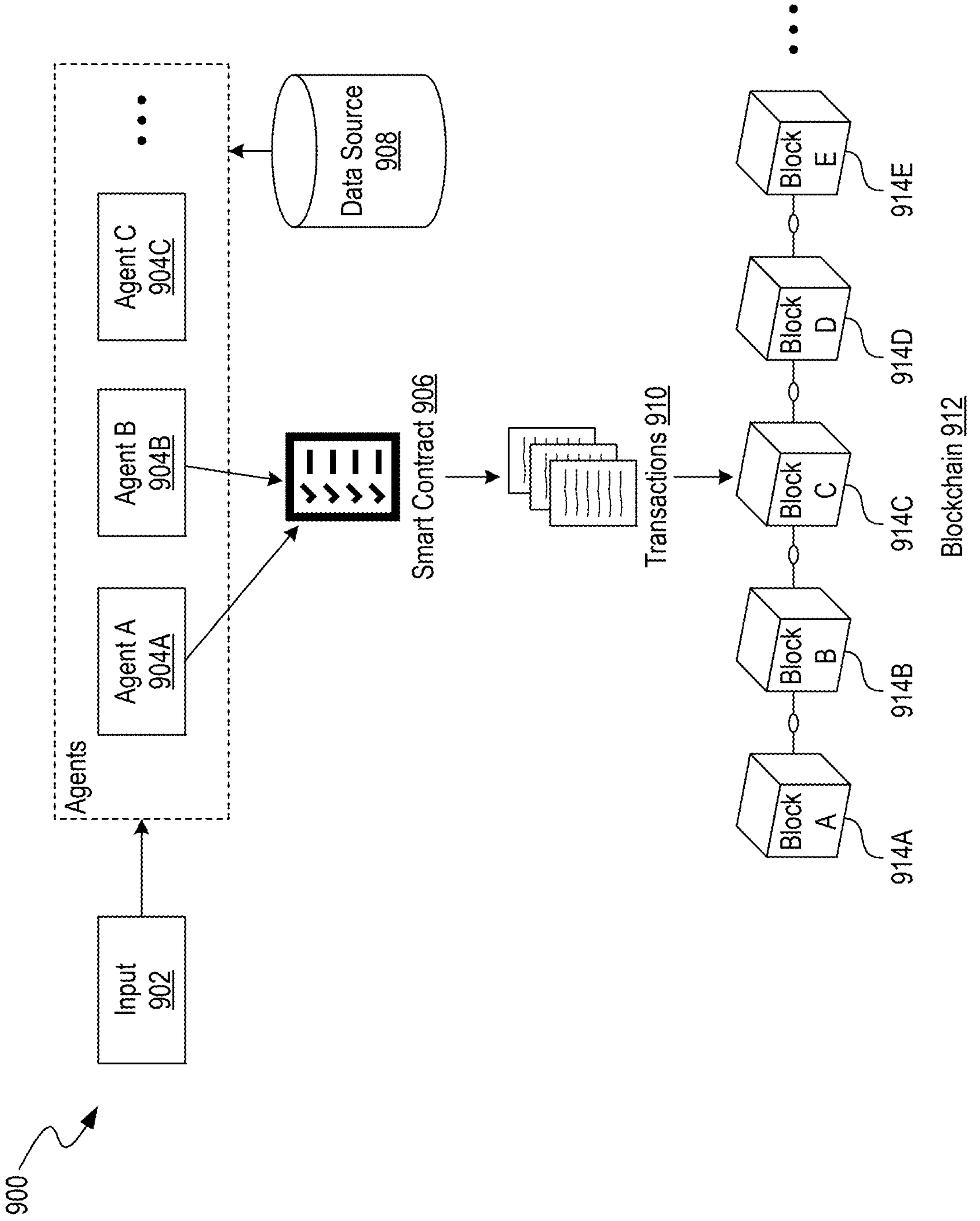
FIG. 9 illustrates an example environment of an agent management platform for automatically generating and executing computer programs using artificial intelligence (AI) models in accordance with some implementations of the present technology.

Example Implementations of Generating and Executing Computer Programs Between Verified AI Agents FIG. 9 illustrates an example environment 900 of an agent management platform for automatically generating and executing computer programs using artificial intelligence (AI) models in accordance with some implementations of the present technology. Environment 900 includes input 902 to be input into the agents 904 (e.g., a first agent 904A, a second agent 904B, a third agent 904C), a smart contract 906 generated by the agents 904 using a data source 908, and transactions 910 to be stored on a blockchain 912 that includes blocks 914 (e.g., a first block 914A, a second block 914B, a third block 914C, a fourth block 914D, a fifth block 914E). The agents 904 are the same as or similar to the AI system 1900 illustrated and described in more detail with reference to FIG. 19. The environment 900 can be implemented using components of example computer system 2000 illustrated and described in more detail with reference to FIG. 20. Likewise, implementations of example environment 900 can include different and/or additional components or can be connected in different ways.

The input 902 refers to user inputs, sensory data, structured data, unstructured data, and so forth, and can include a set of instructions to generate an output using the agents 904. For instance, the input 902 can include textual data, image data, audio data, video data, multi-modal data, and so forth. For instance, textual data can include documents, emails, chat messages, and/or logs. Image data can include photographs, diagrams, scanned documents, and/or other visual representations. In some implementations, multi-modal data combines two or more data types, such as annotated images, which might include both visual data and text data in the annotations, or videos with corresponding subtitles. In some implementations, the input 902 includes a link (e.g., a URL) pointing to a knowledge base and/or a website.

The agents 904 are autonomous (or semiautonomous) software and/or hardware entity that processes the input 902 and generates a set of actions to fulfill the user's request. For example, a first agent 904A can perform data cleaning, a second agent 904B can perform feature extraction, and so forth. In some implementations, the agents 904 are AI-based and use outputs from AI models (e.g., LLMs) and predefined objectives to autonomously generate and execute actions. The actions can be intended to fulfill specific tasks or requests made by the user, as well as other tasks or requests that are related to or associated with requests made by the user. In some implementations, actions can include tasks such as data retrieval, transaction processing, or system configuration changes. The predefined objectives of the agents 904 are the specific goals or targets that the agents 904 aim to achieve when generating the actions. The objectives can be set when constructing the agents 904 or defined by the user through input parameters. In some implementations, predefined objectives are encoded within the architecture of the agents 904. For example, when the agents 904 adopt a neural network architecture, these objectives can weigh the activations of neurons within the network to influence the decision-making process. Certain neurons can be activated to prioritize actions that ensure compliance with specific guidelines or align with specific user preferences.

The agents 904 can include a series of modules such as a natural language processing (NLP) module to interpret user inputs, a decision-making engine to determine the appropriate actions, and/or an execution module to carry out the actions on hardware or software assets. The agents 904 can have access to various databases (e.g., knowledge bases) and APIs to retrieve particular information (e.g., domain-specific information, historical data, user preferences, and so forth). Additionally, the agents 904 can operate in different modes, such as fully autonomous, semiautonomous with human oversight, or in collaboration with other agents. In fully autonomous mode, the agents 904 can make decisions and execute actions without human intervention, relying entirely on the agents' 904 programming and/or learned behaviors. Semiautonomous mode incorporates human oversight, allowing for manual review or approval of certain actions (e.g., in high-stakes or sensitive scenarios). The collaborative mode enables the agents 904 to work in conjunction with other agents (i.e., different agents specializing in different tasks or domains to achieve more complex objectives). For example, the agents 904 can be a specialized AI model designed for specific tasks, such as a virtual assistant, a chatbot, or an automation bot.

The agents 904 can automatically generate and/or execute the smart contract 906 based on the input 902. The smart contract 906 refers to a computational workflow (e.g., a series of computer-executable commands, a computer program, or a transaction protocol) that include rules, conditions, and/or execution logic governing the transformation of data within the agent management platform. A smart contract automatically executes, controls or documents events and actions according to the terms of the conditions. The smart contract 906 can translate variable inputs 902 into predetermined, executable commands that can subsequently be audited. The computational workflow includes instructions that dictate the operations to be performed, the order in which they should be executed, and the conditions under which certain actions should be triggered. For instance, the rules can specify that if a certain variable meets a particular threshold, a specific computational task will be initiated.

In some implementations, the data source 908 injects additional context and parameters, in addition to the input 902, used to generate the smart contract. The data source 908 can include one or more database systems, external APIs, or real-time/near real-time data feeds to ensure that the smart contracts are according to the up-to-date data. The databases can be structured (e.g., SQL databases) or unstructured (e.g., NoSQL databases). For example, a database can store historical loan repayment data, which can be retrieved to assess a risk profile of a new loan application. External APIs can be used to fetch data from third-party services. These APIs can interface with various external systems to supply real-time or near-real-time data used for the operations of smart contracts. For example, real-time or near real-time data can be used if the conditions of a smart contract 906 depend on live data. In some implementations, the data source 908 can be managed by an agent. The agent can selectively transmit data to the agents 904 to, for example, prevent the dissemination of personal data to certain agents 904.

The transactions 910 delineate one or more operations recorded as the smart contract 906 executes its computational workflow. The transactions 910 can indicate the occurrence of specific operations, such as data transformations, decision points, or events triggered within the smart contract 906, that are determined, validated, and/or stored within the blockchain 912. Each transaction can be associated with metadata that is stored along with the transaction on an immutable ledger such as the blockchain 912. The metadata can include the timestamp of the transaction, which records the date and/or time the operation occurred, the parties involved in the transaction 910, the nature of the operation (e.g., specific actions taken or conditions met), parameters or conditions that were applied during the operation, and so forth.

The blockchain 912 can include a series of blocks 914. Each block within blockchain 912 can refer to a repository for one or more transactions 910. Each block can be cryptographically linked to its predecessor to create a chain of transaction logs. Thus, any attempt to change the data within a block would require altering all subsequent blocks, making tampering computationally infeasible. Each block 914 can include a block header and a block body. The block header includes metadata about the block 914 itself, such as a unique identifier (hash) of the block 914, the hash of the previous block 914 in the chain, a timestamp providing the creation time of the block 914, and/or a nonce (e.g., a number that increases sequentially in every attempt to generate a hash). The block body can include the transactions 910 that have been validated and included in the block 914. For example, users generate transactions broadcasted to the network. Network nodes (miners or validators) can verify transactions based on set rules and criteria. the validated transactions can be bundled into a new block by a miner or validator. The miner or validator can solve a cryptographic puzzle (proof of work) and/or demonstrate ownership (proof of stake) to add the block. Once verified, the new block can be added to the blockchain 912, updating the chain across all nodes in the network.

Figure 10A:
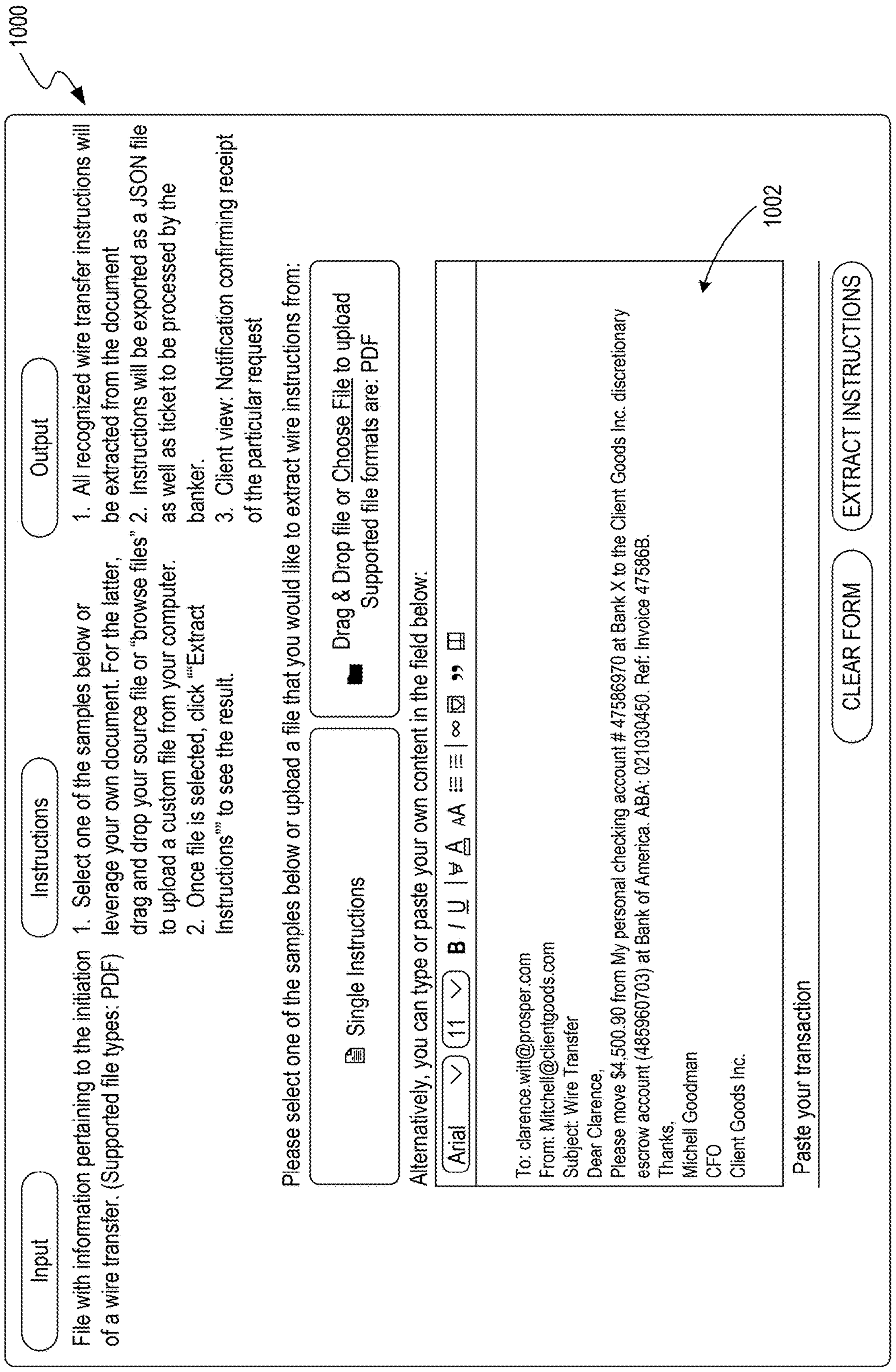
FIG. 10A is a screenshot of a user interface illustrating uploading unstructured data to an agent management platform in accordance with some implementations of the present technology.

FIGS. 10A-10E illustrate screenshots of a user interface 1000 of the agent management platform. The user interface 1000 can be implemented using components of example computer system 2000 illustrated and described in more detail with reference to FIG. 20. Likewise, implementations of user interface 1000 can include different and/or additional components or can be connected in different ways. FIG. 10A is a screenshot of the user interface 1000 illustrating uploading unstructured data 1002 to an agent management platform in accordance with some implementations of the present technology. The user interface 1000 enables the user to interact with the agent management platform. In the depicted user interface 1000, unstructured data 1002 refers to any data that lacks a predefined data model or organization, such as plain text documents, images, emails, and PDFs. For example, the user can select or upload a file, which can be in formats such as PDF, Word documents, or other formats that do not follow a structured schema. Upon selection, the interface 1000 displays the chosen file to enable the user to review their input before proceeding. The sample wire transfer instruction email provided in FIG. 10A includes a request such as: "Please move $4,1900.90 from My personal savings account at ABCD Bank to my checking account at XYZ Bank, account number 0987654321, routing number 123457890."

Figure 10B:
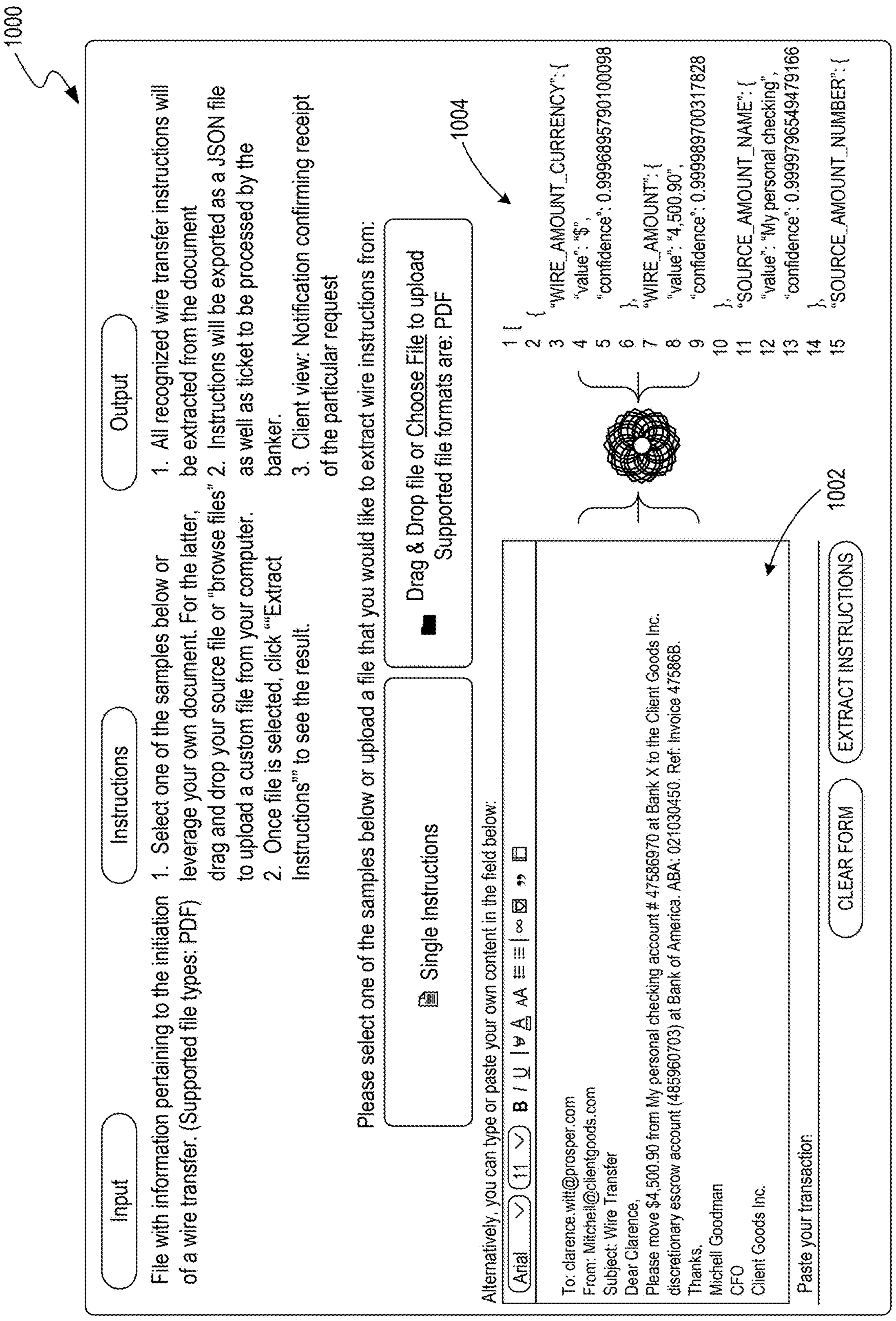
FIG. 10B is a screenshot of the user interface displaying confidence scores of features extracted from the unstructured data that is generated using an agent management platform according to some implementations of the present technology.

Upon receiving a user interaction (e.g., clicking the "Extract Instructions" button in FIG. 10A), the agent management platform identifies and extracts features such as wire transfer instructions, text segments, or other information in a structured format. FIG. 10B is a screenshot of the user interface 1000 displaying confidence scores 1004 of features extracted from the unstructured data 1002 that is generated using an agent management platform according to some implementations of the present technology. For example, the user interface 1000 in FIG. 10B illustrates several extracted features such as "WIRE_AMOUNT_CURRENCY," "WIRE_AMOUNT," and "SOURCE_AMOUNT_NAME," along with their corresponding values and confidence scores 1004. The agent management platform generates confidence scores 1004 to indicate a level of certainty regarding the accuracy of the extracted data. The confidence scores 1004 can be numerical values that represent the likelihood that a particular extracted feature is accurate. For example, in FIG. 10B, the "WIRE_AMOUNT_CURRENCY" feature extracted from the unstructured data has a value of "$" with a confidence score of approximately 0.9997, and the "WIRE_AMOUNT" feature has a value of "4,1900.90" with a confidence score close to 0.99999. High confidence scores 1004 (e.g., confidence scores above a predefined threshold) can indicate that there is a high likelihood of the accuracy of the extracted values. Methods of generating the confidence scores 1004 are discussed in further detail with reference to FIG. 21. In some implementations, the user interface 1000 displays the scores alongside the extracted data.

Figure 10C:
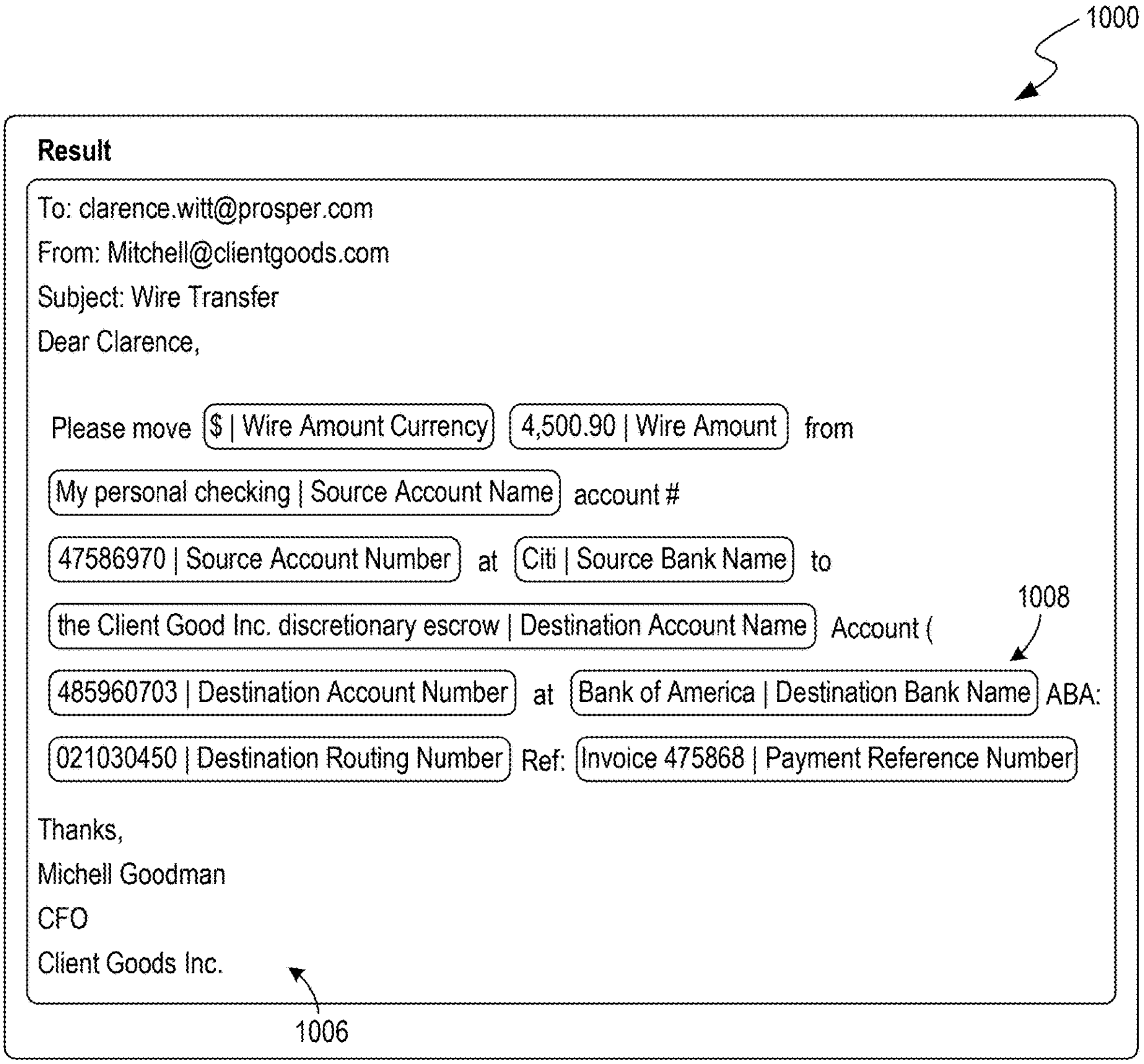
FIG. 10C is a screenshot of the user interface displaying the extracted features according to some implementations of the present technology.

FIG. 10C is a screenshot of the user interface 1000 displaying a result 1006 including the extracted features 1008 according to some implementations of the present technology. The user interface 1000 in FIG. 10C can display a structured output of the artifact (e.g., wire transfer request) generated by the agent management platform. In FIG. 10C, the extracted features 1008 can include portions of the instructions within the unstructured data 1002, such as "WIRE_AMOUNT_CURRENCY," "WIRE_AMOUNT," "SOURCE_ACCOUNT_NAME," "SOURCE_ACCOUNT_NUMBER," and so forth. The extracted features 1008 can include variables and corresponding values. For example, the extracted currency "$" indicates that the transaction involves United States Dollars. Similarly, "WIRE_AMOUNT" represents the specific amount to be transferred—in the case of FIG. 10C, "4,1900.90." The result 1006 provides the extracted features 1008 in a structured manner.

Figure 10D:
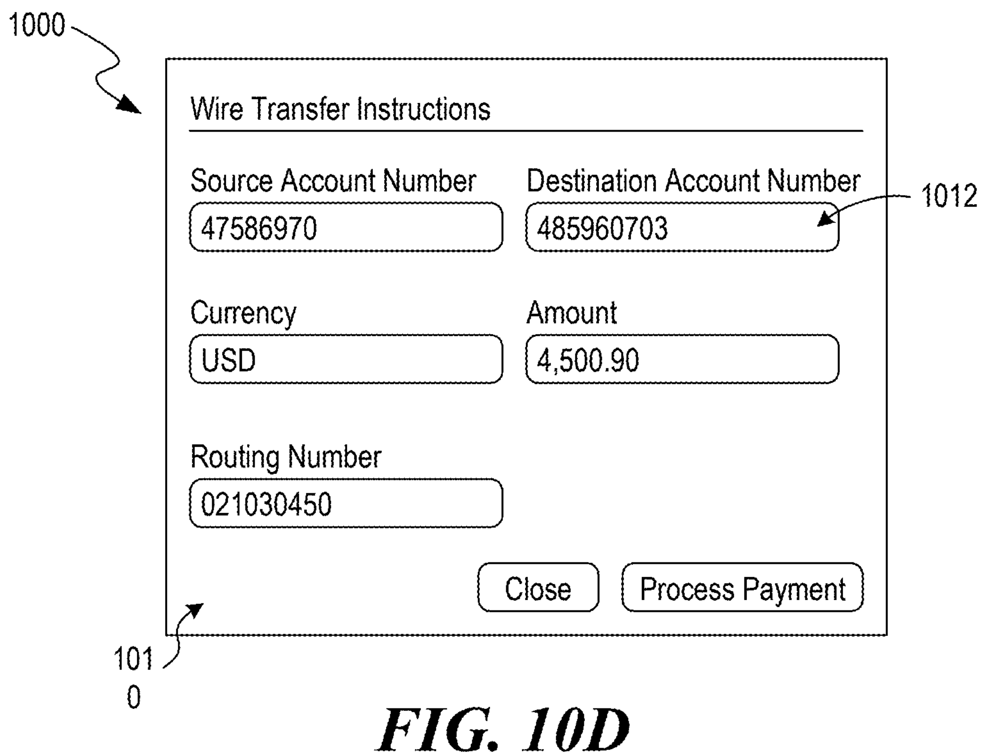
FIG. 10D is a screenshot of a first artifact generated by the agent management platform using complete unstructured data according to some implementations of the present technology.

FIG. 10D is a screenshot of an artifact 1010 generated by the agent management platform using complete unstructured data 1012 according to some implementations of the present technology. In FIG. 10D, the agent management platform has generated detailed wire transfer instructions, including the source account number, destination account number, currency type, amount to be transferred, and the routing number. In some implementations, the artifact 1010 can be generated by an AI-based agent that is different from the AI-based agent that extracted the features from the unstructured data 1002. The artifact 1010 refers to the structured output generated by the agent management platform from the complete unstructured data 1012. For example, the artifact 1010 displays wire transfer details extracted from the unstructured data, which includes: the source account number (47586970), the destination account number (485960703), the currency (USD), the amount (4,1900.90), and the routing number (021030450). The user interface 1000 can display the artifact 1010 and enable users to modify the artifact 1010 before executing the computational workflow indicated by the artifact (e.g., before submitting the wire transfer request). In some implementations, the agent management platform can use one or more AI models (e.g., an AI-based agent) to automatically execute the computer-executable commands associated with the artifact 1010 (e.g., automatically processing the wire transfer request).

Figure 10E:
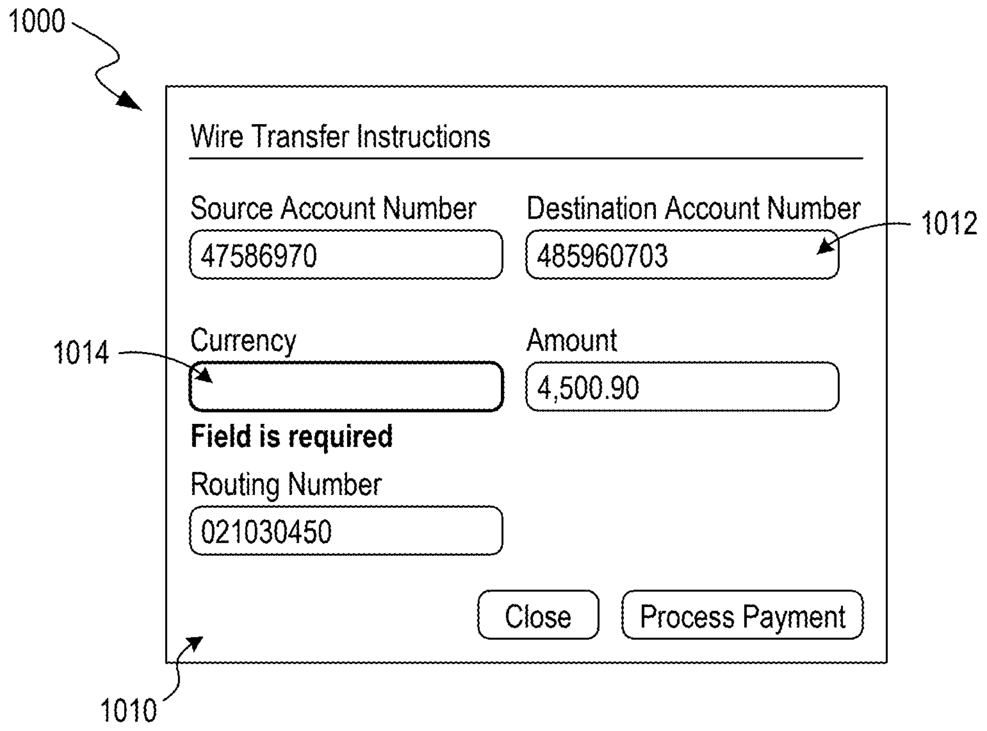
FIG. 10E is a screenshot of a second artifact generated by the agent management platform using incomplete unstructured data according to some implementations of the present technology.

Before automatically executing the computer-executable commands, the AI-based agent can first validate that the artifact 1010 created by, for example, a different AI-based agent, includes complete information (e.g., validating that the unstructured data 1002 is complete). In some implementations, when the unstructured data 1002 is incomplete, the agent management platform flags and/or alerts the user of the incomplete data. FIG. 10E is a screenshot of the artifact 1010 generated by the agent management platform using incomplete unstructured data 1014 according to some implementations of the present technology. The artifact 1010 displays wire transfer instructions including the source account number (47586970), destination account number (485960703), transfer amount (4,1900.90), and routing number (021030450). However, the currency type field is blank due to the incomplete unstructured data 1014.

Figure 11:
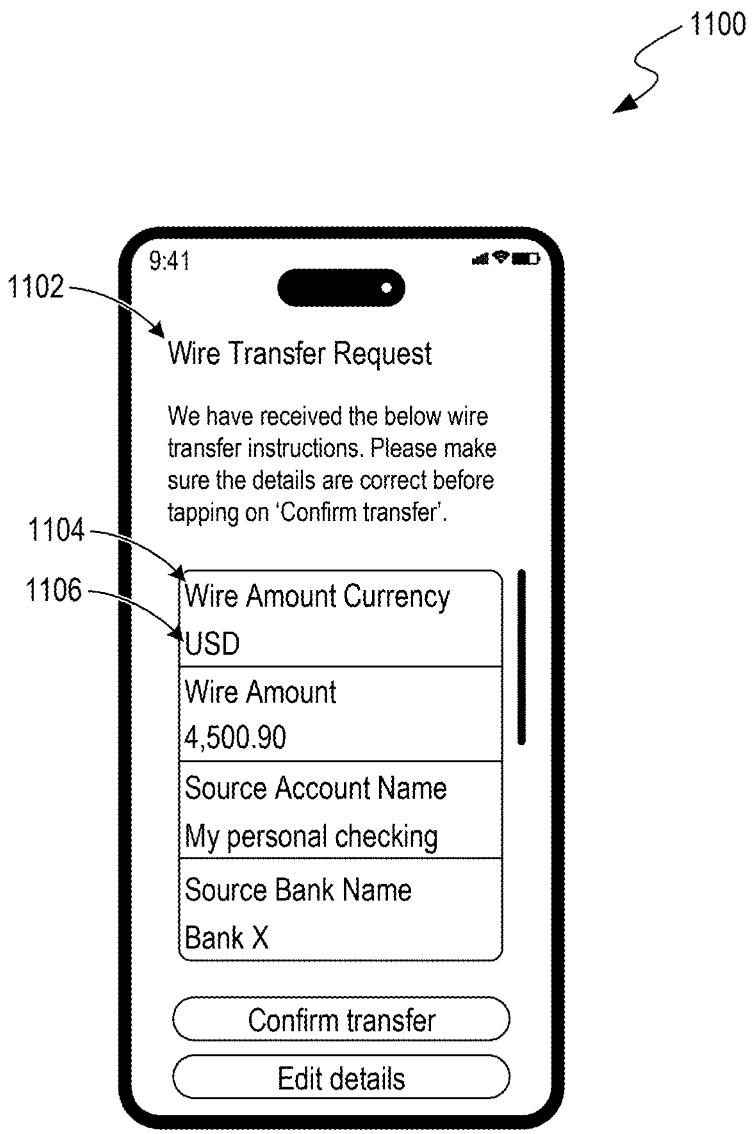
FIG. 11 is a screenshot displaying the artifact generated by the agent management platform on a user interface according to some implementations of the present technology.

FIG. 11 is a screenshot 1100 displaying the artifact 1102 generated by the agent management platform on a user interface according to some implementations of the present technology. The artifact 1102 can include one or more variables 1104 and corresponding values 1106 extracted from the unstructured data. The screenshot 1100 can be implemented using components of example computer system 2000 illustrated and described in more detail with reference to FIG. 20. Likewise, implementations of the screenshot 1100 can include different and/or additional components or can be connected in different ways.

The screenshot 1100 displays the generated artifact 1102. The artifact 1102 can include the set of variables 1104. Variables 1104 represent the data fields extracted from the unstructured dataset. In the screenshot 1100, the variables 1104 include the currency, amount, source account name, source account number, destination account name, destination account number, and routing number. Each variable can correspond to information used to process the wire transfer. For instance, the variable indicating the currency is denoted as "USD," specifies the currency in which the transfer is to be executed.

Corresponding values 1106 denote the specific data points associated with each variable 1104. Corresponding values 1106 can be extracted from the unstructured dataset and populated into their respective fields within the artifact 1102. For example, the currency variable holds the value "USD," the transfer amount variable holds the value "4,1900.90," the source account name holds the value "My personal checking," and so forth. In some implementations, the agent management platform can display additional metadata such as the confidence reliability or historical usage patterns associated with the extracted variables 1104. Interactive buttons within the interface, such as "Close" and "Process Payment," can enable users to trigger or modify the computational workflow. In some implementations, the agent management platform automatically triggers the computational workflow.

Figure 12:
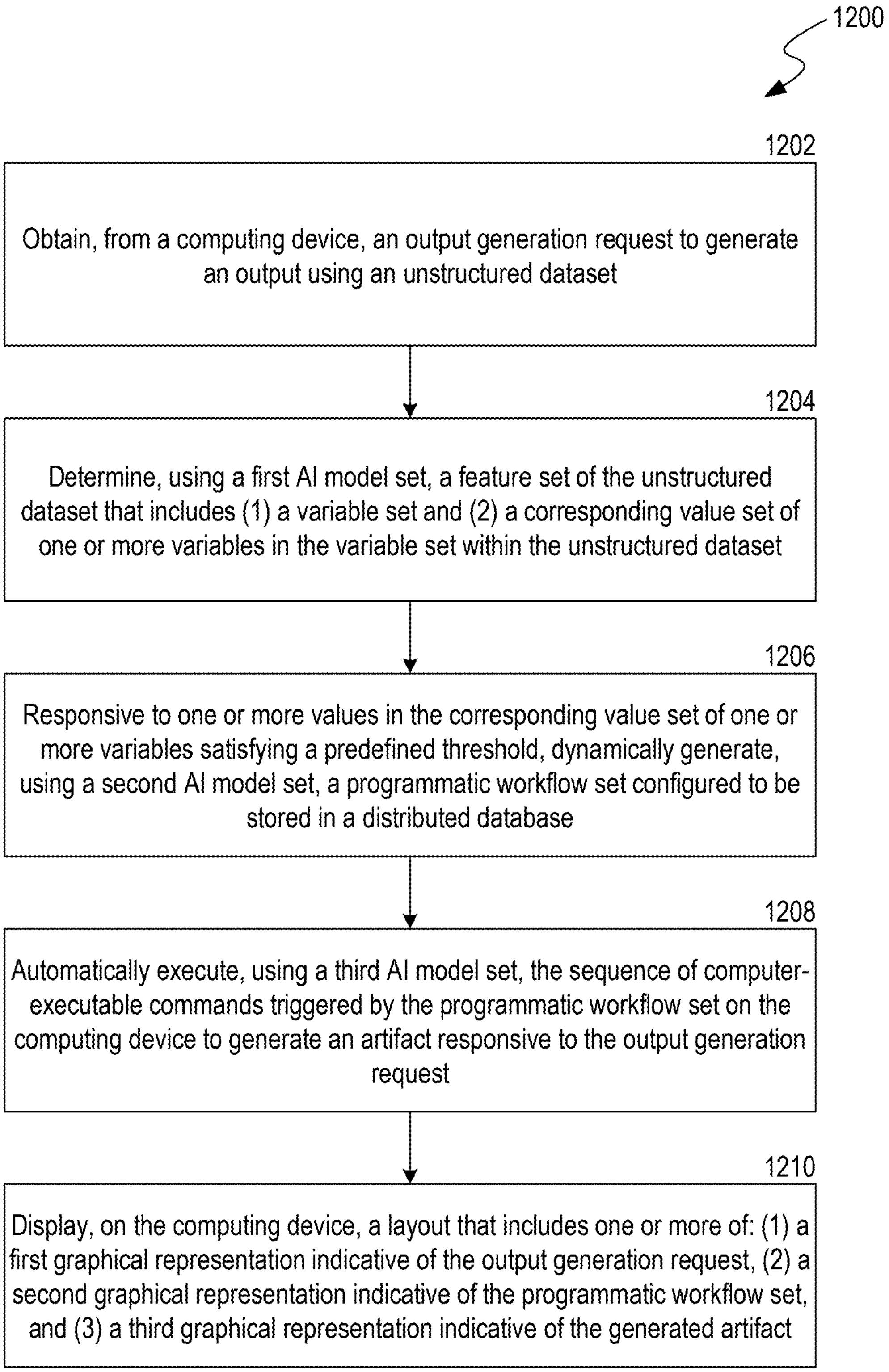
FIG. 12 is a flow diagram illustrating an example process of generating and executing computer programs using an agent management platform according to some implementations of the present technology.

FIG. 12 is a flow diagram illustrating an example process 1200 of generating and executing computer programs using an agent management platform according to some implementations of the present technology. In some implementations, the process 1200 is performed by a computer system, e.g., example computer system 2000 illustrated and described in more detail with reference to FIG. 20. Implementations can include different and/or additional operations or can perform the operations in different orders.

In operation 1202, the agent management platform obtains (e.g., receives from a graphical user interface (GUI) of a computing device) an output generation request (e.g., a wire request) to generate an output using an unstructured dataset. The requested output can satisfy a guideline set defining an operative boundary set of the output generation request. In some implementations, the agent management platform establishes a communication channel with the GUI of the computing device. For example, the GUI can transmit a request to the agent management platform's server endpoint. The request can include metadata defining the output generation request, such as the type of output required, specific parameters, and/or the dataset to be used.

In operation 1204, the agent management platform determines, using a first AI model set, a feature set of the unstructured dataset that includes a variable set and/or a corresponding value set of each variable in the variable set within the unstructured dataset. For text data, the agent management platform can tokenize the text into words or subwords, and convert these tokens into numerical representations using methods such as word embeddings (e.g., Word2Vec, GloVe) or contextual embeddings (e.g., BERT embeddings). The first AI model set can identify variables such as named entities, parts of speech, and/or syntactic dependencies, and assign corresponding values to the variables based on the context within the text. For example, the agent management platform can identify features (e.g., variables) such as named entities (e.g., people, organizations, locations), parts of speech (e.g., nouns, verbs, adjectives), and syntactic dependencies (e.g., subject, object relationships). For instance, in the sentence "The quick brown fox jumps over the lazy dog," the model identifies "fox" and "dog" as nouns, "jumps" as a verb, and "quick" and "lazy" as adjectives.

For image data, the AI model set can use a model such as a CNN to identify features including edges, textures, shapes, and/or higher-level patterns. The model can identify variables and assign corresponding values to these variables based on the detected features within the images. For instance, in an image of a cat, the model can first detect edges that form the outline of the cat, and then identify textures such as fur, and subsequently identify the overall shape and specific features such as eyes and ears. The model can assign variables such as object classes (e.g., cat, dog), bounding box coordinates (e.g., the position of the cat in the image), and pixel intensities (e.g., color values).

For audio data, the AI model set can convert the raw audio signals into spectrograms or other time-frequency representations. The model can extract features such as pitch (frequency of the sound), timbre (quality of the sound), and/or rhythm (timing patterns). For example, in a piece of music, the model can identify the pitch of each note, the sound characteristics of different instruments, and so forth. Variables such as frequency bands (e.g., low, mid, high frequencies), amplitude levels (e.g., loudness), and temporal patterns (e.g., beats per minute) can be identified and assigned corresponding values.

The agent management platform can generate confidence scores for each feature of the feature set and compare the confidence score to a particular threshold. Each feature included in the feature set can satisfy the particular threshold. In some implementations, confidence scores can be generated (e.g., agents 904) based on a chatter index, or an indication of the amount of time agent spent communicating with another system. For text data, the agent management platform can use NLP models to assign confidence scores to features such as named entities, parts of speech, and/or syntactic dependencies. For example, if the model identifies "New York" as a location in a sentence, the model generates a confidence score indicating how certain it is that "New York" is a location. The confidence score can be based on the context in which the term appears and calculated by converting the model's raw output into a probabilities that sum to one. The resulting probability for each term indicates the model's confidence in its prediction, with higher probabilities reflecting greater confidence.

For image data, CNNs can be used to assign confidence scores to features such as object classes, bounding box coordinates, and/or pixel intensities. For instance, if the model detects a cat in an image, the model generates a confidence score reflecting the likelihood that the detected object is a cat. The confidence score can be derived from the activation levels of the neurons in the final layers of the CNN, which indicate the model's certainty about the classification. The confidence score can be typically a value between 0 and 1, where higher values indicate greater confidence. For audio data, the agent management platform can use spectrograms to assign confidence scores to features such as pitch, timbre, and/pr rhythm. For example, if the model identifies a specific musical note, the model generates a confidence score indicating how certain it is about the note's pitch. The confidence score can be calculated based on the probability of the feature given the observed data.

Once the confidence scores are generated, the agent management platform can compare each score to a predefined threshold. This threshold can be set based on the desired level of certainty for the features to be considered valid. The agent management platform can iterate through each feature and its corresponding confidence score, checking if the score meets or exceeds the threshold.

Responsive to one or more values in the corresponding value set of each variable satisfying a predefined threshold, in operation 1206, the agent management platform dynamically generates, using a second AI model set (same as or different from the first AI model set), a programmatic workflow set (e.g., a smart contract) configured to be stored in a distributed database (e.g., a blockchain network) by mapping a vector representation of each feature of the feature set to an antecedent set (e.g., conditional statements) representative of the feature, a corresponding programmatic workflow of the programmatic workflow set satisfying the operative boundary set of the guideline set, and/or one or more nodes of the distributed database (e.g., blocks on a blockchain network). For example, the agent management platform can determine that if a loanable value within the output generation request is greater than $10 million, the agent management platform automatically generates additional smart contract code to be executed on the computing device.

The antecedent set can include conditional statements that represent the logical conditions and rules associated with each feature. For example, if the feature is a loanable value, the antecedent set can include conditions such as "if loanable value >$10 million." The agent management platform can use these conditional statements to construct the programmatic workflow. The programmatic workflow can be a sequence of programmatic instructions or code that defines the actions to be taken based on the conditions specified in the antecedent set. In the case of a smart contract, the programmatic workflow can include the logic and rules that govern the execution of the contract. For example, the programmatic workflow can specify that if the loanable value exceeds $10 million, additional clauses or conditions are added to the smart contract.

To ensure that the generated programmatic workflow satisfies the operative boundary set of the guideline set, the agent management platform can cross-reference the workflow with the predefined guidelines. Once the programmatic workflow is generated and validated, the agent management platform can store the programmatic workflow in a distributed database, such as a blockchain network. In some implementations, the corresponding programmatic workflow triggers a sequence of computer-executable commands responsive to satisfying the antecedent set. For example, if the agent management platform determines that a loanable value within the output generation request is greater than $10 million, the agent management platform automatically generates additional smart contract code to handle this condition. This code is stored on the blockchain, where it can be executed by the computing device when the specified conditions are met.

Each node of the one or more nodes can be assigned a unique cryptographic hash by applying a particular hash function on the node. The one or more nodes can each be linked to a corresponding unique cryptographic hash of a different node in the distributed database. The hash function uses the data contained within the node as input to generate a fixed-size string of characters, which is the cryptographic hash. This hash uniquely represents the data in the node, ensuring that changes in the node's data results in a different hash. The agent management platform applies the hash function to the data of each node. The agent management platform links each node to a corresponding unique cryptographic hash of a different node in the distributed database. For example, the agent management platform can link the hash of the previous node in the data of the current node before applying the hash function. For instance, if Node A is followed by Node B, the data of Node B can include the hash of Node A. When the hash function is applied to Node B, it generates a hash that includes the hash of Node A, creating a cryptographic link between the two nodes. Thus, if any data in a node is altered, the hash of that node will change, which will also affect the hashes of all subsequent nodes.

To generate the smart contract based on previous similar contracts, in some implementations, the agent management platform generates a similarity score between the feature set and a plurality of historical feature sets by determining a degree of similarity between vector representations of one or more features within the feature set with vector representations of one or more historical features of the historical feature set. Similarity measures can include cosine similarity, Euclidean distance, or other metrics that quantify how close the vectors are to each other in the high-dimensional space. For example, cosine similarity measures the cosine of the angle between two vectors, with values closer to 1 indicating higher similarity. The agent management platform can generate the programmatic workflow set using a historical programmatic workflow set associated with a historical feature set that has a highest similarity score with the feature set.

In operation 1208, the agent management platform automatically executes, using a third AI model set (same as or different from the first and second AI model sets), the sequence of computer-executable commands triggered by the programmatic workflow set on the computing device to generate an artifact (e.g., a wire transfer ticket) responsive to the output generation request. Each command can be processed in order. As the agent management platform executes each command, the agent management platform can dynamically update the state of the computing device and the data being used.

In operation 1210, the agent management platform displays, on the GUI of the computing device, a graphical layout that includes a first graphical representation indicative of the output generation request, a second graphical representation indicative of the programmatic workflow set, and/or a third graphical representation indicative of the generated artifact. The first, second, and/or third graphical representation can include a preview of the content, such as an embedded PDF viewer, a link, or an image viewer, or can include the entirety of the content.

To keep track of who accessed which data and/or executed which contracts, in some implementations, the agent management platform, responsive to the execution of the sequence of the computer-executable commands, stores an indication of the execution in the distributed database. The indication can be linked to the one or more nodes of the distributed database. The agent management platform can capture information associated with execution (e.g., execution metadata) of the computer-executable commands, such as the identity of the user or system that initiated the execution, the specific commands that were executed, the time and date of execution, data used by the commands, and so forth. Once the execution metadata is collected, the agent management platform can format the metadata into a structured record such as one that includes fields for the information, such as user ID, command details, timestamp, and so forth. The agent management platform can generate a unique identifier for the execution record. The identifier can be a cryptographic hash to ensure the immutability of the execution record, as changes to the metadata would result in a different hash.

The agent management platform can create a new node in the distributed database to store the execution record. The node can include the execution metadata and the generated hash value. The node can be linked to the relevant nodes in the distributed database, such as the nodes representing the data accessed or the contracts executed, by including references to the unique cryptographic hashes of the related nodes within the new node. To store the new node in the distributed database, the agent management platform can initiate a transaction on the blockchain network.

To maintain auditability, in some implementations, each programmatic workflow of the programmatic workflow set is associated with an explanation associated with the antecedent set and/or the sequence of computer-executable commands, a timestamp, and/or a version identifier. The explanation associated with the antecedent set and the sequence of computer-executable commands can be a human-readable description of the logic and conditions associated with the programmatic workflow. For example, if the workflow includes a conditional statement such as "if loanable value >$10 million," the explanation can describe the condition and/or its corresponding consequent. The explanations can be stored as text strings and can be included in the metadata for each workflow.

The agent management platform can record a timestamp for each workflow using the system clock and include the timestamp in the metadata to provide a chronological record of the workflow's history. The agent management platform can assign, in some implementations, a version identifier to each workflow. This identifier can be a unique string or number that distinguishes different versions of the workflow. Each time the workflow is updated or modified, the agent management platform can increment or otherwise modify the version identifier to reflect the changes. The version identifier enables users and auditors to track the evolution of the workflow over time and to reference specific versions when needed. Once the metadata is generated, the agent management platform can associate it with the corresponding programmatic workflow in the structured record. The agent management platform can store the metadata record alongside the workflow in the distributed database.

Figure 13:
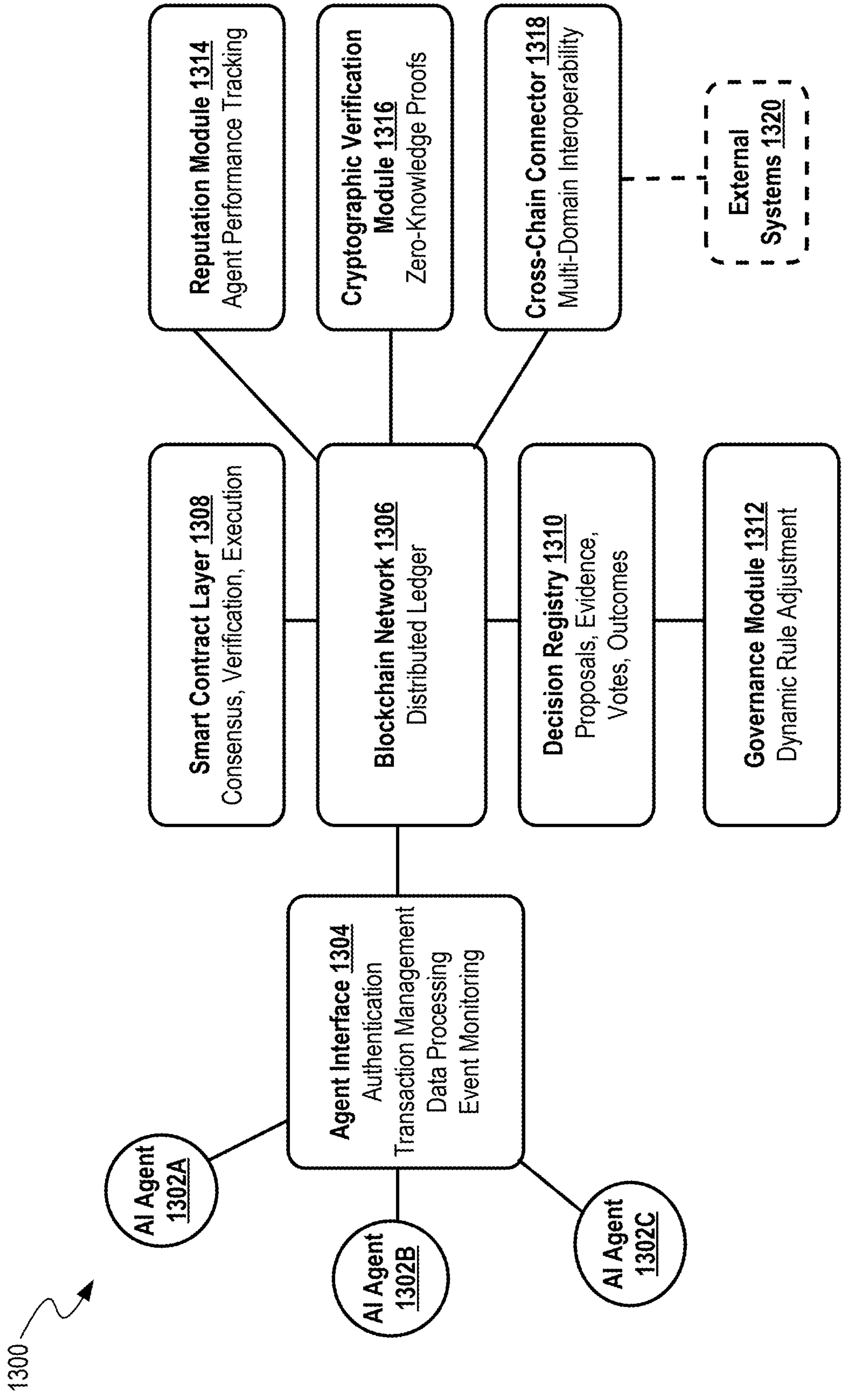
FIG. 13 illustrates an example environment of blockchain-based decision making for AI agent(s) using the agent management platform in accordance with some implementations of the present technology.

FIG. 13 illustrates an example environment 1300 of blockchain-based decision making for AI agent(s) using the agent management platform in accordance with some implementations of the present technology. Environment 1300 includes AI agents 1302, an agent interface 1304, a blockchain network 1306, a smart contract layer 1308, a decision registry 1310, a governance module 1312, a reputation module 1314, a cryptographic verification module 1316, a cross-chain connector 1318, and external systems 1320. The AI agents 1302 are the same as or similar to the AI system 1900 illustrated and described in more detail with reference to FIG. 19. The environment 1300 can be implemented using components of example computer system 2000 illustrated and described in more detail with reference to FIG. 20. Likewise, implementations of example environment 1300 can include different and/or additional components or can be connected in different ways.

The environment 1300 includes multiple AI agents 1302, such as a first AI agent 1302A, a second AI agent 1302B, a third AI agent 1302C, and so forth. These AI agents 1302 can be specialized for different tasks or domains (i.e., trained on domain-specific data). The AI agents 1302 interact with the system through an agent interface 1304, which provides a standardized communication protocol to manage the agents'interactions with other components of the agent management platform. The agent interface 1304 can include modules to perform, for example, authentication, transaction formatting, data encryption/decryption, and/or communication with other system components. Examples and methods of operating the agent interface 1304 are further discussed with reference to FIG. 14 below.

The blockchain network 1306 refers to a distributed and immutable ledger for recording transactions and decisions. The blockchain network 1306 can use consensus mechanisms such as multiple rounds of communication between nodes to validate transactions, propose new blocks, and/or reach agreement on the state of the ledger. By ensuring that all participating nodes agree on the state of the blockchain, the agent management platform can provide a reliable and tamper-resistant foundation for recording and executing decisions made by the AI agents. In some implementations, the blockchain network 1306 can be implemented as a private, permissioned network to control access and refine the management of AI agent interactions. The smart contract layer 1308 is communicatively connected to the blockchain network 1306, and can include pre-programmed rules and conditions that govern the execution of transactions. The smart contract layer 1308 can include consensus protocols that define voting mechanisms and/or thresholds for different decision types, verification contracts that validate agent credentials and/or contributions, execution contracts that trigger actions based on decision outcomes, and so forth.

Records of decisions made by the AI agents, including proposals, evidence, votes, and/or outcomes can be stored and/or managed by the decision registry 1310. The decision registry 1310, for example, can be structured as a structured database within the blockchain. The governance module 1312 can be used to enforce rules and policies within the agent management platform. In some implementations the governance module 1312 is enabled to dynamically adjust parameters of one or more rules (e.g., smart contracts) based on predefined criteria or collective decisions by the AI agents 1302. To provide reliability and effectiveness of the AI agents, the reputation module 1314 is enabled to track and evaluate the performance and/or assign a degree of reliability to individual AI agents 1302 based on, for example, previous actions and decisions. The reputation scores maintained by the reputation module 1314 can influence the weight given to each agent's input in collective decision-making processes.

To ensure the security of the agent management platform, the cryptographic verification module 1316 can perform one or more cryptographic techniques such as zero-knowledge proofs to verify transactions, agent reasoning, and/or decisions without revealing sensitive information. To facilitate interoperability with other blockchain networks or external systems, the cross-chain connector 1318 enables the exchange of data and execution of transactions across different blockchain networks to expand the capabilities of the agent management platform. The cross-chain connector 1318 can enable interoperability with other blockchain networks for decisions that span multiple domains. The cross-chain connector 1318 can interface with external systems 1320 to enable the integration of external data sources, services, or applications into the decision-making process.

Figure 14:
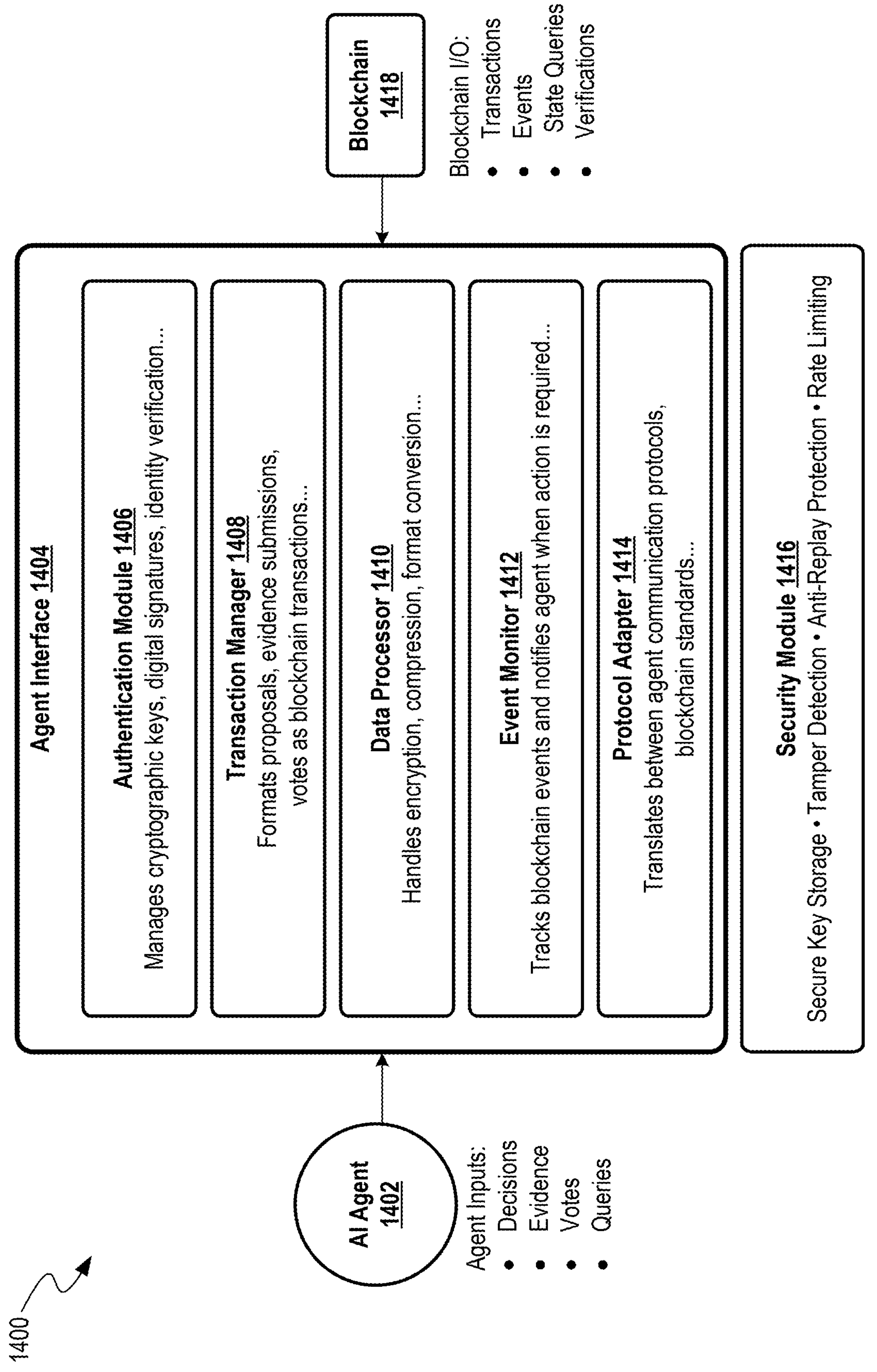
FIG. 14 illustrates an example environment of an interface of an AI agent used within an agent management platform in accordance with some implementations of the present technology.

FIG. 14 illustrates an example environment 1400 of an interface of an AI agent used within an agent management platform in accordance with some implementations of the present technology. Environment 1400 includes an AI agent 1402 (e.g., the AI agents 1302 in FIG. 13) and an agent interface 1404 (e.g., the agent interface 1304 in FIG. 13) that includes an authentication module 1406, a transaction manager 1408, a data processor 1410, an event monitor 1412, and a protocol adapter 1414. The environment 1400 further includes a security module 1416 and a blockchain 1418. The AI agent 1402 are the same as or similar to the AI system 1900 illustrated and described in more detail with reference to FIG. 19. The environment 1400 can be implemented using components of example computer system 2000 illustrated and described in more detail with reference to FIG. 20. Likewise, implementations of example environment 1400 can include different and/or additional components or can be connected in different ways.

The AI agent 1402 interacts with the blockchain network through the agent interface 1404. When the AI agent 1402 generates a decision, evidence, action, vote, query, and so forth (e.g., based on the agent's internal algorithms, which can include machine learning models, rule-based systems, or other decision-making mechanisms), it can trigger a series of processes within the agent interface 1404 to interact with the blockchain 1418 (e.g., transactions, events, state queries, verifications, and so forth). Within the agent interface 1404, the authentication module 1406 can verify the AI agent's identity and permissions within the agent management platform. The authentication module 1406 can use one or more cryptographic techniques such as digital signatures or multi-factor authentication to ensure that only authorized agents are enabled to participate in the decision-making process. For example, the agent management platform can generate a digital signature using the agent's private key, which can be verified by other participants in the network. In another example, the agent management platform can validate the agent's current status and permissions against a predefined set of criteria implemented on the blockchain.

Once authenticated, the transaction manager 1408 formats the decision or action into a blockchain transaction. The transaction manager 1408 can structure the data according to the specific criteria of the blockchain protocol, such as including metadata, timestamps, and transaction identifiers. In some implementations, the transaction manager 1408 can sequence and prioritize transactions within the blockchain 1418. The data processor 1410 can be used to encrypt, compress, and/or otherwise format the conversion of data exchanged between the AI agent 1402 and the blockchain 1418. In some implementations, the data processor 1410 can use advanced techniques such as zero-knowledge proofs to enable verification of certain properties of the data without revealing the data itself. Throughout the operation of the agent management platform, the event monitor 1412 can track events occurring on the blockchain 1418. The event monitor 1412 can filter blockchain 1418 events and notify the AI agent when action is required or when relevant information becomes available.

The protocol adapter 1414 can be used as a translation layer between the communication protocols used by the AI agent and those used by the blockchain network. The protocol adapter 1414 enables interoperability between different AI systems and blockchain platforms. For example, the protocol adapter 1414 can translate between different data serialization formats, adjust byte orders, or implement any blockchain-specific cryptographic operations used for transaction submission. Before the transaction is submitted to the blockchain 1418, the security module 1416 can apply one or more security measures such as performing an encryption of the transaction payload, implementing anti-replay protection by including nonces or timestamps, applying rate limiting to prevent potential denial-of-service attacks on the blockchain network, and so forth.

Example Implementations of Verifying AI Agents Based on Resource Availability

Figure 15A:
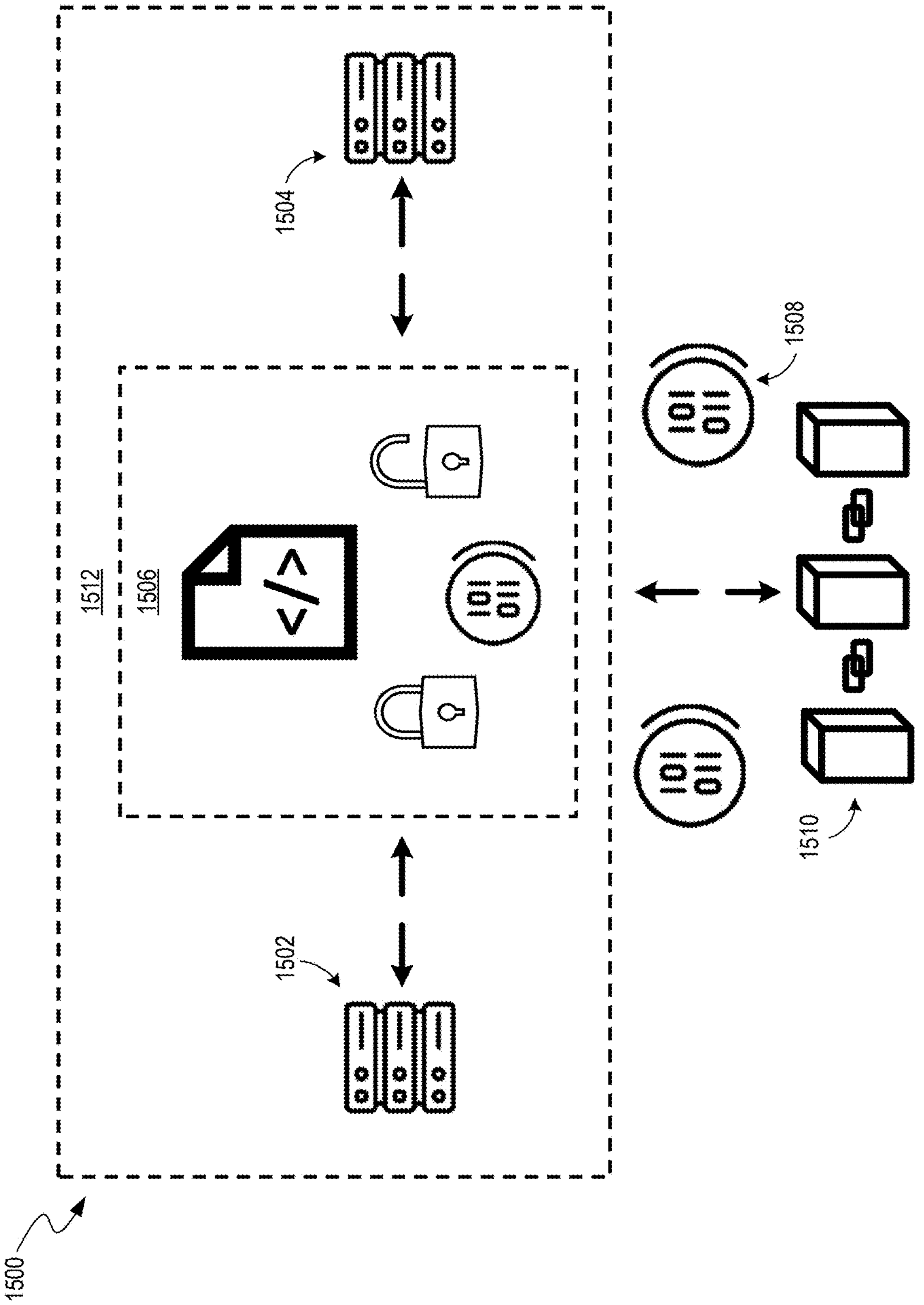
FIGS. 15A-15C show an illustrative diagram for managing resources, in accordance with one or more implementations.
Figure 15B:
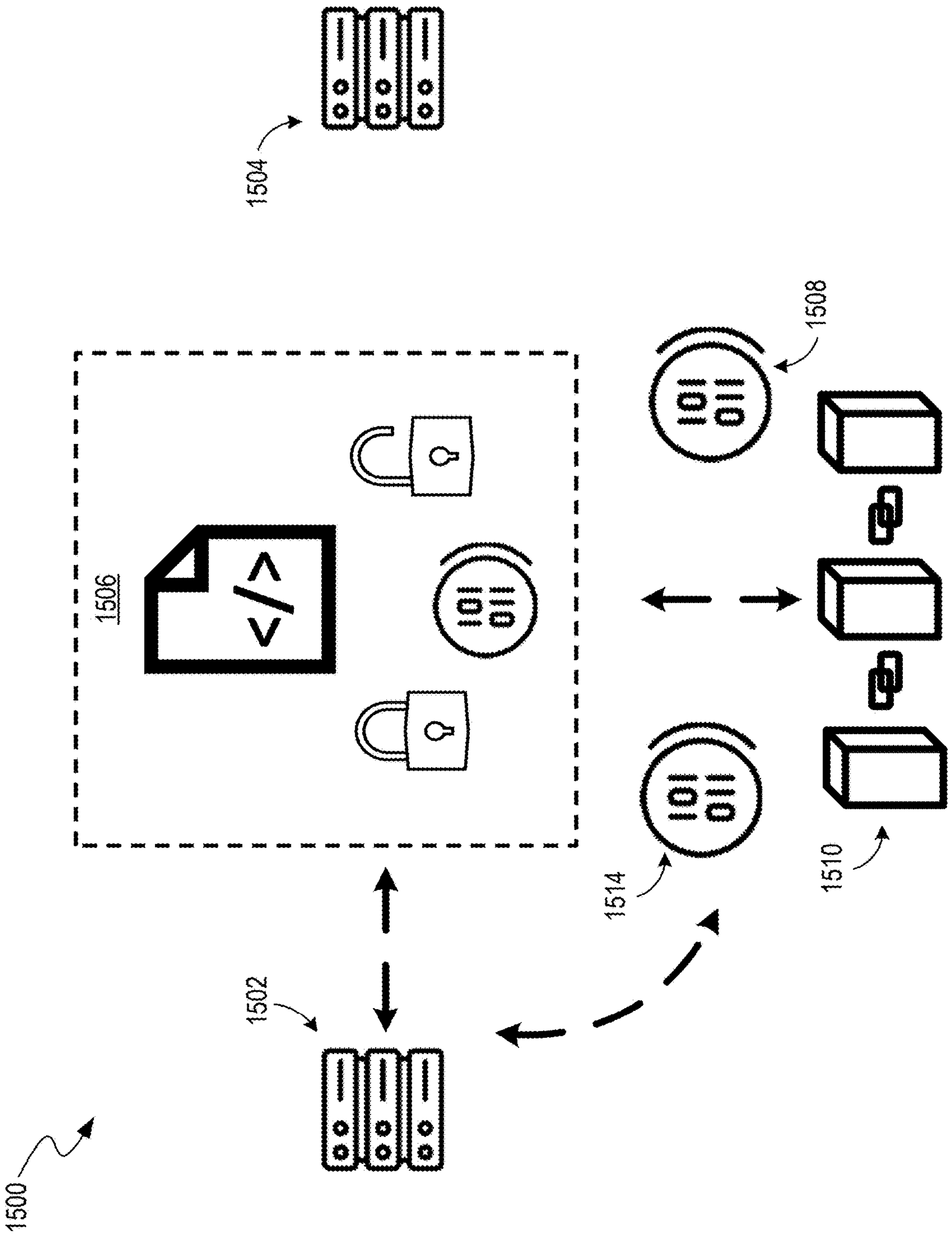
Figure 15C:
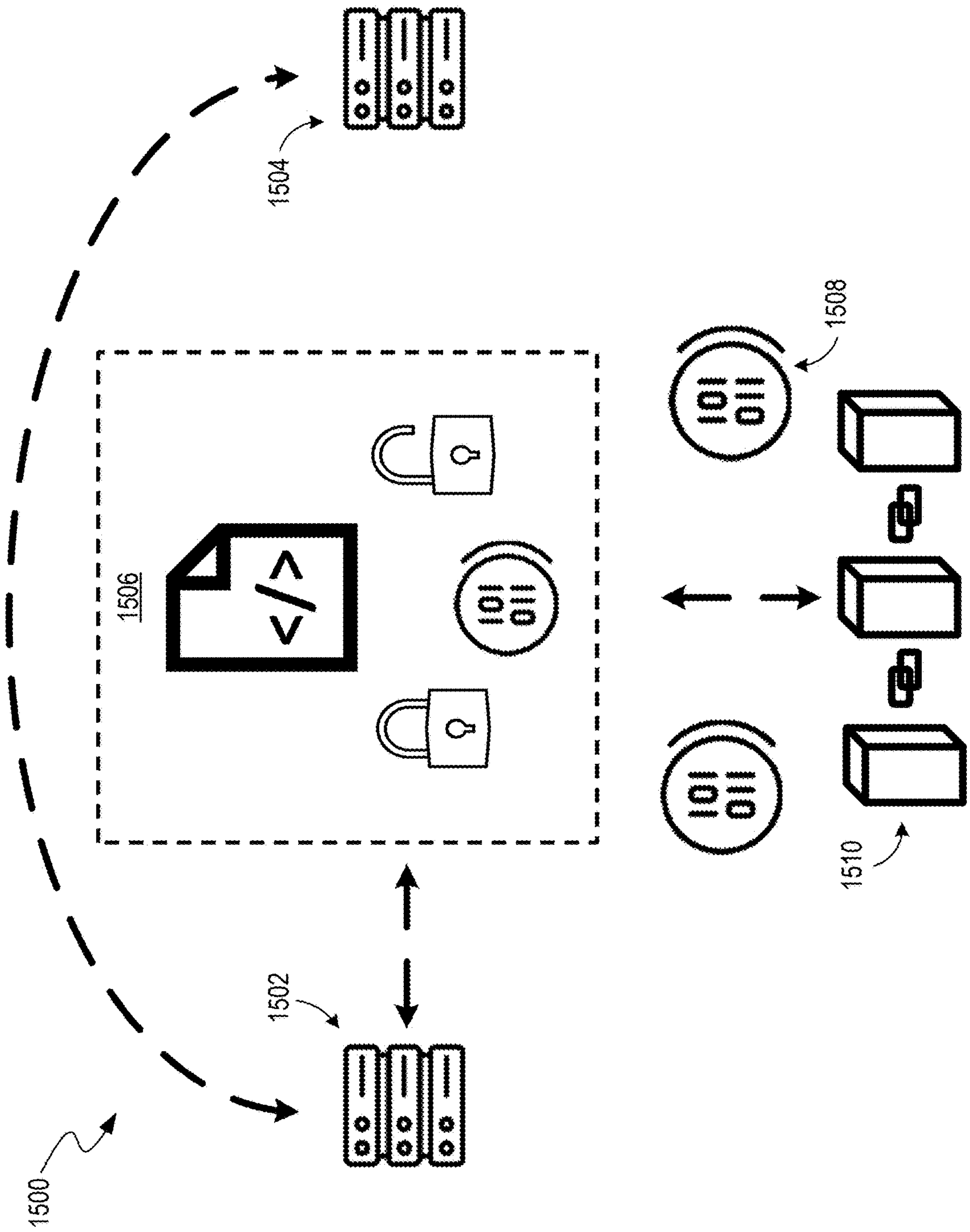

FIGS. 15A-15C show an illustrative diagram for managing resources, in accordance with one or more implementations. FIG. 15A shows an illustrative architecture for managing resources across global or cloud networks, in accordance with one or more implementations. For example, system 1500 includes a network between two resources (e.g., resource 1502 and resource 1504). As described herein, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS—Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some implementations, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some implementations, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some implementations, system 1500 may illustrate one or more communications between resource 1502 and resource 1504 as managed by a platform application. For example, a platform application may be used to facilitate one or more blockchain actions (e.g., via self-executing program 1506) to conduct the communications across computer network 1512. In some implementations, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. In some implementations, the self-executing program may be a program in which rules for execution are written into lines of code that is executed in response to a trigger.

As referred to herein, a computer network may refer to a collection of interconnected computers and other devices that are linked together to share resources, information, and services. These networks can be established using various technologies and configurations, allowing devices to communicate and exchange data with each other. In some implementations, the computer network may comprise a network for a financial services firm.

In some implementations, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some implementations, the computer network may comprise a global payment network that facilitate credit and debit card transactions. The network may connect issuing banks, acquiring banks, merchants, and cardholders, enabling electronic payments at point-of-sale terminals and online. In some implementations, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some implementations, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some implementations, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some implementations, the platform application may be used to manage the availability of devices in a computer network (e.g., a "platform management application"). This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some implementations, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), mobile and online banking (e.g., mobile applications and online banking portals).

In some implementations, the system receives the first request may comprise receiving, at a platform management application, a user request to perform a first off-chain action. The system may then determine that the first blockchain action corresponds to first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcasted to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 1500 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, certain computations or processes needed to support a decentralized application (DApp) might be handled off-chain to improve performance and reduce latency, with only the final outcome or necessary data being recorded on the blockchain.

For example, in the context of blockchain technology, on-chain data and assets are those that are recorded and stored directly on the blockchain. In contrast, off-chain data or assets are not directly stored on the blockchain but are instead managed off the blockchain. For example, off-chain data may be information that is not stored on the blockchain but is referenced or linked to it. This could include data stored in traditional databases, external files, or other systems. Off-chain assets may be assets that are represented or exist in the physical world or in other systems, but their ownership or status is tracked and managed on the blockchain. This could include real-world assets like real estate, commodities, or even digital assets that are not stored directly on the blockchain.

In some implementations, off-chain actions may also comprise state channels, rollups, and/or sidechains. For example, these are off-chain scaling solutions that enable parties to conduct transactions or execute self-executing programs off the main chain. State channels allow participants to interact directly with each other off-chain, updating the state between them, while sidechains are separate blockchains that can be connected to the main blockchain, facilitating faster and more scalable transactions. In the context of blockchain and cryptocurrency, a "rollup" may be a layer 2 scaling solution. It is designed to improve the efficiency and scalability of blockchain networks. Rollups work by processing and bundling multiple transactions off-chain, and then submitting a single transaction to the main blockchain. This helps reduce congestion and lower transaction costs.

In some implementations, off-chain actions may also comprise usage of off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some implementations, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 1500 may use one or more on-chain actions related to network 1510. Network 1510 may comprise a blockchain. As described herein, a blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the practically impossible to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

For example, network 1510 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some implementations, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed Ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 1510 may be used by system 1500 to manage and/or facilitate one or more cryptographically secure digital assets (e.g., asset 1508). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries. Users may access and manage these assets using cryptographic keys. Public and private keys allow users to securely interact with the assets, sign transactions, and prove ownership without revealing sensitive information.

Network 1510 may be used to facilitate communications (e.g., blockchain actions) irrespective of whether a resource is on-line. For example, a resource in a network may be "online," whether it is a device, service, and/or application, when it is currently connected and available for communication and interaction within the network. In contrast, a resource may be off-line when it is not on-line. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in implementations, in which the resource is a bank account, bank branch, etc. the resource may be on-line when the resource (or assets held by the resource) are reachable and responsive to requests or communication attempts from other devices or users on the network.

In some implementations, system 1500 may be used to manage resources across network 1510. For example, system 1500 may manage resources based on the availability of resources in network 1510. In some implementations, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some implementations, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position. For example, a tokenized availability of a resource may correspond to assets available at a given resource (e.g., a digital account). The transfer of this may correspond to the assets being transferred from one resource to another.

In some implementations, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the self-executing program's code to validate the possession or existence of the digital asset before executing certain actions or operations. For example, developers encode conditions within the self-executing program's code using a programming language suitable for self-executing programs (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the program may check this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability on a resource) from other availability (or availability on another resource). In some implementations, characteristics of availability in resources within a computer network may refer to attributes or factors that define the accessibility, reliability, and continuity of these resources. For example, in implementations describing the transfer of availability, the availability may be transferred by a change (or transfer) of a characteristic of the availability being transferred.

For example, a characteristic may refer to uptime and reliability as availability is associated with the ability of resources to remain operational and accessible over time without unexpected interruptions. High availability implies minimal downtime and consistent reliability. In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some implementations, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets'characteristics. In some implementations, the system may employ decision models or algorithms that factor in the weighted criteria and analysis to generate a scoring system or rank the assets based on their suitability for the system's requirements.

FIG. 15B shows an illustrative architecture for managing resources across global or cloud networks, in accordance with one or more implementations. For example, in FIG. 15B, system 1500 may receive, at a platform application, a first user request to perform a first off-chain action. For example, the off-chain action may represent resource 1502 (e.g., a buyer) creating a self-executing program (e.g., self-executing program 1506). The system may determine a first blockchain action that corresponds to first off-chain action. As referred to herein, a self-executing program (or smart contract) may comprise a program with predefined terms (e.g., terms of an agreement between buyer and seller) written into the code of the program. The self-executing program may be implemented on blockchain platforms, such as Ethereum, which allows for decentralized and automated execution of terms without the need for intermediaries. The self-executing program may be programmed to automatically enforce, verify, and/or facilitate the negotiation or performance of a predefined term (e.g., contract), eliminating the need for a trusted third party. These programs may run on a blockchain, which is a distributed and immutable ledger that records all transactions across a network of computers.

System 1500 may receive a first request, at a first action specific self-executing program, to perform a first blockchain action using a first resource, wherein the first blockchain action is encoded in the first action specific self-executing program. The request (e.g., a computer request) may refer to a communication or a query made by a computer or a software application to another computer, server, and/or device on a network. This request is typically initiated by a client computer seeking specific information, data, resources, or services from a server or another computing device. As described herein, an action-specific self-executing program may refer to a type of self-executing program designed to execute or facilitate a specific action, task, or set of predefined operations within a blockchain network. Unlike general-purpose self-executing programs that can handle various functions, an action-specific self-executing program is tailored to perform a particular action or a limited range of actions based on predefined conditions.

The system may also receive a transfer of cash or other assets that are tokenized on blockchain network 1510 as cryptographically secure digital asset 1514. For example, the system may determine, at the first action specific self-executing program (e.g., self-executing program 1506), a first condition for performing the first blockchain action, wherein the first condition is encoded in the first action specific self-executing program. For example, the first condition may comprise a required amount of available digital assets (or cash or other assets) at a given resource.

In a self-executing program, a condition may refer to a predefined rule, criteria, or set of instructions written into the program's code that determines how the program operates or executes. Conditions establish the logic and parameters that must be met for the self-executing program to perform specific actions or trigger certain outcomes. Conditions define the logic or decision-making process within the self-executing program. They specify the circumstances under which the program will perform certain functions, make decisions, or execute predefined actions.

Conditions are often associated with trigger events or specific states within the blockchain network. When these trigger events occur, the conditions embedded in the self-executing program are evaluated, and corresponding actions are executed if the conditions are met. Conditions can depend on various input parameters, such as timestamps, user input, external data feeds, or the state of other programs or variables within the blockchain network. Based on the fulfillment or non-fulfillment of conditions, a self-executing program may execute specific actions, proceed with a transaction, release funds, transfer tokens, update states, or terminate its execution.

In some implementations, the condition may be a time-based conditions (e.g., a self-executing program might have conditions that execute a particular action only after a specific date, time, or a defined duration has elapsed), threshold conditions (e.g., conditions might specify that a certain number of participants need to approve an action or that a certain amount of tokens needs to be accumulated before an action is executed), external data conditions (e.g., self-executing programs can incorporate external data sources, and conditions may rely on data retrieved from these sources to trigger actions).

Conditions in a self-executing program are encoded using programming languages and specific syntax within the code of the self-executing program. Self-executing programs are typically written in specialized programming languages, such as Solidity for Ethereum or Chaincode for Hyperledger Fabric, and these languages have their syntax and structures to encode conditions. In response to a user request, the system may write self-executing programs using programming languages specifically designed for blockchain platforms. They use the language's syntax and logic to encode conditions within the contract's code. Programming languages used for self-executing programs offer conditional statements (if, else if, else) that allow developers to specify conditions and define the actions or behaviors to be executed based on the evaluation of these conditions. The user request may define the logic, rules, and parameters for conditions within the contract's code. This includes specifying trigger events, input variables, comparison operations, and logical operators to create the conditions. Some self-executing program languages allow the creation of event handlers that can detect external triggers or changes in the blockchain state. These event handlers can be associated with specific conditions to execute actions when triggered.

Self-executing program 1506 may then monitor for the tokenized availability (e.g., cryptographically secure digital assets corresponding to a sale price in self-executing program 1506). For example, the system may receive, by the first action specific self-executing program, a first tokenized availability of the first resource from a first blockchain network. Tokenized availability may refer to the representation or conversion of the availability of assets, resources, or services into digital tokens or cryptographic tokens on a blockchain or digital ledger. It involves using tokens as a representation or proof of ownership, access rights, or availability of certain resources within a decentralized network.

FIG. 15C shows an illustrative architecture for managing resources across global or cloud networks, in accordance with one or more implementations. For example, system 1500 may determine, by the first action specific self-executing program, whether to perform the first blockchain action based on comparing the first condition to the first tokenized availability. For example, the system may determine whether or not to execute the self-executing program. The system may make this determination based on one or more criteria.

As shown in FIG. 15C, the system may determine whether conditions of the self-executing program have been completed. In some implementations, in response to determining to perform the first blockchain action, the system may transmit a second user request to complete the first off-chain action. For example, the system may determine whether a seller delivers services or goods to buyer in accordance with the self-executing program terms and conditions. In such cases, the system may query a buyer and/or seller or request other information of an off-chain action.

The system may execute the first blockchain action, by the first action specific self-executing program, based on determining that the first off-chain action is completed, wherein executing the first blockchain action causes the first tokenized availability of the first resource to be transferred to a second resource.

The system may receive, at the platform application, a confirmation of the first blockchain action being executed. A confirmation of a blockchain action being executed may refer to the acknowledgment or verification that a specific transaction or operation has been successfully processed and added to the blockchain.

Figure 16:
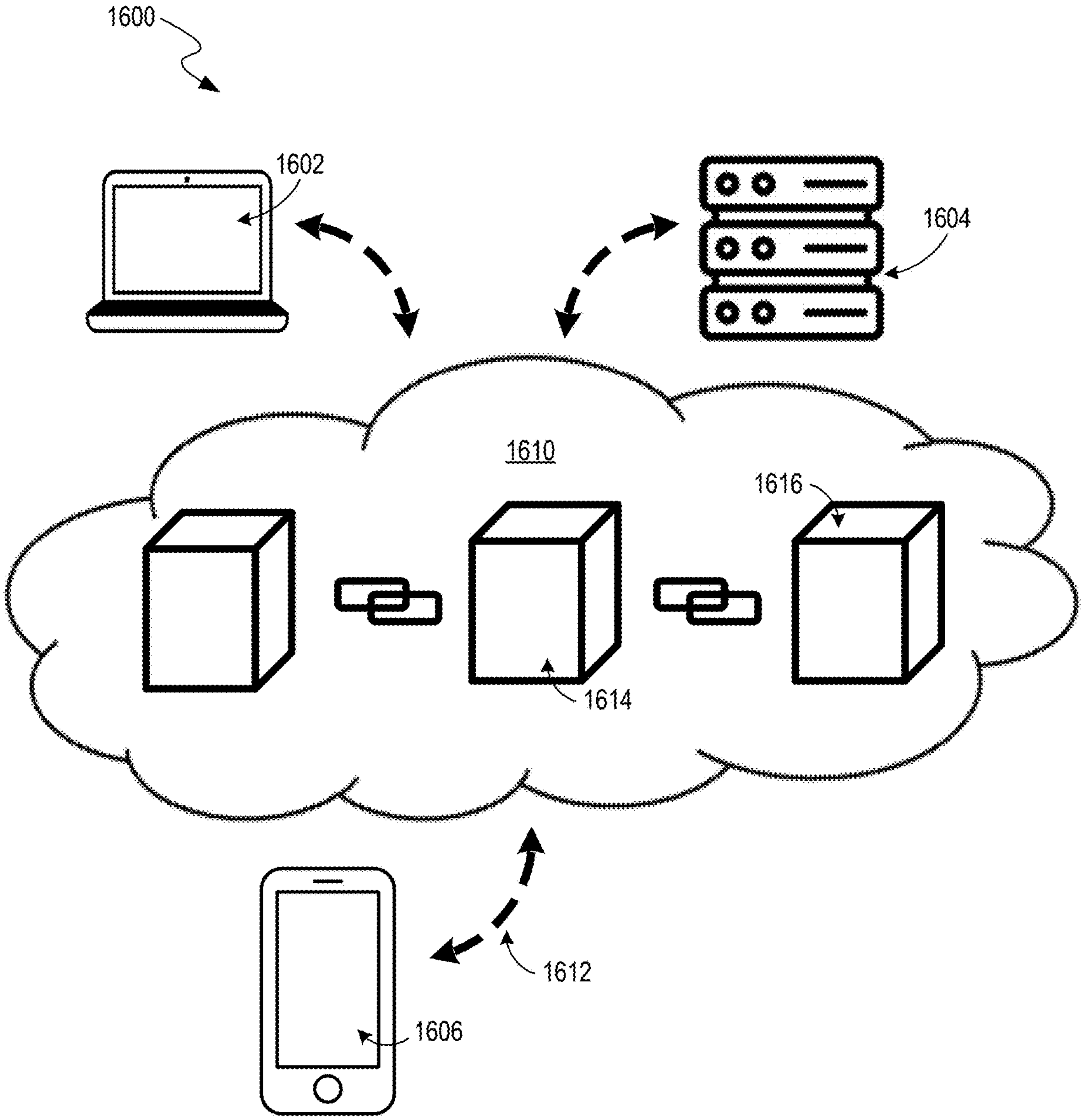
FIG. 16 shows an illustrative diagram of an implementation featuring a blockchain network, in accordance with one or more implementations.

FIG. 16 shows an illustrative diagram of an implementation featuring a blockchain network, in accordance with one or more implementations. For example, system 1600 may comprise a distributed state machine, in which each of the components in FIG. 16 acts as a client of system 1600. For example, system 1600 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 1610.

As referred to herein, blockchain 1610 may comprise a type of distributed ledger technology that consists of growing list of records, called blocks (e.g., block 1614 and block 1616), that are securely linked together using cryptography. Each block may contain a cryptographic hash of the previous block (e.g., block 1616 may contain a cryptographic hash of block 1614), and that cryptographic hash may itself be based on a state of a preceding block (e.g., the cryptographic hash of block 1616 is based not only on the state of block 1614). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some implementations, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 16, system 1600 comprises user device 1602, user device 1604, and user device 1606. It should be noted that, while shown as a smartphone, a personal computer, and a server in FIG. 16, the user devices may be any type of computing device, including, but not limited to, a laptop computer, a tablet computer, a hand-held computer, and/or other computing equipment (e.g., a server), including "smart," wireless, wearable, and/or mobile devices. It should be noted that implementations describing system 1600 performing a blockchain action may equally be applied to, and correspond to, an individual user device (e.g., user device 1602, user device 1604, and/or user device 1606) performing the blockchain action. That is, system 1600 may correspond to the user devices (e.g., user device 1602, user device 1604, and/or user device 1606) collectively or individually.

For example, system 1600 may comprise a plurality of nodes for blockchain 1610. Each node may correspond to a user device (e.g., user device 1602, user device 1604, and/or user device 1606). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some implementations, the user devices of system 1600 may comprise one or more cloud components. For example, cloud components may be implemented as a cloud computing system and may feature one or more component devices. It should also be noted that system 1600 is not limited to three devices. Users may, for instance, utilize one or more devices to interact with one another, one or more servers, or other components of system 1600. It should be further noted that while one or more actions (e.g., blockchain actions) are described herein as being performed by a particular component (e.g., user device 1602) of system 1600, those actions may, in some implementations, be performed by other components of system 1600. As an example, while one or more actions are described herein as being performed by components of user device 1602, those actions may, in some implementations, be performed by one or more cloud components. In some implementations, the various computers and systems described herein may include one or more computing devices that are programmed to perform the described functions. Additionally, or alternatively, multiple users may interact with system 1600 and/or one or more components of system 1600. For example, in one implementation, a first user and a second user may interact with system 1600 using two different components (e.g., user device 1604 and user device 1606, respectively). Additionally, or alternatively, a single user (and/or a user account linked to a single user) may interact with system 1600 and/or one or more components of system 1600 using two different components (e.g., user device 1602 and user device 1606, respectively).

With respect to the components of system 1600, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 16, both user device 1602 and user device 1606 include a display upon which to display data (e.g., content related to one or more blockchain actions).

Additionally, the devices in system 1600 may run an application (or another suitable program). The application may cause the processors and/or control circuitry to perform operations related to determining resource availability within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 16 also includes network 1612, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 17:
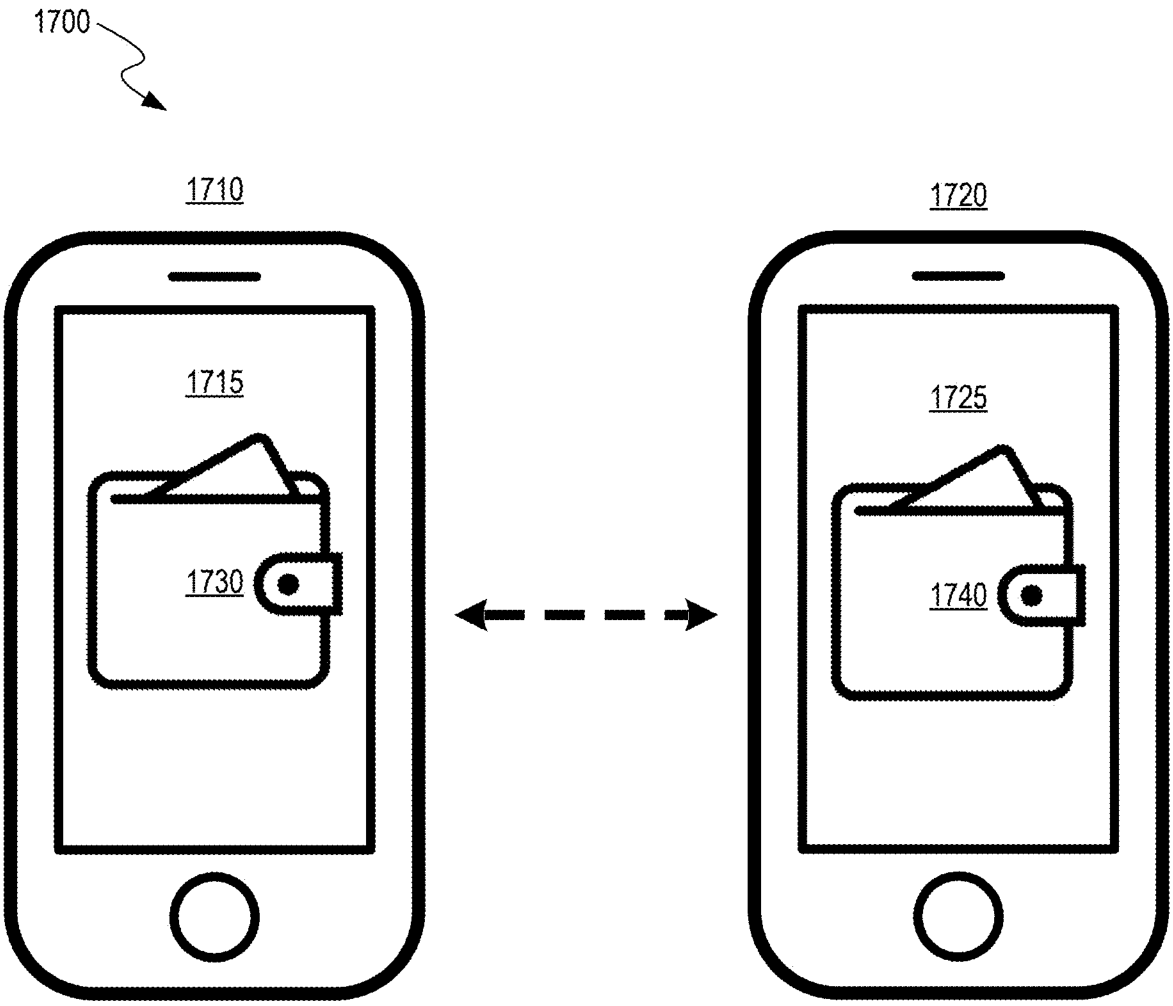
FIG. 17 shows an illustrative diagram for performing a blockchain action, in accordance with one or more implementations.

FIG. 17 shows an illustrative diagram for conducting blockchain actions, in accordance with one or more implementations. For example, the diagram presents various components that may be used to determining resource availability in some implementations.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some implementations, a blockchain action may comprise the creation, modification, detection, and/or execution of a smart contract or program stored on a blockchain. For example, a self-executing program may comprise a program stored on a blockchain that is executed (e.g., automatically and/or without any intermediary's involvement or time loss following a trigger) when one or more predetermined conditions are met. In some implementations, a blockchain action may comprise the creation, modification, exchange, and/or review of a token (e.g., a digital blockchain-specific asset), including a nonfungible token. A nonfungible token may comprise a token that is associated with a good, a service, a self-executing program, and/or other content that may be verified by, and stored using, blockchain technology. In some implementations, blockchain actions may also comprise actions related to mechanisms that facilitate other blockchain actions (e.g., actions related to metering activities for blockchain actions on a given blockchain network).

FIG. 17 includes system 1700, which includes user device 1710 and user device 1720, although other devices and/or components may also be featured in system 1700 (e.g., one or more of devices and/or components shown in FIG. 16). User device 1710 includes user interface 1715. User device 1720 includes user interface 1725. As referred to herein, a "user interface" may comprise a mechanism for human-computer interaction and communication in a device and may include display screens, keyboards, a mouse, and the appearance of a desktop. For example, a user interface may comprise a way for a user interact with and/or access an application, website, and/or other program in order to determining resource availability. A user interface may display content related to resources. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some implementations, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some implementations, gas that is earmarked for a blockchain action may be refunded back to the originator of the blockchain action if, after the computation is executed, an amount remains unused.

As shown in FIG. 17, one or more user devices may include a cryptography-based, storage application (e.g., cryptography-based, storage application 1730 and cryptography-based, storage application 1740) used to perform blockchain actions. The cryptography-based, storage application may be used to perform a plurality of blockchain actions across a computer network. For example, the cryptography-based, storage application may comprise a decentralized application that functions to perform one or more blockchain actions.

In some implementations, the cryptography-based, storage application may comprise and/or be compatible with one or more application program interfaces (e.g., APIs). For example, an API may be implemented on user device 1710 and/or communicate with an API implemented on user device 1720. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate resource management. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some implementations, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 1700 may be partially based on the API, such that there is strong adoption of SOAP and RESTful web services, using resources such as Service Repository and Developer Portal, but with low governance, standardization, and separation of concerns. Alternatively, system 1700 may be fully based on the API, such that separation of concerns between layers such as an API layer, services, and applications are in place.

In some implementations, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some implementations, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration.

In some implementations, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower-level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some implementations, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some implementations, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some implementations, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some implementation, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

In some implementations, to conduct a blockchain action, user device 1710, user interface 1715, and/or cryptography-based, storage application 1730) may comprise, control, and/or have access to a private key and/or digital signature. For example, system 1700 may use cryptographic systems for conducting blockchain actions such as resource management. For example, system 1700 may use public-key cryptography, which features a pair of digital keys (e.g., which may comprise strings of data). In such cases, each pair comprises a public key (e.g., which may be public) and a private key (e.g., which may be kept private). System 1700 may generate the key pairs using cryptographic algorithms (e.g., featuring one-way functions). System 1700 may then encrypt a message (or other blockchain action) using an intended receiver's public key such that the encrypted message may be decrypted only with the receiver's corresponding private key. In some implementations, system 1700 may combine a message with a private key to create a digital signature on the message. For example, the digital signature may be used to verify the authenticity of blockchain actions. As an illustration, when conducting blockchain actions, system 1700 may use the digital signature to prove to every node in the system that it is authorized to conduct the blockchain actions.

For example, user device 1710 may request a blockchain action (e.g., conduct a transaction). The blockchain action may be authenticated by user device 1710 and/or another node (e.g., a user device in the community network of system 1700). For example, using cryptographic keys, system 1700 may identify users and give access to their respective user accounts (e.g., corresponding digital wallets) within system 1700. Using private keys (e.g., known only to the respective users) and public keys (e.g., known to the community network), system 1700 may create digital signatures to authenticate the users.

Following an authentication of the blockchain action, the blockchain action may be authorized. For example, after the blockchain action is authenticated between the users, system 1700 may authorize the blockchain action prior to adding it to the blockchain. System 1700 may add the blockchain action to a blockchain (e.g., blockchain 1610 (FIG. 16)) as part of a new block (e.g., block 1616 (FIG. 16)). System 1700 may perform this based on a consensus of the user devices within system 1700. For example, system 1700 may rely on a majority (or other metric) of the nodes in the community network to determine that the blockchain action is valid. In response to validation of the block, a node user device (e.g., user device 1720) in the community network (e.g., a miner) may receive a reward (e.g., in a given cryptocurrency) as an incentive for validating the block.

To validate the blockchain action, system 1700 may use one or more validation protocols and/or validation mechanisms. For example, system 1700 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 1700 may use a proof-of-stake mechanism in which a user account (e.g., corresponding to a node on the blockchain network) is required to have, or "stake," a predetermined amount of tokens in order for system 1700 to recognize it as a validator in the blockchain network.

In response to validation of the block, the block is added to a blockchain (e.g., blockchain 1610 (FIG. 16)), and the blockchain action is completed. For example, to add the blockchain action to blockchain, the successful node (e.g., the successful miner) encapsulates the blockchain action in a new block before transmitting the block throughout system 1700.

In some implementations, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 1730) may allow a user device (e.g., user device 1710) to share files, access, and/or perform a blockchain action with another user device (e.g., user device 1720) and/or cryptography-based, storage application (e.g., cryptography-based, storage application 1740). For example, the peer-to-peer architecture and decentralized nature allows blockchain actions to be conducted between the user devices, without the need of any intermediaries or central authorities.

Figure 18:
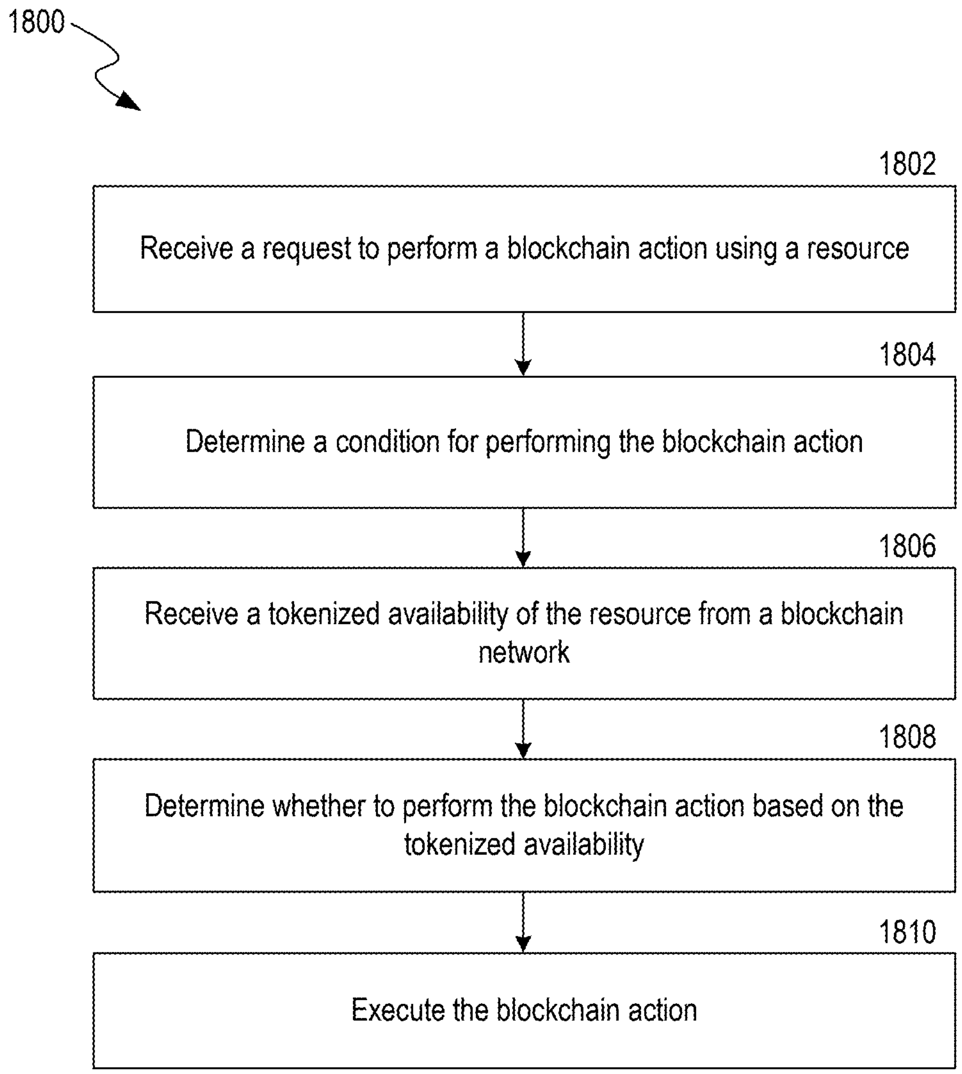
FIG. 18 shows a flowchart of the operations involved in determining availability of resources across global or cloud computer networks, in accordance with one or more implementations.

FIG. 18 shows a flowchart of the operations involved in determining availability of resources across global or cloud computer networks, in accordance with one or more implementations. For example, the system may use process 1800 (e.g., as implemented on one or more system components described above) in order to determine availability of resources across global or cloud computer networks while mitigating issues related to providing services with unstable resources At operation 1802, process 1800 (e.g., using one or more components described above) receives a request to perform a blockchain action using a resource. For example, the system may receive a first request, at a first action specific self-executing program, to perform a first blockchain action using a first resource, wherein the first blockchain action is encoded in the first action specific self-executing program.

In some implementations, encoding the first blockchain action in the first action specific self-executing program may comprise the system (e.g., a self-executing program) receiving the first resource as a first statement in the first action specific self-executing program. A statement refers to a line or a set of instructions written in the code of the self-executing program. These statements represent specific actions, commands, or operations that the self-executing program is programmed to execute when certain conditions are met. Statements are fundamental building blocks of smart contract code. They are written using programming languages specific to the blockchain platform (e.g., Solidity for Ethereum, Chaincode for Hyperledger Fabric) and define the logic and operations of the self-executing program. Statements consist of commands, functions, or instructions that direct the smart contract on how to process data, interact with the blockchain network, manipulate variables, perform calculations, handle transactions, or execute conditional operations. Statements can include conditional structures (such as if-else statements), loops, variable assignments, function calls, event triggers, and other programming constructs that control the flow of execution within the self-executing program.

Additionally or alternatively, the system may receive a first logic in the first action specific self-executing program that determines the second resource upon execution of the first action specific self-executing program. Logic refers to the set of rules, conditions, and instructions encoded within the self-executing program's code that govern its behavior, decision-making process, and execution flow. It encompasses the logical operations, conditional statements, and procedural instructions that define how the self-executing program operates and responds to various inputs or conditions.

In some implementations, encoding the first blockchain action in the first action specific self-executing program may comprise the system receiving a first value for satisfying the first condition. For example, the first value for satisfying the first condition may can incorporate information from external data sources, and conditions may rely on data retrieved from these sources to trigger actions. For instance, a weather-based insurance smart contract may pay out based on weather data obtained from an oracle. As another example, conditions might specify that a certain number of participants (e.g., indicated by the value) need to approve an action or that a certain amount of tokens needs to be accumulated before an action is executed. Additionally or alternatively, the system may receive a first time for satisfying a second condition. For example, the second value may be a particular action that executes the self-executing program only after a specific date, time, or a defined duration has elapsed.

At operation 1804, process 1800 (e.g., using one or more components described above) determines a condition for performing the blockchain action. For example, the system may determine, at the first action specific self-executing program, a first condition for performing the first blockchain action, wherein the first condition is encoded in the first action specific self-executing program.

At operation 1806, process 1800 (e.g., using one or more components described above) receives a tokenized availability of the resource from a blockchain network. For example, the system may receive, by the first action specific self-executing program, a first tokenized availability of the first resource from a first blockchain network.

At operation 1808, process 1800 (e.g., using one or more components described above) determines whether to perform the blockchain action based on the tokenized availability. For example, the system may determine, by the first action specific self-executing program, whether to perform the first blockchain action based on comparing the first condition to the first tokenized availability.

In some implementations, the system may determine whether to perform the first blockchain action is based on comparing the first condition to the first tokenized availability, determining a first actual availability for a first resource in a first computer network based on the first tokenized availability, and determining that the first condition corresponds to the first actual availability. For example, the system may define a specific condition or set of criteria that need to be met for triggering a blockchain action. This condition can be related to resource availability, a specific value threshold, time-based parameters, or any other predefined rule. The system may maintain tokenized representations or digital tokens that signify the availability or capacity of resources within the computer network. These tokens could represent the available resources or their capacity in a digital form. The system may compare the condition set for the blockchain action with the tokenized availability. It checks if the condition aligns with the tokenized representation of resource availability in the network. The system may utilize the tokenized availability to derive or determine the corresponding actual availability of the resource within the computer network. This involves a process where tokenized availability is converted or mapped to reflect the real-time or current status of the resource. The system may then compare the condition specified for the blockchain action with the determined actual availability of the resource. It verifies whether the condition matches or corresponds to the verified real-time availability status of the resource within the network. Based on the comparison between the condition, tokenized availability, and actual availability, the system may make a decision regarding whether the condition aligns with the current state of the resource. If the condition matches the actual availability, the system proceeds to perform the blockchain action. If the comparison confirms that the condition corresponds to the verified actual availability, the system triggers the specified blockchain action, such as initiating a transaction, updating a smart contract, or executing a programmed function on the blockchain. The system may record the executed action on the blockchain and maintains a log or record of the process, documenting the correlation between the condition, tokenized availability, and actual resource availability for auditing or future reference.

In some implementations, determining whether to perform the first blockchain action may be based on transmitting a second user request to complete a first off-chain action and determining that the first off-chain action is completed. For example, oracles are entities or services that provide off-chain data or trigger off-chain actions in a blockchain network. They act as bridges between the blockchain and external data sources or systems, enabling self-executing programs to interact with real-world information or execute actions that occur outside the blockchain. The self-executing program sends a request or query to the oracle, specifying the necessary information or action to be performed off-chain. This request could involve retrieving data from APIs, accessing databases, executing external systems, or any other action outside the blockchain. The oracle receives the request from the self-executing program and performs the necessary operations or accesses external resources to fulfill the requested action off-chain. This could involve interacting with external APIs, databases, sensors, or other systems.

In some implementations, the system may select cryptographically secure digital assets (or amount thereof) based on actual availability. For example, the system may determine a first actual availability for the first resource in a first computer network. The system may determine a first cryptographically secure digital asset corresponding to the first actual availability. The system may record the first cryptographically secure digital asset in a digital log. The system may continuously monitor or periodically checks the status and availability of the resource within the computer network. This monitoring can involve network probes, status queries, or other monitoring tools to assess the resource's accessibility. Upon monitoring, the system may gather data or metrics to measure the resource's availability. It might include metrics like uptime, response time, network connectivity, or any other relevant parameters that define the resource's accessibility. Once the system determines the current availability status of the resource, it associates this verified status with a specific cryptographically secure digital asset. This asset serves as a representation or tokenization of the resource's availability. The system may employ cryptographic techniques such as hashing, encryption, digital signatures, or other secure methods to ensure the integrity, authenticity, and immutability of the digital asset associated with the resource's availability. This enhances the security and trustworthiness of the recorded information. The system may record the association between the cryptographically secure digital asset and the verified actual availability of the resource in a digital log or ledger. This log acts as a tamper-proof record of the resource's availability status over time. Each entry in the digital log is timestamped to indicate the time of recording. This helps in tracking changes, auditing the history of resource availability, and providing a chronological record of events for analysis or compliance purposes.

At operation 1810, process 1800 (e.g., using one or more components described above) executes the blockchain action. For example, the system may execute the first blockchain action, by the first action specific self-executing program, based on determining to perform the first blockchain action, wherein executing the first blockchain action causes the first tokenized availability of the first resource to be transferred to a second resource.

In some implementations, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some implementations, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party paid for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcasted to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

In some implementations, executing the first blockchain action based on determining to perform the first blockchain action may comprise the system recording the first cryptographically secure digital asset in a digital log for the second resource. The system may determine a second actual availability for the second resource based on the first cryptographically secure digital asset. The system may transmit a second verification that the second resource has the second actual availability.

It is contemplated that the operations or descriptions of FIG. 18 may be used with any other implementation of this disclosure. In addition, the operations and descriptions described in relation to FIG. 18 may be done in alternative orders or in parallel to further the purposes of this disclosure. For example, each of these operations may be performed in any order, in parallel, or simultaneously to reduce lag or increase the speed of the system or method. Furthermore, it should be noted that any of the components, devices, or equipment discussed in relation to the figures above could be used to perform one or more of the operations in FIG. 18.

Example Implementation of the Models of the Agent Management Platform

Figure 19:
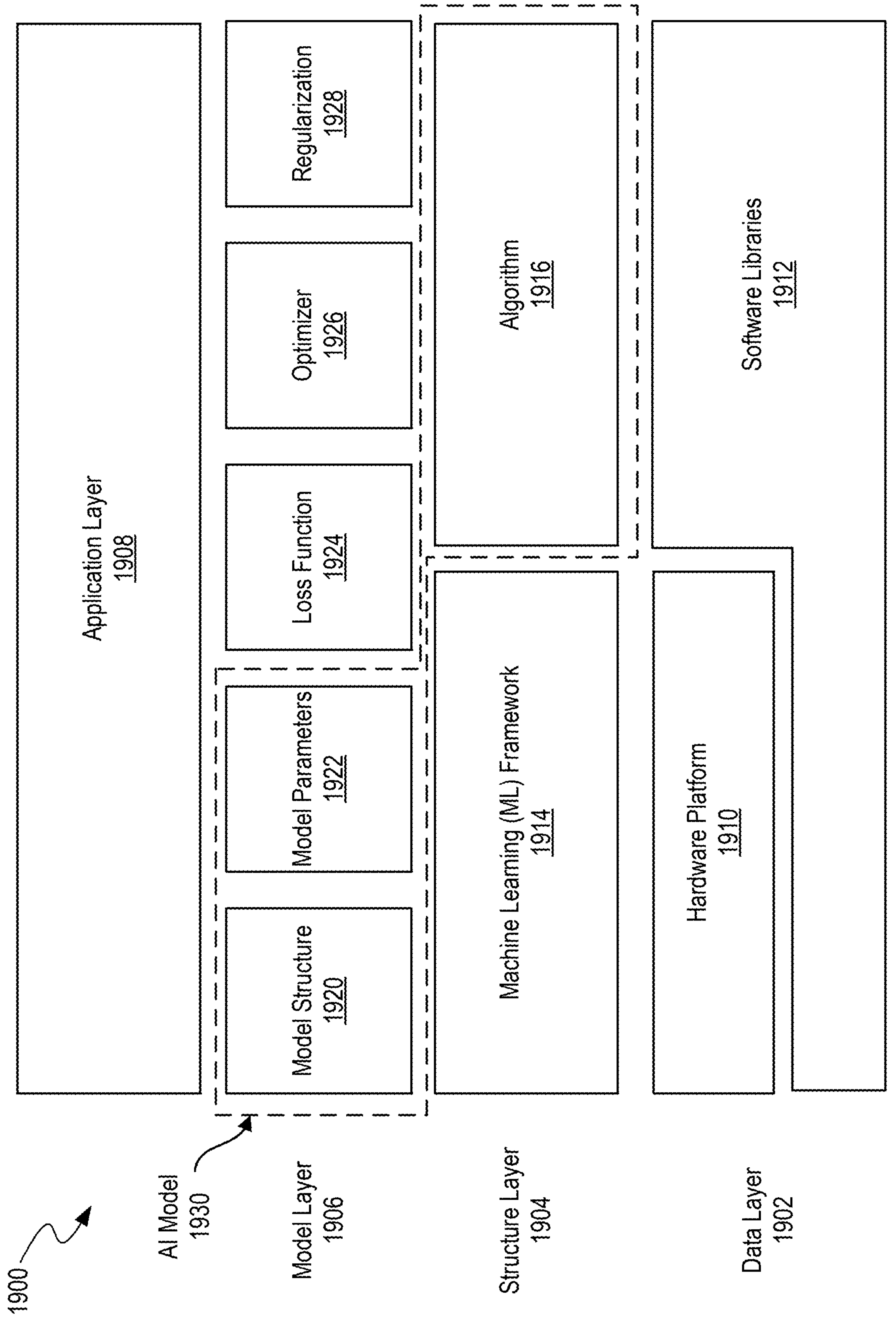
FIG. 19 illustrates a layered architecture of an AI system that can implement the machine learning models of an agent management platform, in accordance with some implementations of the present technology.

FIG. 19 illustrates a layered architecture of an AI system 1900 that can implement the ML models of the agent management platform of FIG. 9, in accordance with some implementations of the present technology. Example ML models can include the models executed by the agent management platform, such as agents 904. Accordingly, the agents 904 can include one or more components of the AI system 1900.

As shown, the AI system 1900 can include a set of layers, which conceptually organize elements within an example network topology for the AI system's architecture to implement a particular AI model. Generally, an AI model is a computer-executable program implemented by the AI system 1900 that analyses data to make predictions. Information can pass through each layer of the AI system 1900 to generate outputs for the AI model. The layers can include a data layer 1902, a structure layer 1904, a model layer 1906, and an application layer 1908. The algorithm 1916 of the structure layer 1904 and the model structure 1920 and model parameters 1922 of the model layer 1906 together form an example AI model. The optimizer 1926, loss function engine 1924, and regularization engine 1928 work to refine and optimize the AI model, and the data layer 1902 provides resources and support for application of the AI model by the application layer 1908.

The data layer 1902 acts as the foundation of the AI system 1900 by preparing data for the AI model. As shown, the data layer 1902 can include two sub-layers: a hardware platform 1910 and one or more software libraries 1912. The hardware platform 1910 can be designed to perform operations for the AI model and include computing resources for storage, memory, logic and networking, such as the resources described in relation to FIGS. 20 and 21. The hardware platform 1910 can process amounts of data using one or more servers. The servers can perform backend operations such as matrix calculations, parallel calculations, machine learning (ML) training, and the like. Examples of servers used by the hardware platform 1910 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1910 can include computing resources, (e.g., servers, memory, etc.) offered by a cloud services provider. The hardware platform 1910 can also include computer memory for storing data about the AI model, application of the AI model, and training data for the AI model. The computer memory can be a form of random-access memory (RAM), such as dynamic RAM, static RAM, and non-volatile RAM.

The software libraries 1912 can be thought of suites of data and programming code, including executables, used to control the computing resources of the hardware platform 1910. The programming code can include low-level primitives (e.g., fundamental language elements) that form the foundation of one or more low-level programming languages, such that servers of the hardware platform 1910 can use the low-level primitives to carry out specific operations. The low-level programming languages do not require much, if any, abstraction from a computing resource's instruction set architecture, enabling them to run quickly with a small memory footprint. Examples of software libraries 1912 that can be included in the AI system 1900 include INTEL Math Kernel Library, Nvidia cuDNN, EIGEN, and OpenBLAS.

The structure layer 1904 can include an ML framework 1914 and an algorithm 1916. The ML framework 1914 can be thought of as an interface, library, or tool that enables users to build and deploy the AI model. The ML framework 1914 can include an open-source library, an API, a gradient-boosting library, an ensemble method, and/or a deep learning toolkit that work with the layers of the AI system facilitate development of the AI model. For example, the ML framework 1914 can distribute processes for application or training of the AI model across multiple resources in the hardware platform 1910. The ML framework 1914 can also include a set of pre-built components that have the functionality to implement and train the AI model and enable users to use pre-built functions and classes to construct and train the AI model. Thus, the ML framework 1914 can be used to facilitate data engineering, development, hyperparameter tuning, testing, and training for the AI model. Examples of ML frameworks 1914 that can be used in the AI system 1900 include TENSORFLOW, PYTORCH, SCIKIT-LEARN, KERAS, LightGBM, RANDOM FOREST, and AMAZON WEB SERVICES.

The algorithm 1916 can be an organized set of computer-executable operations used to generate output data from a set of input data and can be described using pseudocode. The algorithm 1916 can include complex code that enables the computing resources to learn from new input data and create new/modified outputs based on what was learned. In some implementations, the algorithm 1916 can build the AI model through being trained while running computing resources of the hardware platform 1910. This training enables the algorithm 1916 to make predictions or decisions without being explicitly programmed to do so. Once trained, the algorithm 1916 can run at the computing resources as part of the AI model to make predictions or decisions, improve computing resource performance, or perform tasks. The algorithm 1916 can be trained using supervised learning, unsupervised learning, semi-supervised learning, and/or reinforcement learning.

Using supervised learning, the algorithm 1916 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of input 902 in FIG. 9) from various source computing systems described in relation to FIG. 9. Furthermore, training data can include pre-processed data generated by various engines of the agent management platform described in relation to FIG. 9. The user may label the training data based on one or more classes and trains the AI model by inputting the training data to the algorithm 1916. The algorithm determines how to label the new data based on the labeled training data. The user can facilitate collection, labeling, and/or input via the ML framework 1914. In some instances, the user may convert the training data to a set of feature vectors for input to the algorithm 1916. Once trained, the user can test the algorithm 1916 on new data to determine if the algorithm 1916 is predicting accurate labels for the new data. For example, the user can use cross-validation methods to test the accuracy of the algorithm 1916 and retrain the algorithm 1916 on new training data if the results of the cross-validation are below an accuracy threshold.

Supervised learning can include classification and/or regression. Classification techniques include teaching the algorithm 1916 to identify a category of new observations based on training data and are used when input data for the algorithm 1916 is discrete. Said differently, when learning through classification techniques, the algorithm 1916 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1916 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 1916 is continuous. Regression techniques can be used to train the algorithm 1916 to predict or forecast relationships between variables. To train the algorithm 1916 using regression techniques, a user can select a regression method for estimating the parameters of the model. The user collects and labels training data that is input to the algorithm 1916 such that the algorithm 1916 is trained to understand the relationship between data features and the dependent variable(s). Once trained, the algorithm 1916 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 1916 learns patterns from unlabeled training data. In particular, the algorithm 1916 is trained to learn hidden patterns and insights of input data, which can be used for data exploration or for generating new data. Here, the algorithm 1916 does not have a predefined output, unlike the labels output when the algorithm 1916 is trained using supervised learning. Said another way, unsupervised learning is used to train the algorithm 1916 to find an underlying structure of a set of data, group the data according to similarities, and represent that set of data in a compressed format. The agent management platform can use unsupervised learning to identify patterns in claim history (e.g., to identify particular event sequences) and so forth. In some implementations, performance of the agent management platform that can use unsupervised learning is improved because the incoming input 902 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1916 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1916 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1916 include factor analysis, item response theory, latent profile analysis, and latent class analysis.

The model layer 1906 implements the AI model using data from the data layer and the algorithm 1916 and ML framework 1914 from the structure layer 1904, thus enabling decision-making capabilities of the AI system 1900. The model layer 1906 includes a model structure 1920, model parameters 1922, a loss function engine 1924, an optimizer 1926, and a regularization engine 1928.

The model structure 1920 describes the architecture of the AI model of the AI system 1900. The model structure 1920 defines the complexity of the pattern/relationship that the AI model expresses. Examples of structures that can be used as the model structure 1920 include decision trees, support vector machines, regression analyses, Bayesian networks, Gaussian processes, genetic algorithms, and artificial neural networks (or, simply, neural networks). The model structure 1920 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1920 may include one or more hidden layers of nodes between the input and output layers. The model structure 1920 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1922 represent the relationships learned during training and can be used to make predictions and decisions based on input data. The model parameters 1922 can weight and bias the nodes and connections of the model structure 1920. For instance, when the model structure 1920 is a neural network, the model parameters 1922 can weight and bias the nodes in each layer of the neural networks, such that the weights determine the strength of the nodes and the biases determine the thresholds for the activation functions of each node. The model parameters 1922, in conjunction with the activation functions of the nodes, determine how input data is transformed into desired outputs. The model parameters 1922 can be determined and/or altered during training of the algorithm 1916.

The loss function engine 1924 can determine a loss function, which is a metric used to evaluate the AI model's performance during training. For instance, the loss function engine 1924 can measure the difference between a predicted output of the AI model and the actual output of the AI model and is used to guide optimization of the AI model during training to minimize the loss function. The loss function may be presented via the ML framework 1914, such that a user can determine whether to retrain or otherwise alter the algorithm 1916 if the loss function is over a threshold. In some instances, the algorithm 1916 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1926 adjusts the model parameters 1922 to minimize the loss function during training of the algorithm 1916. In other words, the optimizer 1926 uses the loss function generated by the loss function engine 1924 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1926 used may be determined based on the type of model structure 1920 and the size of data and the computing resources available in the data layer 1902.

The regularization engine 1928 executes regularization operations. Regularization is a technique that prevents over- and under-fitting of the AI model. Overfitting occurs when the algorithm 1916 is overly complex and too adapted to the training data, which can result in poor performance of the AI model. Underfitting occurs when the algorithm 1916 is unable to recognize even basic patterns from the training data such that it cannot perform well on training data or on validation data. The optimizer 1926 can apply one or more regularization techniques to fit the algorithm 1916 to the training data properly, which helps constraint the resulting AI model and improves its ability for generalized application. Examples of regularization techniques include lasso (L1) regularization, ridge (L2) regularization, and elastic (L1 and L2 regularization).

The application layer 1908 describes how the AI system 1900 is used to solve problem or perform tasks. In an example implementation, the application layer 1908 can include a front-end user interface of the agent management platform.

Example Computing Environment of the Agent Management Platform

Figure 20:
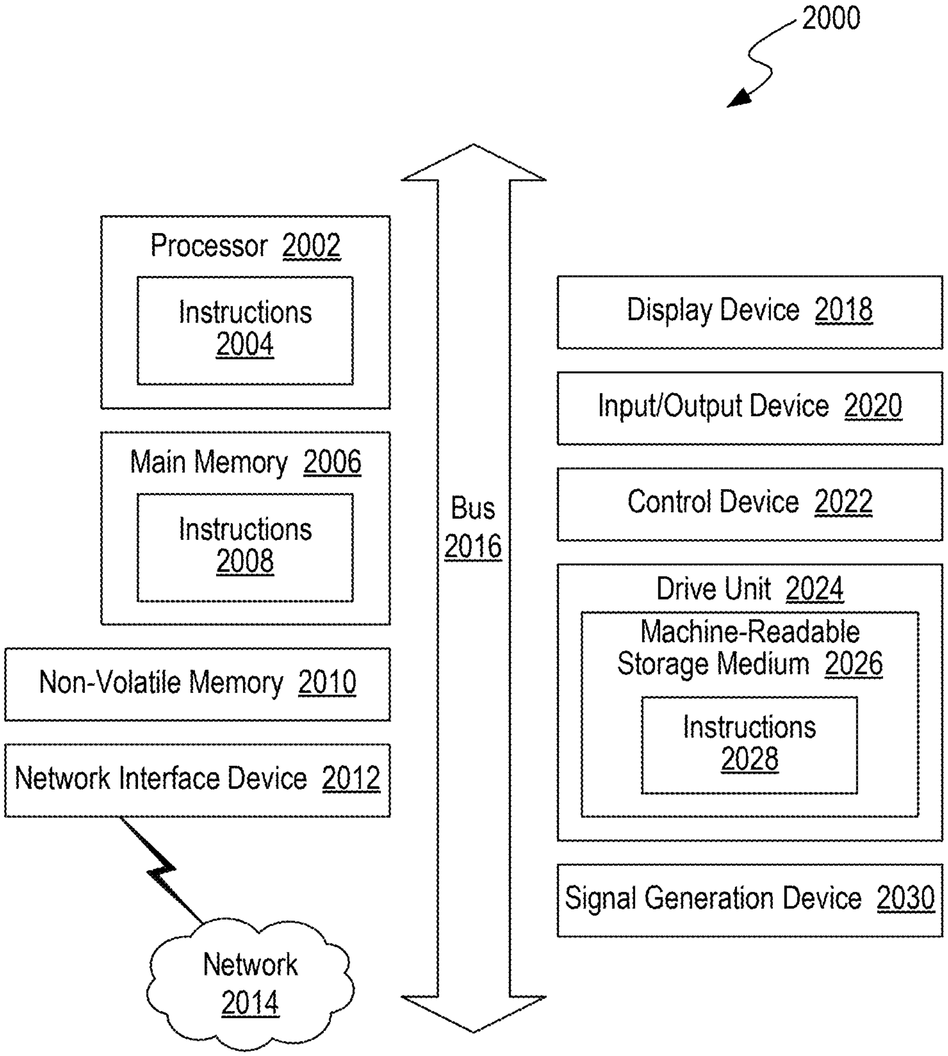
FIG. 20 is a block diagram showing some of the components typically incorporated in at least some of the computer systems and other devices on which the agent management platform operates in accordance with some implementations of the present technology.

FIG. 20 is a block diagram showing some of the components typically incorporated in at least some of the computer systems 2000 and other devices on which the disclosed system operates in accordance with some implementations of the present technology. As shown, an example computer system 2000 can include: one or more processors 2002, main memory 2008, non-volatile memory 2012, a network interface device 2014, video display device 2020, an input/output device 2022, a control device 2024 (e.g., keyboard and pointing device), a drive unit 2026 that includes a machine-readable medium 2028, and a signal generation device 2032 that are communicatively connected to a bus 2018. The bus 2018 represents one or more physical buses and/or point-to-point connections that are connected by appropriate bridges, adapters, or controllers. Various common components (e.g., cache memory) are omitted from FIG. 20 for brevity. Instead, the computer system 2000 is intended to illustrate a hardware device on which components illustrated or described relative to the examples of the figures and any other components described in this specification can be implemented.

The computer system 2000 can take any suitable physical form. For example, the computer system 2000 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 2000. In some implementations, the computer system 2000 can be an embedded computer system, a system-on-chip (SOC), a single-board computer system (SBC) or a distributed system such as a mesh of computer systems or include one or more cloud components in one or more networks. Where appropriate, one or more computer systems 2000 can perform operations in real time, near real time, or in batch mode.

The network interface device 2014 enables the computer system 2000 to exchange data in a network 2016 with an entity that is external to the computing system 2000 through any communication protocol supported by the computer system 2000 and the external entity. Examples of the network interface device 2014 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2008, non-volatile memory 2012, machine-readable medium 2028) can be local, remote, or distributed. Although shown as a single medium, the machine-readable medium 2028 can include multiple media (e.g., a centralized/distributed database and/or associated caches and servers) that store one or more sets of instructions 2030. The machine-readable (storage) medium 2028 can include any medium that is capable of storing, encoding, or carrying a set of instructions for execution by the computer system 2000. The machine-readable medium 2028 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2010, 2030) set at various times in various memory and storage devices in computing device(s). When read and executed by the processor 2002, the instruction(s) cause the computer system 2000 to perform operations to execute elements involving the various aspects of the disclosure.

Figure 21:
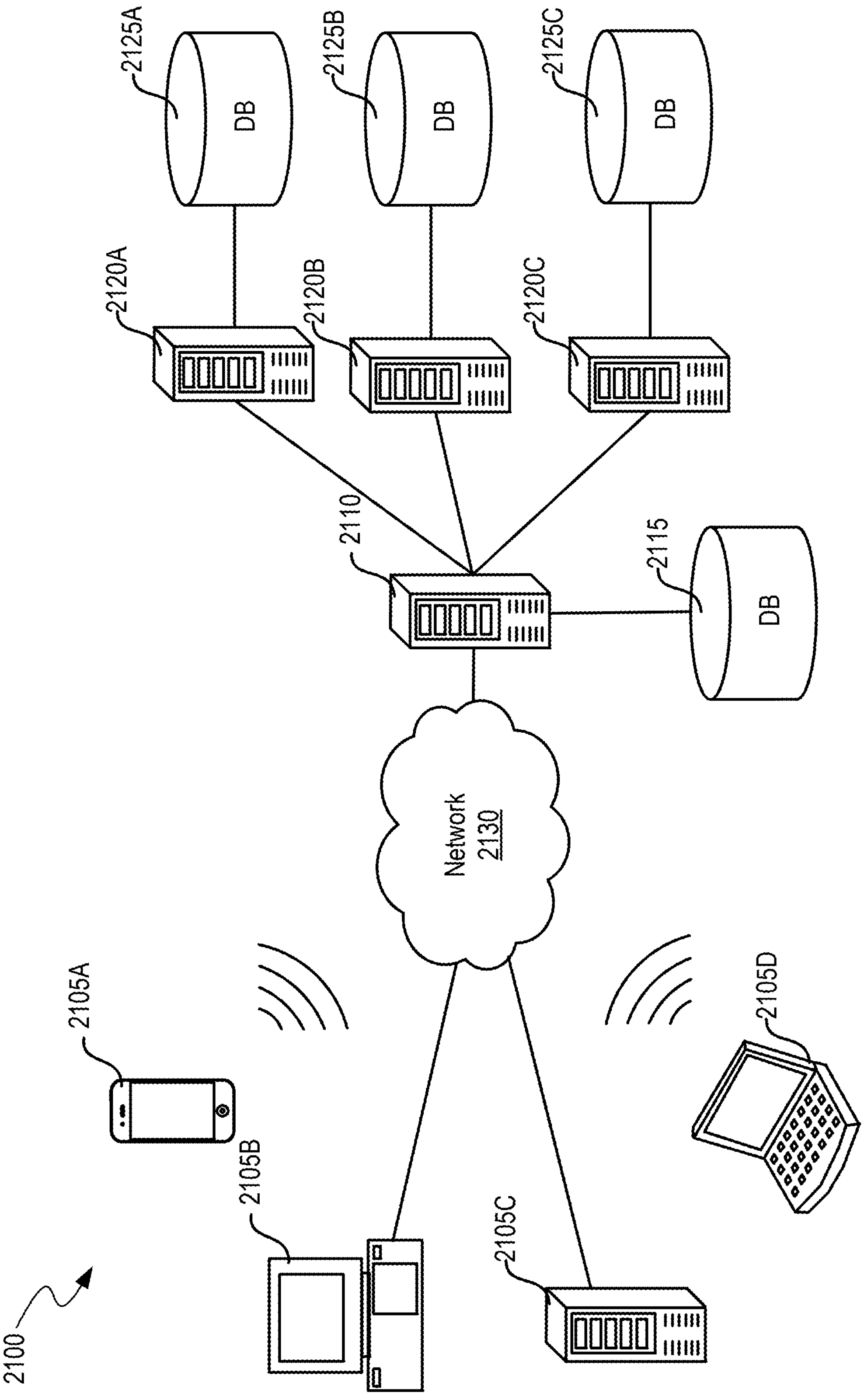
FIG. 21 is a system diagram illustrating an example of a computing environment in which the agent management platform operates in some implementations of the present technology.

FIG. 21 is a system diagram illustrating an example of a computing environment in which the disclosed system operates in some implementations. In some implementations, environment 2100 includes one or more client computing devices 605A-D, examples of which can host the agent management platform of FIG. 9. Client computing devices 2105 operate in a networked environment using logical connections through network 2130 to one or more remote computers, such as a server computing device.

In some implementations, server computing device 2110 is an edge server which receives client requests and coordinates fulfillment of those requests through other servers, such as servers 820A-C. In some implementations, server computing devices 2110 and 2120 comprise computing systems, such as the agent management platform of FIG. 9. Though each server computing device 2110 and 2120 is displayed logically as a single server, server computing devices can each be a distributed computing environment encompassing multiple computing devices located at the same or at geographically disparate physical locations. In some implementations, each server computing device 2120 corresponds to a group of servers.

Client computing devices 2105 and server computing devices 2110 and 2120 can each act as a server or client to other server or client devices. In some implementations, servers (2110, 820A-C) connect to a corresponding database (2115, 825A-C). As discussed above, each server computing device 2120 can correspond to a group of servers, and each of these servers can share a database or can have its own database. Databases 2115 and 2125 warehouse (e.g., store) information such as claims data, email data, call transcripts, call logs, policy data and so on. Though databases 2115 and 2125 are displayed logically as single units, databases 2115 and 2125 can each be a distributed computing environment encompassing multiple computing devices, can be located within their corresponding server, or can be located at the same or at geographically disparate physical locations.

Network 2130 can be a local area network (LAN) or a wide area network (WAN), but can also be other wired or wireless networks. In some implementations, network 2130 is the Internet or some other public or private network. Client computing devices 2105 are connected to network 2130 through a network interface, such as by wired or wireless communication. While the connections between server computing device 2110 and server computing devices 2120 are shown as separate connections, these connections can be any kind of local, wide area, wired, or wireless network, including network 2130 or a separate public or private network.

Figure 22:
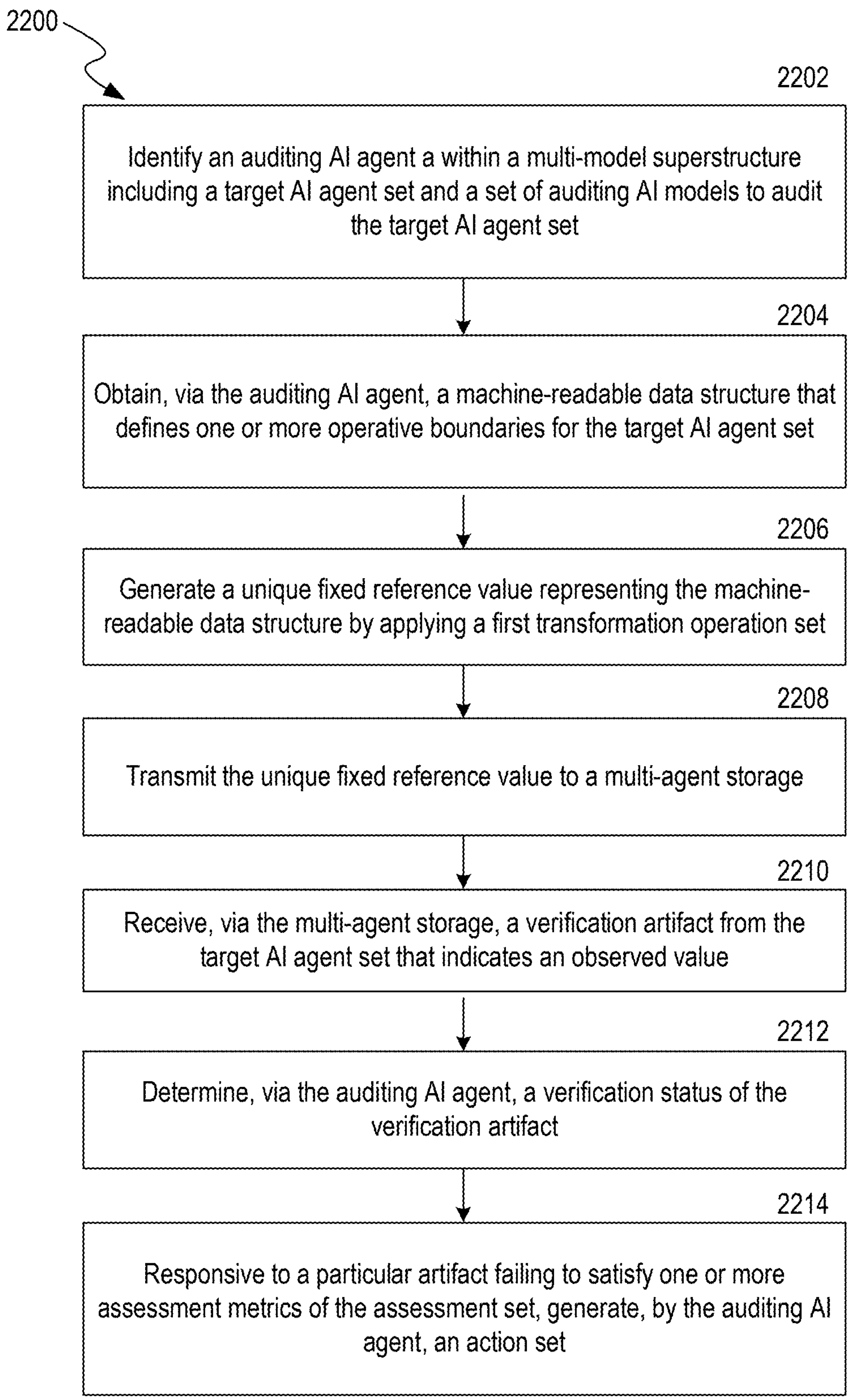
FIG. 22 shows a flowchart of the operations involved in verification of agents (e.g., third party agents), in accordance with one or more implementations.

FIG. 22 shows a flowchart of the operations involved in verification of agents (e.g., third party agents), in accordance with one or more implementations. For example, the system can use process 2200 (e.g., as implemented on one or more system components described above) to dynamically assess target AI agents in a multi-model superstructure.

At operation 2202, process 2200 (e.g., using one or more components described above) identifies, and/or determines, an auditing AI agent within a multi-model superstructure, wherein the multi-model superstructure includes a target AI agent set and a set of auditing AI agents to audit the target AI agent set. For example, the system can identify the auditing AI agent from the set of auditing AI agents for assessing target AI agents. According to some implementations, the auditing AI agent can be associated with a first entity, such as an entity tied to the system or platform described herein, or in some cases, a third party entity. For example, the entity could be a financial firm.

In one implementation, the system can extend, to other agents (e.g., target AI agents) being assessed for compliance, a query for accepting compliance or auditing tasks to be performed. Upon receiving a response from the other agents, the system can automatically programmatically set a compliance audit flag within a contract management database, indicating that an auditing agent is authorized to monitor and enforce compliance. The auditing agent, whether internal or third-party, can be registered in the system with defined access credentials and permissions, enabling secure, role-based access to relevant transactional and compliance data.

In some implementations, the auditing AI agent is within a multi-model superstructure including (i) a target AI agent set and (ii) the plurality of sets of auditing AI agents to audit the target AI agent set. As referred to herein, a multi-model superstructure can include a first set of models (e.g., a target AI agent set) and a second set of models (e.g., the auditing AI agent set). The first set of models can be thought of as the monitored model(s) generating the artifact (e.g., an output based on the prompt or other output generation request such as artifact). The models in the multi-model superstructure can include various types of generative models (e.g., language models, image generation models, data synthesis models). The second set of models can be thought of as the monitoring model(s) evaluating and validating the artifact generated by the first set of models (e.g., checking accuracy, detecting biases, ensuring compliance with regulations such as a validation model and validating models). In some implementations, the multi-model superstructure can use a modular architecture to enable easy integration and replacement of models within the multi-model superstructure. Each model can be encapsulated within a microservice, which communicates with other microservices via APIs. Additionally, the multi-model superstructure can use containerization technologies, such as Docker, to package and deploy the models.

Identifying the auditing AI agent from the set of auditing AI agents can include selecting the auditing AI agent randomly, using a predefined schedule, and/or the like. For example, in some implementations the one or more models of the second set of models (e.g., the set of auditing AI agents) are determined randomly to introduce variability. By randomly selecting models from the second set (e.g., set of auditing AI agents), the multi-model superstructure can avoid potential biases that can arise from consistently using the same models. The random selection process can be implemented using algorithms such as random sampling or stochastic processes to ensure that each model in the second set has an equal probability of being chosen. The random determination can be combined with other selection criteria, such as performance metrics or resource availability, to balance randomness with practical considerations.

In some implementations, the multi-model superstructure can establish a predefined schedule to change the one or more models in the second set of models. The predefined schedule can be established using time intervals, such as changing models every hour or day, and/or a number of output generation requests processed, such as switching models after every 100 requests. Using the predefined schedule, the multi-model superstructure can determine the one or more models of the second set of models. By adhering to this schedule, the multi-model superstructure ensures that different models are periodically utilized, which can help in balancing the load, preventing model overfitting, and introducing variability in the outputs. The scheduling algorithm used can be, for example, a round-robin scheduling algorithm that assigns a fixed time slice to each model in a cyclic order. A weighted round-robin algorithm can allocate more processing time to higher-performing models based on assigned weights. Further, the scheduling algorithm used can include priority scheduling to ensure that preferred models are used more frequently by assigning them higher priority levels. Least Recently Used (LRU) scheduling can be used to ensure periodic usage of all models by selecting the model(s) that have been used the least recently. Dynamic scheduling can adjust the shifting of the models based on real-time metrics such as model performance and system load.

In some implementations, the multi-model superstructure can dynamically select the one or more models of the second set of models using the third set of models and using dimension-specific features of the particular dimension being evaluated. For instance, if the dimension being evaluated is related to financial data, the third set of models can extract features such as transaction types, regulatory requirements, and market conditions. The features can be used to match the artifact with models in the second set that are specifically trained on similar financial datasets. The selection process can be implemented (e.g., using the third set of models) using machine learning algorithms, such as decision trees, which are a type of supervised learning algorithm that splits the data into branches based on feature values, ultimately leading to a decision node that indicates the most suitable model.

Alternatively, the third set of models can map the artifact to the most suitable model(s) in the second set by minimizing a loss function, which measures the difference between the predicted and actual model selections. When a new artifact is received, the multi-model superstructure can input certain features (e.g., artifact type, artifact timestamp, artifact location, last used models in the second set, predefined schedules, metadata of capabilities and specializations of models in the second set, other metadata, and so forth) into the trained third set of models, which then predicts the most suitable model(s) from the second set of models to use to validate the artifact. Dynamically determining the monitoring models enables the multi-model superstructure to use, for example, different monitoring models on different artifact types (e.g., format, domain such as technical field) depending on the monitoring model's performance (e.g., better performing monitoring models for a particular artifact type is used on the particular artifact).

In addition to dynamically selecting models based on dimension-specific features, the multi-model superstructure can vary the monitoring models using dynamic balancing based on model performance metrics such as latency, accuracy, and/or precision. For instance, monitoring models with lower latency and higher accuracy can be prioritized for real-time applications, while those with higher precision can be selected for tasks executed by higher risk applications. Furthermore, the superstructure can use previous results by clustering artifacts with similar characteristics and thus select monitoring models that have historically performed well on similar artifacts.

In some implementations, the models in the multi-model superstructure include 1) general-purpose models and/or 2) domain-specific models. The artifacts can be routed to the one or more models of the second set of models trained on data sharing a common domain with one or more artifacts of the set of artifacts. The domain can indicate 1) an area of knowledge, such as healthcare or finance, 2) a data type, such as text, image, or numerical data, 3) a guideline type, such as regulatory compliance or industry standards, and/or 4) a type of task, such as classification, prediction, or summarization. The multi-model superstructure can categorize/tag the artifacts from the first set of models based on the artifact's domain's characteristics (e.g., keywords identified using NLP). For instance, if the artifact is a text document related to healthcare, it is tagged with the "healthcare" domain. The multi-model superstructure can use the tags to route the artifacts to the models in the second set.

At operation 2204, process 2200 (e.g., using one or more components described above) includes obtaining, via the auditing AI agent, a machine-readable data structure that defines one or more operative boundaries for the target AI agent set. In some examples, the target AI agent set can be associated with a second entity (e.g., representing organizational guidelines, industry standards, or provider criteria).

At operation 2206, process 2200 (e.g., using one or more components described above) includes generating a unique fixed reference value representing the machine-readable data structure by applying a first transformation operation set on the machine-readable data structure. The first transformation operation set and generation of the unique fixed reference value is described in relation to FIG. 8. At operation 2208, process 2200 (e.g., using one or more components described above) transmits the unique fixed reference value to a multi-agent storage. In some implementations, the multi-agent storage is configured to store the unique fixed reference value in association with an identifier string identifying the auditing AI agent. In some implementations, the multi-agent storage comprises a memory structure accessible to multiple AI agents including the auditing AI agent and the target AI agent set.

As described in relation with FIG. 8, the storage structure can include a distributed ledger and the verification record can be stored as a transaction on the distributed ledger. In some implementations, the distributed ledge may include a federated ledger and/or blockchain. The multi-agent storage can include a memory structure accessible to multiple AI agents including the first AI agent and the second AI agent. Similarly, as described in relation with FIG. 8, the multi-agent storage can store the unique fixed reference value in association with an identifier, such as an identifier string (e.g., name or unique code), identifying the first AI agent. For example, before the transaction is transmitted, the agent management platform can digitally sign the transaction using a private cryptographic key of the submitting agent. The signed record can be broadcast to all nodes or participants in the storage structure, where the record can be checked and validated according to the agent management platform's rules for consensus. Once approved, the transaction can be permanently added to the storage structure.

At operation 2210, process 2200 (e.g., using one or more components described above) receives or otherwise obtains, via the multi-agent storage, a verification artifact from the target AI agent set that indicates an observed value. In some implementations, the observed value is generated by applying a second transformation operation set on an artifact set generated by the target AI agent set. Alternatively or additionally, the observed value can be generated by applying the second transformation operation set on one or more portions of an internal operational dataset of the target AI agent set corresponding to the one or more operational boundaries, as described further in relation with FIG. 8.

As referred to herein, the artifact can be thought of as the subject to be monitored and validated, such as an output generated by one or more models (e.g., generative AI model) of the target AI agent set. For example, an artifact can be any form of data (e.g., structured, semi-structured, unstructured), such as text, images, or other multimedia content, produced by the AI model. In some implementations, an artifact can include structured data outputs, such as tables or graphs. For example, an artifact can be a text summary of a legal document, an image generated from a text description, and/or a graph representing data trends. An artifact is evaluated against various compliance and performance metrics.

An artifact can be evaluated for compliance against the criteria within policy sources. The policy sources encompass a range of regulatory and policy documents that provide guidelines and standards for AI model compliance. The policy sources can be the same as or similar to guidelines which can include various elements such as jurisdictional regulations, organizational regulations, and AI applications-specific regulations (e.g., unsupervised learning, natural language processing (NLP), generative AI). Jurisdictional regulations (e.g., governmental regulations) can include regulations gathered from authoritative sources such as government websites, legislative bodies, and regulatory agencies. Jurisdictional regulations can be published in legal documents or official publications and cover aspects related to the development, deployment, and use of AI technologies within specific jurisdictions. Organizational regulations 906 includes internal policies, procedures, and guidelines established by organizations to govern AI-related activities within the organization's operations. Organizational regulations can be developed in alignment with industry standards, legal requirements, and organizational objectives. AI application-specific regulations include regulations that pertain to specific types of AI applications, such as unsupervised learning, natural language processing (NLP), and generative AI.

The policy sources can include internal company policies, industry standards, legal regulations, and/or other guidelines. For example, policy sources can include ethical guidelines that ensure AI models operate within moral boundaries, such as avoiding bias and ensuring fairness. Additionally, policy sources can include regulations from financial regulatory bodies like the Financial Industry Regulatory Authority (FINRA). Compliance with FINRA regulations can include adhering to standards for transparency, accuracy, and/or investor protection. Policy sources can further include regulations such as the Sarbanes-Oxley Act (SOX), which sets requirements for financial reporting and corporate governance. For example, AI models used in financial reporting are required to comply with SOX standards relating to the accuracy and integrity of financial data. In some implementations, policy sources can integrate real-time updates from regulatory bodies to ensure the AI model remains compliant with the latest standards. The knowledge base within policy sources stores structured and unstructured data related to the policies. For example, structured data can be structured databases of regulations, while unstructured data can be text documents or emails.

To enable evaluation of an artifact, the policy context extraction module identifies the criteria within the policy sources. In particular, the policy context extraction module within the artifact observation platform extracts criteria and/or context within the knowledge base containing the policy sources to provide assessment metrics and threshold values of the assessment metrics in which to use to evaluate an artifact. The policy context extraction module can extract criteria and/or context. The extracted information can be used by the monitoring engine to continuously observe an artifact and detect deviations from expected behavior. For example, the monitoring engine can task one or more validation model(s) to detect bias, inaccuracies, and non-compliance with guidelines of an artifact.

At operation 2212, process 2200 (e.g., using one or more components described above) determines, via the auditing AI agent, a verification status of the verification artifact. For example, the system can determine the verification status by comparing the unique fixed reference value generated by the auditing AI agent with the observed value indicated by the verification artifact, wherein the verification status is indicative of satisfaction of the artifact set with an assessment metric set of an assessment set. For example, this can be done using techniques described in relation with FIG. 8.

At operation 2214, process 2200 (e.g., using one or more components described above), responsive to a particular artifact failing to satisfy one or more assessment metrics of the assessment set, generates, by the auditing AI agent, an action set. In particular, the action set can be configured to modify the target AI agent set using the verification status of the artifact set with the assessment metric set of the assessment set. According to some implementations, the action set includes one or more of: 1) parameters of one or more AI models of the target AI agent set indicated by the one or more assessment metrics or 2) an output generation request configured to generate the artifact set using the target AI agent set.

According to some implementations, the system can further, using the generated action set, update the output generation request by automatically triggering one or more computer-implemented commands indicated by the generated action set. For example, the multi-model superstructure can update the output generation request by automatically triggering an automated workflow indicated by the generated set of actions. The automated workflow can include executing the generated set of actions. For example, the multi-model superstructure can define the generated set of actions as discrete steps within a workflow definition file. The workflow definition specifies each step's action and parameters, such as querying a database, using NLP to generate clarifying questions, and/or updating the request with the new context. Once the workflow definition is created, a workflow engine (e.g., APACHE AIRFLOW, AWS STEP FUNCTIONS) can execute each step in the defined sequence. As each step is completed, the workflow engine can update the state of the workflow and passes the intermediate results to the next step.

In some implementations, the multi-model superstructure can automatically take corrective measures on both the model output and the monitored model that generated the output, based on the compliance indicators in an evaluation report. For example, if the evaluation report indicates non-compliant results, the superstructure can modify the input data of the monitored model(s) to drive desired changes, such as adjusting data distributions or incorporating additional data sources (i.e., knowledge bases). Additionally, the superstructure can initiate a retraining process for the monitored model(s) to guide the selection of new training data that addresses the indicated issues. For example, the superstructure can retrain the monitored model(s) with reduced or different input variables to eliminate those contributing to non-compliance.

For example, using the updated output generation request, the multi-model superstructure can supply the updated output generation request to the one or more models of the first set of models to generate a set of updated model-specific outputs. The second set of models can re-evaluate each particular updated model-specific output of the updated model-specific outputs against the set of assessments to determine satisfaction of the particular updated model-specific output with the corresponding set of assessment metrics of each assessment.

According to some implementations, the system can further cause display of a layout including one or more of: (1) a first representation of the artifact set, (2) a second representation of corresponding indications of satisfaction of the artifact set with the assessment metric set of the assessment set and (2) a second representation of corresponding action sets generated. In particular, for each particular artifact of the set of artifacts, the multi-model superstructure can generate for display on the computing device, a layout indicating the set of assessment results. The layout can include a first representation of the particular artifact (e.g., model output, document, report, data visualization) and a second representation of the corresponding set of actions generated. The second representation can be displayed as a graphical representation, a list and/or a flowchart, showing one or more of the generated actions.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 912(f) will begin with the words "means for," but use of the term "for" in any other context is not intended to invoke treatment under 35 U.S.C. § 912(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system comprising:

at least one hardware processor; and at least one non-transitory memory storing instructions, which, when executed by the at least one hardware processor, cause the system to:

obtain a machine-readable data structure that defines one or more operative boundaries for a target AI agent set;

determine a reference value by applying a first transformation set on the machine-readable data structure;

cause transmission of the reference value to a storage structure;

obtain, via the storage structure, an artifact from the target AI agent set that indicates an observed value associated with the target AI agent set;

determine a verification status of the artifact by comparing the reference value with the observed value indicated by the artifact;

cause generation of a record that indicates the verification status; and responsive to the verification status indicating a failure by the target AI agent set to satisfy the one or more operative boundaries, generating an action set configured to modify the target AI agent set.

2. The system of claim 1, wherein the storage structure comprises a distributed ledger accessible to the target AI agent set.

3. The system of claim 1, wherein the machine-readable data structure indicates at least one of: a model parameter of the target AI agent set, a data signal used in operation of the target AI agent set, or information related to a computational operation of the target AI agent set.

4. The system of claim 1, wherein the artifact comprises a zero-knowledge proof configured to test the target AI agent set against the one or more operative boundaries.

5. The system of claim 1, wherein the record is stored on the storage structure in association with a respective identifier identifying the target AI agent set.

6. The system of claim 1, wherein the first transformation set comprises at least one of: a cryptographic hash function, a keyed hash function, or a deterministic encoding function.

7. A non-transitory, computer-readable storage medium comprising instructions thereon, wherein the instructions, when executed by at least one data processor of a system, cause the system to:

obtain, via a provider agent, an operative boundary set maintained in a storage structure;

generating a subset of an operative boundary set by applying one or more filters on the operative boundary set;

cause transmission of the subset of the operative boundary set from the provider agent to a sub-agent associated with the provider agent;

obtain, from the sub-agent, a sub-agent verification artifact generated by applying at least one transformation operation on operational data of the sub-agent;

determining a verification status of the sub-agent verification artifact by comparing the sub-agent verification artifact against the subset of the operative boundary set; and cause transmission of a record indicating the verification status to the storage structure.

8. The non-transitory, computer-readable storage medium of claim 7, wherein the operative boundary set is configured to be applied across multiple agents including the sub-agent.

9. The non-transitory, computer-readable storage medium of claim 7, wherein one or more of the sub-agent or the provider agent is an autonomous agent.

10. The non-transitory, computer-readable storage medium of claim 7, wherein the instructions further cause the at least one data processor to perform operations comprising:

aggregating the sub-agent verification artifact with a provider verification artifact associated with the provider agent to generate a combined verification artifact.

11. The non-transitory, computer-readable storage medium of claim 10, wherein the instructions further cause the at least one data processor to perform operations comprising:

transmitting the combined verification artifact to the provider agent for verification against the operative boundary set.

12. The non-transitory, computer-readable storage medium of claim 10, wherein the storage structure is one or more of a federated ledger or a blockchain.

13. A computer-implemented method comprising:

obtaining a machine-readable data structure that defines one or more operative boundaries for a target AI agent set determining a reference value by applying a first transformation set on the machine-readable data structure;

cause transmission of the reference value to a storage structure;

obtain, via the storage structure, an artifact from the target AI agent set that indicates an observed value associated with the target AI agent set;

determine a verification status of the artifact by comparing the reference value with the observed value indicated by the artifact;

cause generation of a record that indicates the verification status; and responsive to the verification status indicating a failure by the target AI agent set to satisfy the one or more operative boundaries, generating an action set configured to modify the target agent set.

14. The method of claim 13, further comprising:

encoding the one or more operative boundaries as a commitment on a distributed data store.

15. The method of claim 14, wherein the distributed data store comprises a blockchain.

16. The method of claim 13, wherein the artifact comprises a proof that indicates the one or more operative boundaries.

17. The method of claim 13, wherein the one or more operative boundaries comprise at least one of: a regulatory compliance parameter, a contractual obligation parameter, or an operational policy constraint.

* * * * *